United States Patent
Noguchi et al.

(10) Patent No.: US 12,212,148 B2
(45) Date of Patent: Jan. 28, 2025

(54) ROBOT DEVICE AND WIRELESS CONNECTOR

(71) Applicant: Japan Aviation Electronics Industry, Limited, Tokyo (JP)

(72) Inventors: Hideyuki Noguchi, Tokyo (JP); Masayoshi Yoneda, Tokyo (JP); Hiromasa Tanaka, Tokyo (JP); Yuuri Nakamura, Tokyo (JP); Hidehiko Kuroda, Tokyo (JP)

(73) Assignee: Japan Aviation Electronics Industry, Limited, Tokyo (JP)

(*) Notice: Subject to any disclaimer, the term of this patent is extended or adjusted under 35 U.S.C. 154(b) by 377 days.

(21) Appl. No.: 17/785,663

(22) PCT Filed: Oct. 19, 2020

(86) PCT No.: PCT/JP2020/039221
§ 371 (c)(1),
(2) Date: Jun. 15, 2022

(87) PCT Pub. No.: WO2021/157138
PCT Pub. Date: Aug. 12, 2021

(65) Prior Publication Data
US 2023/0048470 A1  Feb. 16, 2023

(30) Foreign Application Priority Data
Feb. 3, 2020 (JP) .................. 2020-016480

(51) Int. Cl.
*H01R 13/60* (2006.01)
*B25J 19/00* (2006.01)
(Continued)

(52) U.S. Cl.
CPC .......... *H02J 50/005* (2020.01); *B25J 19/0041* (2013.01); *H01R 24/76* (2013.01);
(Continued)

(58) Field of Classification Search
CPC .......... H02J 50/005; H02J 50/80; H02J 50/10; H02J 50/402; B25J 19/0041; H01R 24/76; H01R 33/97
(Continued)

(56) References Cited

U.S. PATENT DOCUMENTS

| 5,712,552 A | * | 1/1998 | Hirai | .................... | B25J 19/0029 |
| | | | | | 414/730 |
| 8,264,187 B2 | * | 9/2012 | Laceky | ................ | B25J 19/0029 |
| | | | | | 318/568.11 |

(Continued)

FOREIGN PATENT DOCUMENTS

| CN | 203086197 U | 7/2013 |
| JP | H08-019985 A | 1/1996 |

(Continued)

OTHER PUBLICATIONS

International Search Report in PCT/JP2020/039221, mailed Dec. 22, 2020.
(Continued)

*Primary Examiner* — Abdullah A Riyami
*Assistant Examiner* — Vladimir Imas
(74) *Attorney, Agent, or Firm* — Collard & Roe, P.C.

(57) ABSTRACT

A wireless connector includes: a first unit attached detachably from the outside of a first object; and a second unit attached detachably from the outside of a second object. The first unit includes a first housing to which a first transmission/reception part and a first connector part are secured, the first connector part being attached to the first object and transmitting a to-be-transmitted target between the first connector part and the first object. The second unit includes a second housing to which a second transmission/reception part and a second connector part are secured, the second connector part being attached to the second object and
(Continued)

transmitting a to-be-transmitted target between the second connector part and the second object. The first transmission/reception part and the second transmission/reception part are arranged so as to be separated from each other and opposed to each other to wirelessly transmit the to-be-transmitted target.

31 Claims, 24 Drawing Sheets

(51) Int. Cl.
*H01R 24/76* (2011.01)
*H01R 33/97* (2006.01)
*H02J 50/00* (2016.01)
*H02J 50/10* (2016.01)
*H02J 50/40* (2016.01)
*H02J 50/80* (2016.01)

(52) U.S. Cl.
CPC .............. *H01R 33/97* (2013.01); *H02J 50/10* (2016.02); *H02J 50/402* (2020.01); *H02J 50/80* (2016.02)

(58) Field of Classification Search
USPC ......................................................... 439/533
See application file for complete search history.

(56) References Cited

U.S. PATENT DOCUMENTS

| | | | |
|---|---|---|---|
| 8,265,791 B2 * | 9/2012 | Song | B25J 9/1664 901/14 |
| 9,114,537 B2 * | 8/2015 | Wise | B25J 19/005 |
| 9,358,684 B1 | 6/2016 | He et al. | |
| 10,406,680 B2 * | 9/2019 | Inoue | B23K 9/12 |
| 2008/0197710 A1 | 8/2008 | Kreitz et al. | |
| 2010/0017029 A1 * | 1/2010 | Graf | B62D 57/032 700/245 |
| 2011/0313568 A1 * | 12/2011 | Blackwell | B25J 9/1045 901/1 |
| 2012/0259461 A1 * | 10/2012 | Yang | B62D 57/032 901/1 |
| 2016/0233687 A1 | 8/2016 | McKernan et al. | |
| 2017/0244284 A1 | 8/2017 | Takahashi et al. | |
| 2018/0205266 A1 | 7/2018 | Miyamoto et al. | |
| 2022/0143815 A1 * | 5/2022 | Kastler | B25J 19/0029 |

FOREIGN PATENT DOCUMENTS

| | | |
|---|---|---|
| JP | H09-300270 A | 11/1997 |
| JP | 2012-518382 A | 8/2012 |
| JP | 2017-144530 A | 8/2017 |
| JP | 2018-512830 A | 5/2018 |
| JP | 2018-117511 A | 7/2018 |
| JP | 2019-213330 A | 12/2019 |
| JP | 2020-163498 A | 10/2020 |
| KR | 2019-0078107 A | 7/2019 |
| WO | 2010/093997 A1 | 8/2010 |

OTHER PUBLICATIONS

Extended European Search Report dated May 11, 2023 in European Application No. 20917598.3.

* cited by examiner

ROBOT DEVICE AND WIRELESS CONNECTOR

CROSS REFERENCE TO RELATED APPLICATIONS

This application is the National Stage of PCT/JP2020/039221 filed on Oct. 19, 2020, which claims priority under 35 U.S.C. § 119 of Japanese Application No. 2020-016480 filed on Feb. 3, 2020, the disclosure of which is incorporated by reference. The international application under PCT article 21 (2) was not published in English.

TECHNICAL FIELD

The present invention relates to a robot device and a wireless connector.

BACKGROUND TECHNOLOGY

Technology for supplying electric power wirelessly to a load is known. Hereinafter, such a technique is referred to as "a wireless power supply technique." The wireless power supply technique is applied to industrial robots or the like. For example, Patent Document 1 discloses an example of a robot arm device as shown in FIG. 35A. The illustrated robot arm device comprises first to sixth joint portions J1 to J6. The second and the fourth joint portions J2 and J4 are provided with first and second wireless power supply units IHU2 and IHU4, respectively. The first and the second wireless power supply units IHU2 and IHU4 wirelessly transmit electric power at the second and the fourth joint portions J2 and J4 via a pair of coils, respectively.

The above-mentioned Patent Document 1 also discloses a configuration of a part of a wireless power transmission system as shown in FIG. 35B. The illustrated wireless power transmission system is provided with a wireless power supply unit 1, a power source device 2, and a load 3. The wireless power supply unit 1 is disposed between the power source device 2 and the load 3. The wireless power supply unit 1 corresponds to the above-mentioned first wireless power supply unit IHU2. The wireless power supply unit 1 is provided with a power transmission device 10 and a reception device 20, as shown in FIG. 35B. The power transmission device 10 is provided with a power transmission antenna 11 including a coil or the like, an inverter circuit 13, and a power transmission control circuit 15. The reception device 20 is provided with a power receiving antenna 21 including a coil or the like, and a rectifying circuit 23.

PRIOR ART DOCUMENT

Patent Document

Patent Document 1: JP 2018-117511 A

SUMMARY OF THE INVENTION

Problem to be Solved by the Invention

In general, a coil for wirelessly transmitting and receiving electric power often generates heat during operation. Therefore, a failure may occur in the wireless power supply unit 1 due to heat generation of the coil. The failure of the wireless power supply unit 1 may interfere with the operation of the robot arm device. Accordingly, it is desirable that the wireless power supply unit 1 can easily be repaired by replacement or the like of the wireless power supply unit 1.

However, Patent Document 1 does not disclose how the second and the fourth joint portions J2 and J4 are provided with the wireless power supply unit 1, such as an arrangement of the pair of coils. Therefore, it is difficult to obtain the wireless power supply unit 1 which can easily be repaired even if Patent Document 1 is referred to.

The present invention has been made in view of the above-mentioned situation, and an object thereof is to provide a wireless connector capable of being easily repaired.

Means for Solving the Problem

In order to achieve the above-mentioned object, according to a first aspect of the present invention, there is provided a robot device comprising:
  a first arm part and a second arm part which are connected via a joint mechanism configured to rotatably connect the first and the second arm parts with a rotation axis as a fulcrum, and
  a wireless connector configured to wirelessly transmit a to-be-transmitted target, which is at least one of electric power and information, between the first arm part and the second arm part,
wherein:
  the first arm part includes a first mating connector part exposed to an outside of the first arm part, and
  the second arm part includes a second mating connector part exposed to an outside of the second arm part,
wherein the wireless connector comprises:
  a first housing to which a first transmission/reception part configured to wirelessly transmit the to-be-transmitted target, and a first connector part configured to transmit the to-be-transmitted target to/from the first arm part by being removably attached to the first mating connector part are fixed; and
  a second housing to which a second transmission/reception part configured to wirelessly transmit the to-be-transmitted target to/from the first transmission/reception part, and a second connector part configured to transmit the to-be-transmitted target to/from the second arm part by being removably attached to the second mating connector part are fixed,
wherein, when the first connector part and the second connector part are attached to the first mating connector part and the second mating connector part, respectively, the first transmission/reception part and the second transmission/reception part are arranged in a state of being spaced from and faced to each other along the rotation axis so as to wirelessly transmit the to-be-transmitted target outside the joint mechanism,
wherein the wireless connector further includes a protection part comprising an elastic member for preventing intrusion of a foreign matter into a facing space, which is a space between the first transmission/reception part and the second transmission/reception part in the state of being faced to each other, the protection part being provided in at least one housing of the first housing and the second housing so as to close at least a part of a gap continuous to the facing space.

The first housing serving as the one housing may include a recessed part forming a recess of a columnar shape in which the first transmission/reception part is arranged.

The second housing serving as the other housing may include a protruding part of a columnar shape on which the second transmission/reception part is arranged.

The protection part may be provided on a bottom surface, an inner peripheral surface, or a peripheral portion of the recessed part.

When the first connector part and the second connector part are attached to the first mating connector part and the second mating connector part, respectively, the first transmission/reception part and the second transmission/reception part may be arranged in a state of being spaced from and faced to each other along the rotation axis so as to wirelessly transmit the to-be-transmitted target outside the joint mechanism and a tip surface of the protruding part and the bottom surface of the recessed part may be faced to each other with a tip of the protection part brought into contact with the tip surface, an outer peripheral surface, or a peripheral portion of the protruding part.

The first housing serving as the one housing may include a recessed part forming a recess of a columnar shape in which the first transmission/reception part is arranged.

The second housing serving as the other housing may include a protruding part of a columnar shape on which the second transmission/reception part is arranged.

The protection part may be provided on a tip surface, an outer peripheral surface, or a peripheral portion of the protruding part.

When the first connector part and the second connector part are attached to the first mating connector part and the second mating connector part, respectively, the first transmission/reception part and the second transmission/reception part may be arranged in a state of being spaced from and faced to each other along the rotation axis so as to wirelessly transmit the to-be-transmitted target outside the joint mechanism and the protruding part and the recessed part may be faced to each other with a tip of the protection part brought into contact with a bottom surface, an inner peripheral surface, or a peripheral portion of the recessed part.

In order to achieve the above-mentioned object, according to a second aspect of the present invention, there is provided a robot device comprising:
- a first arm part and a second arm part which are connected via a joint mechanism configured to rotatably connect the first and the second arm parts with a rotation axis as a fulcrum, and
- a wireless connector configured to wirelessly transmit a to-be-transmitted target, which is at least one of electric power and information, between the first arm part and the second arm part, wherein:
- the first arm part includes a first mating connector part exposed to an outside of the first arm part, and
- the second arm part includes a second mating connector part exposed to an outside of the second arm part, wherein the wireless connector comprises:
- a first housing to which a first transmission/reception part configured to wirelessly transmit the to-be-transmitted target, and a first connector part configured to transmit the to-be-transmitted target to/from the first arm part by being removably attached to the first mating connector part are fixed; and
- a second housing to which a second transmission/reception part configured to wirelessly transmit the to-be-transmitted target to/from the first transmission/reception part, and a second connector part configured to transmit the to-be-transmitted target to/from the second arm part by being removably attached to the second mating connector part are fixed, wherein each of the first housing and the second housing has a sealed structure formed of a non-magnetic material, the first transmission/reception part is accommodated inside the first housing, and the second transmission/reception part is accommodated inside the second housing, wherein, when the first connector part and the second connector part are attached to the first mating connector part and the second mating connector part, respectively, the first transmission/reception part and the second transmission/reception part are arranged in a state of being spaced from and faced to each other along the rotation axis so as to wirelessly transmit the to-be-transmitted target outside the joint mechanism.

The wireless connector may further include a protection part comprising an elastic member for preventing intrusion of a foreign matter into a facing space, which is a space between the first transmission/reception part and the second transmission/reception part in the state of being faced to each other, the protection part being provided in at least one housing of the first housing and the second housing so as to close at least a part of a gap continuous to the facing space.

In order to achieve the above-mentioned object, according to a third aspect of the present invention, there is provided a wireless connector for wirelessly transmitting a first to-be-transmitted target, which is electric power, between a first object and a second object, wherein the wireless connector comprises:
- a first unit removably attached to the first object from an outside of the first object, and
- a second unit removably attached to the second object from an outside of the second object, wherein the first unit comprises:
- a first transmission/reception part configured to wirelessly transmit the first to-be-transmitted target;
- a first connector part configured to transmit the first to-be-transmitted target to/from the first object by being removably attached to the first object from the outside of the first object; and
- a first housing to which the first transmission/reception part and the first connector part are fixed, wherein the second unit comprises:
- a second transmission/reception part configured to wirelessly transmit the first to-be-transmitted target to/from the first transmission/reception part;
- a second connector part configured to transmit the first to-be-transmitted target to/from the second object by being removably attached to the second object from the outside of the second object; and
- a second housing to which the second transmission/reception part and the second connector part are fixed, wherein, when the first unit and the second unit are attached to the first object and the second object, respectively, the first transmission/reception part and the second transmission/reception part are arranged in a state of being spaced from and faced to each other so as to wirelessly transmit the first to-be-transmitted target, wherein the wireless connector further includes a protection part comprising a member for preventing intrusion of a foreign matter into a facing space, which is a space between the first transmission/reception part and the second transmission/reception part in the state of being faced to each other, the protection part being provided in at least one housing of the first housing and the second housing so as to close at least a part of a gap continuous to the facing space.

The first object and the second object may be connected via a joint mechanism configured to rotatably connect the first and the second objects with a rotation axis as a fulcrum.

The first housing serving as the one housing may include a recessed part forming a recess of a columnar shape in which the first transmission/reception part is arranged.

The second housing serving as the other housing may include a protruding part of a columnar shape on which the second transmission/reception part is arranged.

The protection part may be provided on a bottom surface, an inner peripheral surface, or a peripheral portion of the recessed part.

When the first connector part and the second connector part are attached to the first mating connector part and the second mating connector part, respectively, the first transmission/reception part and the second transmission/reception part may be arranged in a state of being spaced from and faced to each other along the rotation axis so as to wirelessly transmit the to-be-transmitted target outside the joint mechanism and the protruding part and the recessed part may be faced to each other with the protection part brought into contact with a tip surface, an outer peripheral surface, or a peripheral portion of the protruding part.

The first object and the second object may be connected via a joint mechanism configured to rotatably connect the first and the second objects with a rotation axis as a fulcrum.

The first housing serving as the one housing may include a recessed part forming a recess of a columnar shape in which the first transmission/reception part is arranged.

The second housing serving as the other housing may include a protruding part of a columnar shape on which the second transmission/reception part is arranged.

The protection part may be provided on a tip surface, an outer peripheral surface, or a peripheral portion of the protruding part.

When the first connector part and the second connector part are attached to the first mating connector part and the second mating connector part, respectively, the first transmission/reception part and the second transmission/reception part may be arranged in a state of being spaced from and faced to each other along the rotation axis so as to wirelessly transmit the to-be-transmitted target outside the joint mechanism and the protruding part and the recessed part may be faced to each other with the protection part brought into contact with a bottom surface, an inner peripheral surface, or a peripheral portion of the recessed part.

In order to achieve the above-mentioned object, according to a fourth aspect of the present invention, there is provided a wireless connector for wirelessly transmitting a first to-be-transmitted target, which is electric power, between a first object and a second object, wherein the wireless connector comprises:

a first unit removably attached to the first object from an outside of the first object, and a second unit removably attached to the second object from an outside of the second object, wherein the first unit comprises:

a first transmission/reception part configured to wirelessly transmit the first to-be-transmitted target;

a first connector part configured to transmit the first to-be-transmitted target to/from the first object by being removably attached to the first object from the outside of the first object; and a first housing to which the first transmission/reception part and the first connector part are fixed, wherein the second unit comprises:

a second transmission/reception part configured to wirelessly transmit the first to-be-transmitted target to/from the first transmission/reception part;

a second connector part configured to transmit the first to-be-transmitted target to/from the second object by being removably attached to the second object from the outside of the second object; and a second housing to which the second transmission/reception part and the second connector part are fixed, wherein each of the first housing and the second housing has a sealed structure formed of a non-magnetic material;

the first transmission/reception part is accommodated inside the first housing; and the second transmission/reception part is accommodated inside the second housing;

wherein, when the first unit and the second unit are attached to the first object and the second object, respectively, the first transmission/reception part and the second transmission/reception part are arranged in a state of being spaced from and faced to each other so as to wirelessly transmit the first to-be-transmitted target.

The wireless connector may further include a protection part comprising a member for preventing intrusion of a foreign matter into a facing space, which is a space between the first transmission/reception part and the second transmission/reception part in the state of being faced to each other, the protection part being provided in at least one housing of the first housing and the second housing so as to close at least a part of a gap continuous to the facing space.

The first transmission/reception part may include a first coil member of a flat-plate shape for transmitting the first to-be-transmitted target.

The second transmission/reception part may include a second coil member of a flat-plate shape for transmitting the first to-be-transmitted target by magnetic field coupling with the first coil member.

When the first unit and the second unit are attached to the first object and the second object, respectively, the first coil member and the second coil member may be arranged in parallel in a state of being spaced from and faced to each other so as to wirelessly transmit the first to-be-transmitted target.

The first unit may further include:

a third transmission/reception part fixed to the first housing and configured to wirelessly transmit a second to-be-transmitted target which is information.

The second unit may further include:

a fourth transmission/reception part fixed to the second housing and configured to wirelessly transmit the second to-be-transmitted target to/from the third transmission/reception part.

The first connector part may transmit the first to-be-transmitted target and the second to-be-transmitted target to/from the first object by being removably attached to the first object from the outside of the first object.

The second connector part may transmit the first to-be-transmitted target and the second to-be-transmitted target to/from the second object by being removably attached to the second object from the outside of the second object.

When the first unit and the second unit are attached to the first object and the second object, respectively, the third transmission/reception part and the fourth transmission/reception part may be arranged in a state of being spaced from and faced to each other so as to wirelessly transmit the second to-be-transmitted target.

The third transmission/reception part may include a first antenna member configured to transmit the second to-be-transmitted target which is information.

The fourth transmission/reception part may include a second antenna member configured to transmit the second to-be-transmitted target.

The first transmission/reception part may be provided around the third transmission/reception part.

The second transmission/reception part may be provided around the fourth transmission/reception part.

When the first unit and the second unit are attached to the first object and the second object, respectively, the first antenna member and the second antenna member may be arranged in parallel in a state of being spaced from and faced to each other so as to wirelessly transmit the second to-be-transmitted target.

In order to achieve the above-mentioned object, according to a fifth aspect of the present invention, there is provided a wireless connector for wirelessly transmitting, between a first object and a second object, at least one of electric power and information as a to-be-transmitted target, wherein the wireless connector comprises:
 a first unit removably attached to the first object from an outside of the first object, and
 a second unit removably attached to the second object from an outside of the second object,
 wherein the first unit comprises:
 a first transmission/reception part including a first coil member configured to wirelessly transmit the to-be-transmitted target;
 a first connector part removably attached to the first object so as to transmit the to-be-transmitted target to/from the first object by being fitted to the first object from the outside of the first object; and
 a first housing to which the first coil member and the first connector part are fixed,
 wherein the second unit comprises:
 a second transmission/reception part including a second coil member configured to wirelessly transmit the to-be-transmitted target to/from the first coil member;
 a second connector part removably attached to the second object so as to transmit the to-be-transmitted target to/from the second object by being fitted to the second object from the outside of the second object; and
 a second housing to which the second coil member and the second connector part are fixed,
 wherein the first connector part and the second connector part have the same fitting direction, and
 the first coil member and the second coil member are arranged in a state of being spaced from and faced to each other along the fitting direction to cause magnetic field coupling therebetween;
 wherein the wireless connector further includes a protection part comprising a member for preventing intrusion of a foreign matter into a facing space, which is a space between the first coil member and the second coil member in the state of being faced to each other, the protection part being provided in at least one housing of the first housing and the second housing so as to close at least a part of a gap continuous to the facing space.

The first housing serving as the one housing may include a recessed part which is a part where the first coil member is arranged and which forms a recess of a columnar shape along the fitting direction.

The second housing serving as the other housing may include a protruding part of a columnar shape which is a part where the second coil member is arranged and which protrudes in the fitting direction.

The protection part may be provided on a bottom surface, an inner peripheral surface, or a peripheral portion of the recessed part.

The first coil member and the second coil member may be arranged in a state of being spaced from and faced to each other along the fitting direction to cause magnetic field coupling therebetween, and the protruding part and the recessed part may be faced to each other with the protection part brought into contact with a tip surface, an outer peripheral surface or a peripheral portion of the protruding part.

The first housing serving as the one housing may include a recessed part which is a part where the first coil member is arranged and which forms a recess of a columnar shape along the fitting direction.

The second housing serving as the other housing may include a protruding part of a columnar shape which is a part where the second coil member is arranged and which protrudes in the fitting direction.

The protection part may be provided on a tip surface, an outer peripheral surface, or a peripheral portion of the protruding part.

The first coil member and the second coil member may be arranged in the state of being spaced from and faced to each other along the fitting direction to cause magnetic field coupling therebetween, and the protruding part and the recessed part may be faced to each other with the protection part brought into contact with a bottom surface, an inner peripheral surface or a peripheral portion of the recessed part.

In order to achieve the above-mentioned object, according to a sixth aspect of the present invention, there is provided a wireless connector for wirelessly transmitting, between a first object and a second object, at least one of electric power and information as a to-be-transmitted target, wherein the wireless connector comprises:
 a first unit removably attached to the first object from an outside of the first object; and
 a second unit removably attached to the second object from an outside of the second object,
 wherein the first unit comprises:
 a first transmission/reception part including a first coil member configured to wirelessly transmit the to-be-transmitted target;
 a first connector part removably attached to the first object so as to transmit the to-be-transmitted target to/from the first object by being fitted to the first object from the outside of the first object; and
 a first housing to which the first coil member and the first connector part are fixed,
 wherein the second unit comprises:
 a second transmission/reception part including a second coil member configured to wirelessly transmit the to-be-transmitted target to/from the first coil member;
 a second connector part removably attached to the second object so as to transmit the to-be-transmitted target to/from the second object by being fitted to the second object from the outside of the second object; and
 a second housing to which the second coil member and the second connector part are fixed,
 wherein each of the first housing and the second housing has a sealed structure formed of a non-magnetic material, the first coil member is accommodated inside the first housing;

the second coil member is accommodated inside the second housing;

the first connector part and the second connector part have the same fitting direction; and the first coil member and the second coil member are arranged in a state of being spaced from and faced to each other along the fitting direction to cause magnetic field coupling therebetween.

The wireless connector may further include a protection part comprising a member for preventing intrusion of a foreign matter into a facing space, which is a space between the first coil member and the second coil member in the state of being faced to each other, the protection part being provided in at least one housing of the first housing and the second housing so as to close at least a part of a gap continuous to the facing space.

The first coil member may be disposed around a first central axis.

The second coil member may be disposed around a second central axis.

The first central axis and the second central axis may be parallel to the fitting direction.

In order to achieve the above-mentioned object, according to a seventh aspect of the present invention, there is provided a wireless connector for wirelessly transmitting, between a first object and a second object, at least one of electric power and information as a to-be-transmitted target, wherein the wireless connector comprises:

a first unit removably attached to the first object from an outside of the first object; and a second unit removably attached to the second object from an outside of the second object, wherein the first unit comprises:

a first transmission/reception part including a first coil member configured to wirelessly transmit the to-be-transmitted target;

a first connector part configured to transmit the to-be-transmitted target to/from the first object by being removably attached to the first object from the outside of the first object; and a first housing to which the first transmission/reception part and the first connector part are fixed, wherein the second unit comprises:

a second transmission/reception part including a second coil member configured to wirelessly transmit the to-be-transmitted target to/from the first transmission/reception part;

a second connector part configured to transmit the to-be-transmitted target to/from the second object by being removably attached to the second object from the outside of the second object; and a second housing to which the second transmission/reception part and the second connector part are fixed, wherein the first coil member and the second coil member are spaced from and faced to each other in a state of being magnetically coupled to each other;

wherein the wireless connector further includes a protection part comprising a member for preventing intrusion of a foreign matter into a facing space, which is a space between the first coil member and the second coil member in the state of being magnetically coupled to each other, the protection part being provided in at least one housing of the first housing and the second housing so as to close at least a part of a gap continuous to the facing space.

The first housing serving as the one housing may include a recessed part forming a recess of a columnar shape in which the first coil member is arranged.

The second housing serving as the other housing may include a protruding part of a columnar shape on which the second coil member is arranged.

The protection part may be provided on a bottom surface, an inner peripheral surface, or a peripheral portion of the recessed part.

In a case where the first coil member and the second coil member are in the state of being magnetically coupled to each other, the protection part may be brought into contact with a tip surface, an outer peripheral surface, or a peripheral portion of the protruding part.

The first housing serving as the one housing may include a recessed part forming a recess of a columnar shape in which the first coil member is arranged.

The second housing serving as the other housing may include a protruding part of a columnar shape on which the second coil member is arranged.

The protection part may be provided on a tip surface, an outer peripheral surface, or a peripheral portion of the protruding part.

In a case where the first coil member and the second coil member are in the state of being magnetically coupled to each other, the protection part may be brought into contact with a bottom surface, an inner peripheral surface, or a peripheral portion of the recessed part.

In order to achieve the above-mentioned object, according to an eighth aspect of the present invention, there is provided a wireless connector for wirelessly transmitting, between a first object and a second object, at least one of electric power and information as a to-be-transmitted target, wherein the wireless connector comprises:

a first unit removably attached to the first object from an outside of the first object, and a second unit removably attached to the second object from an outside of the second object, wherein the first unit comprises:

a first transmission/reception part including a first coil member configured to wirelessly transmit the to-be-transmitted target;

a first connector part configured to transmit the to-be-transmitted target to/from the first object by being removably attached to the first object from the outside of the first object; and a first housing to which the first transmission/reception part and the first connector part are fixed, wherein the second unit comprises:

a second transmission/reception part including a second coil member configured to wirelessly transmit the to-be-transmitted target to/from the first transmission/reception part;

a second connector part configured to transmit the to-be-transmitted target to/from the second object by being removably attached to the second object from the outside of the second object; and a second housing to which the second transmission/reception part and the second connector part are fixed, wherein each of the first housing and the second housing has a sealed structure formed of a non-magnetic material;

the first coil member is accommodated inside the first housing; and the second coil member is accommodated inside the second housing; and the first coil member and the second coil member are spaced from and faced to each other in a state of being magnetically coupled to each other.

The wireless connector may further include a protection part comprising a member for preventing intrusion of a foreign matter into a facing space, which is a space between the first coil member and the second coil member in the state of being magnetically coupled to each other, the protection part being provided in at least one housing of the first housing and the second housing so as to close at least a part of a gap continuous to the facing space.

In order to achieve the above-mentioned object, according to a ninth aspect of the present invention, there is provided a wireless connector for wirelessly transmitting, between a first object and a second object, a to-be-transmitted target which is at least one of electric power and information, wherein the wireless connector comprises:
- a first unit removably attached to the first object from an outside of the first object, and
- a second unit removably attached to the second object from an outside of the second object,
- wherein the first unit comprises:
- a first transmission/reception part configured to wirelessly transmit the to-be-transmitted target;
- a first connector part configured to transmit the to-be-transmitted target to/from the first object by being attached to the first object; and
- a first housing to which the first transmission/reception part is fixed and the first connector part is attached,
- wherein the second unit comprises:
- a second transmission/reception part configured to wirelessly transmit the to-be-transmitted target to/from the first transmission/reception part;
- a second connector part configured to transmit the to-be-transmitted target to/from the second object by being attached to the second object; and
- a second housing to which the second transmission/reception part is fixed and the second connector part is attached,
- wherein, when the first unit and the second unit are attached to the first object and the second object, respectively, the first transmission/reception part and the second transmission/reception part are arranged in a state of being spaced from and faced to each other so as to wirelessly transmit the to-be-transmitted target;
- wherein the wireless connector further includes a protection part comprising a member for preventing intrusion of a foreign matter into a facing space, which is a space between the first transmission/reception part and the second transmission/reception part in the state of being faced to each other, the protection part being provided in at least one housing of the first housing and the second housing so as to close at least a part of a gap continuous to the facing space.

The first object and the second object may be connected via a joint mechanism configured to rotatably connect the first object and the second object with a rotation axis as a fulcrum.

The first housing serving as the one housing may include a recessed part forming a recess of a columnar shape in which the first transmission/reception part is arranged, The second housing serving as the other housing may include a protruding part of a columnar shape on which the second transmission/reception part is arranged.

The protection part may be provided on a bottom surface, an inner peripheral surface, or a peripheral portion of the recessed part.

When the first connector part and the second connector part are attached to the first mating connector part and the second mating connector part, respectively, the first transmission/reception part and the second transmission/reception part may be arranged in a state of being spaced from and faced to each other along the rotation axis so as to wirelessly transmit the to-be-transmitted target outside the joint mechanism, and the protruding part and the recessed part may be faced to each other with the protection part brought into contact with a tip surface, an outer peripheral surface, or a peripheral portion of the protruding part.

The first object and the second object may be connected via a joint mechanism configured to rotatably connect the first object and the second object with a rotation axis as a fulcrum.

The first housing serving as the one housing may include a recessed part forming a recess of a columnar shape in which the first transmission/reception part is arranged.

The second housing serving as the other housing may include a protruding part of a columnar shape on which the second transmission/reception part is arranged.

The protection part may be provided on a tip surface, an outer peripheral surface, or a peripheral portion of the protruding part.

When the first connector part and the second connector part are attached to the first mating connector part and the second mating connector part, respectively, the first transmission/reception part and the second transmission/reception part may be arranged in a state of being spaced from and faced to each other along the rotation axis so as to wirelessly transmit the to-be-transmitted target outside the joint mechanism, and the protruding part and the recessed part may be faced to each other with the protection part brought into contact with a bottom surface, an inner peripheral surface, or a peripheral portion of the recessed part.

In order to achieve the above-mentioned object, according to a tenth aspect of the present invention, there is provided a wireless connector for wirelessly transmitting, between a first object and a second object, a to-be-transmitted target which is at least one of electric power and information, wherein the wireless connector comprises:
- a first unit removably attached to the first object from an outside of the first object, and
- a second unit removably attached to the second object from an outside of the second object,
- wherein the first unit comprises:
- a first transmission/reception part configured to wirelessly transmit the to-be-transmitted target;
- a first connector part configured to transmit the to-be-transmitted target to/from the first object by being attached to the first object; and
- a first housing to which the first transmission/reception part is fixed and the first connector part is attached,
- wherein the second unit comprises:
- a second transmission/reception part configured to wirelessly transmit the to-be-transmitted target to/from the first transmission/reception part;
- a second connector part configured to transmit the to-be-transmitted target to/from the second object by being attached to the second object; and
- a second housing to which the second transmission/reception part is fixed and the second connector part is attached,
- wherein each of the first housing and the second housing has a sealed structure formed of a non-magnetic material;

the first transmission/reception part is accommodated inside the first housing; and the second transmission/reception part is accommodated inside the second housing;

wherein, when the first unit and the second unit are attached to the first object and the second object, respectively, the first transmission/reception part and the second transmission/reception part are arranged in a state of being spaced from and faced to each other so as to wirelessly transmit the to-be-transmitted target.

The wireless connector may further include a protection part comprising a member for preventing intrusion of a foreign matter into a facing space, which is a space between the first transmission/reception part and the second transmission/reception part in the state of being faced to each other, the protection part being provided in at least one housing of the first housing and the second housing so as to close at least a part of a gap continuous to the facing space.

The first object and the second object may be rotatably connected with a rotation axis as a fulcrum.

When the first unit and the second unit are attached to the first object and the second object, respectively, the first transmission/reception part and the second transmission/reception part may be arranged in a state of being spaced from and faced to each other along the rotation axis.

The first unit and the second unit may be spaced from each other when the first unit and the second unit are attached to the first object and the second object, respectively.

Effect of the Invention

According to the present invention, the wireless connector can easily be repaired.

MODE FOR CARRYING OUT THE INVENTION

Figure 1:
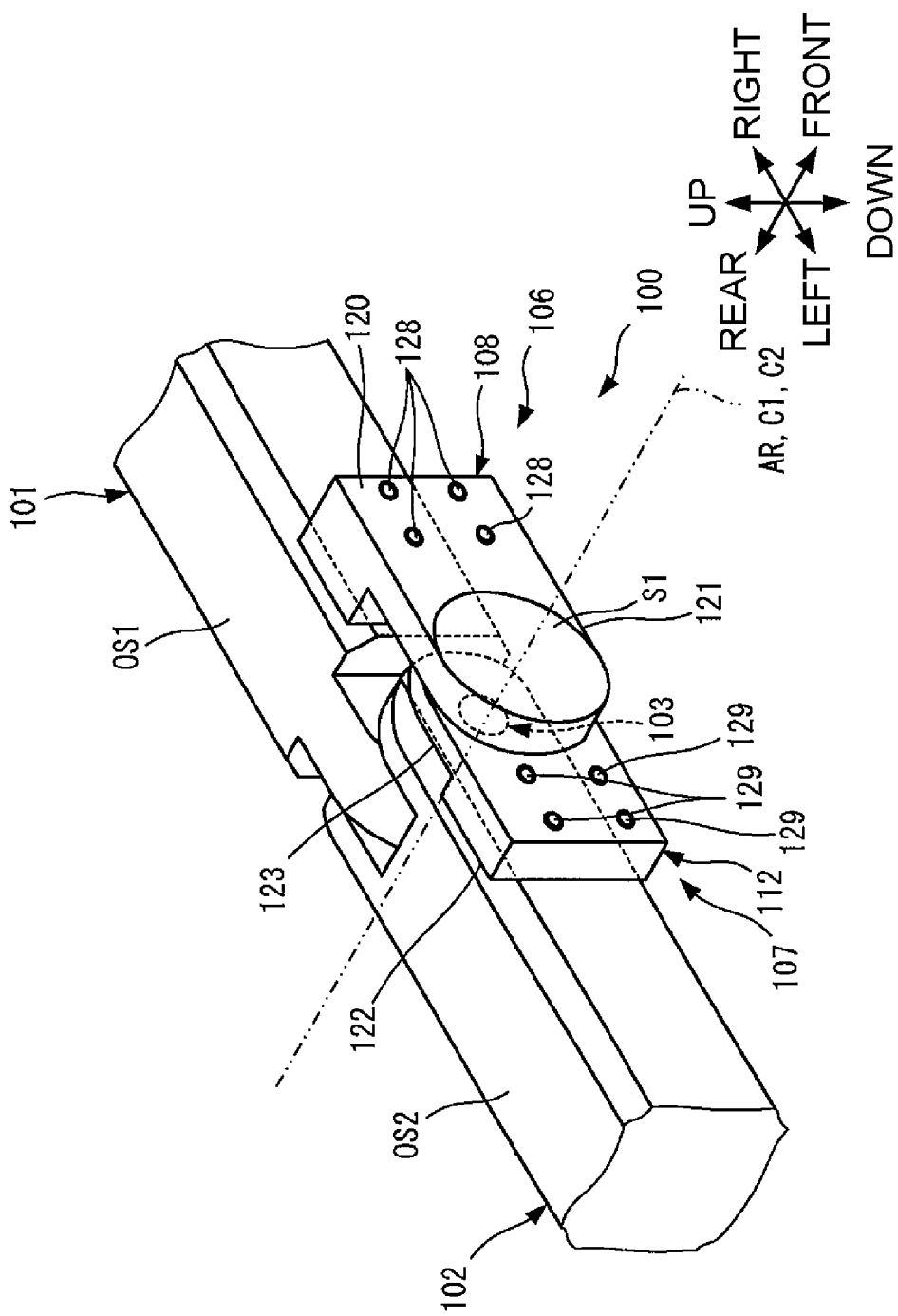
FIG. 1 is a perspective view of a wireless connector attached to a first arm part and a second arm part according to a first embodiment of the present invention.

Hereinafter, wireless connectors according to embodiments of the present invention will be described with reference to the drawings. Throughout all drawing figures, the same elements are assigned with the same reference numerals.

First Embodiment (Configuration of Wireless Connector 100 According to First Embodiment)

Figure 2:
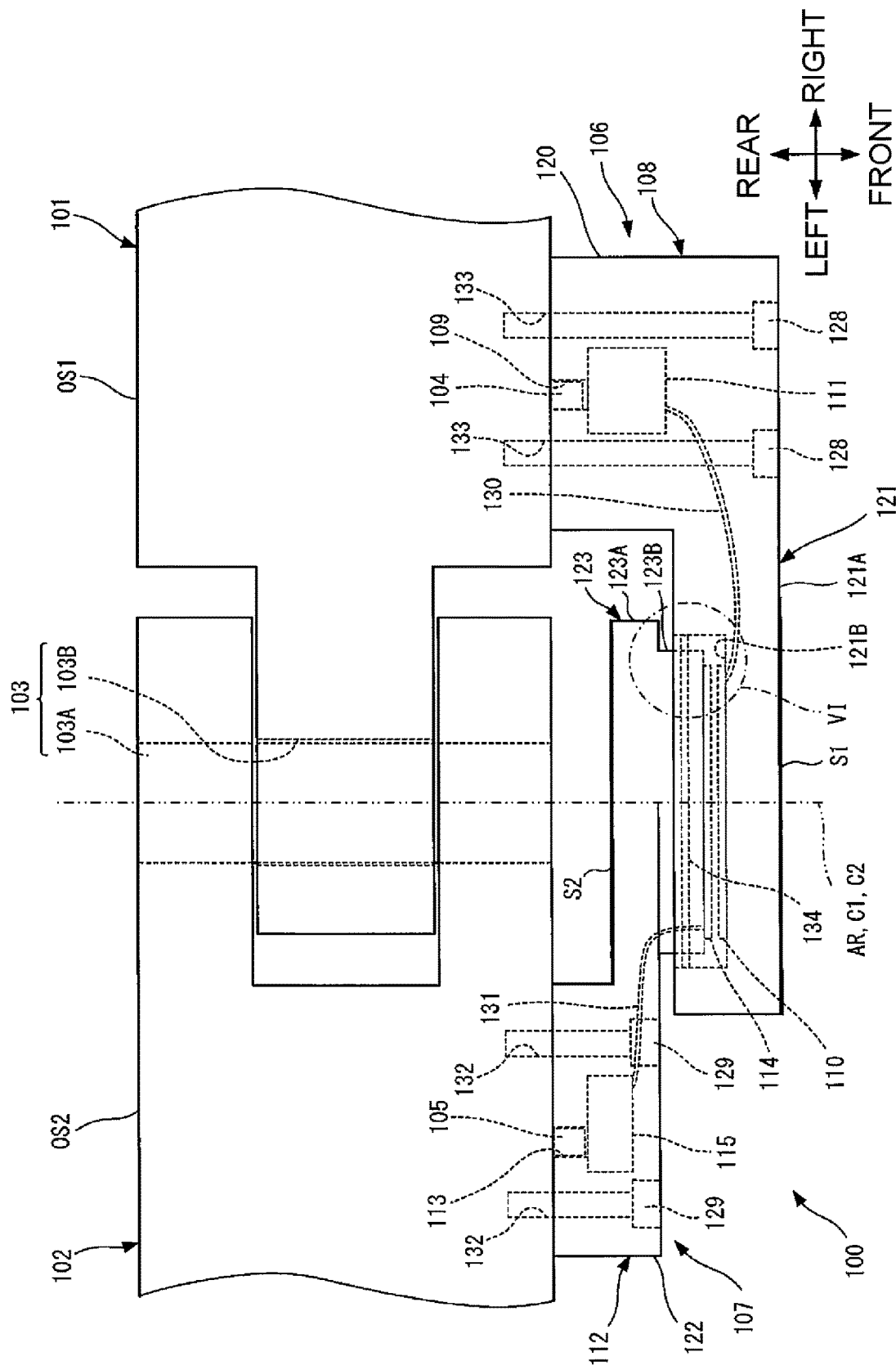
FIG. 2 is a view of the wireless connector attached to the first arm part and the second arm part illustrated in FIG. 1, as viewed from above.
Figure 3:
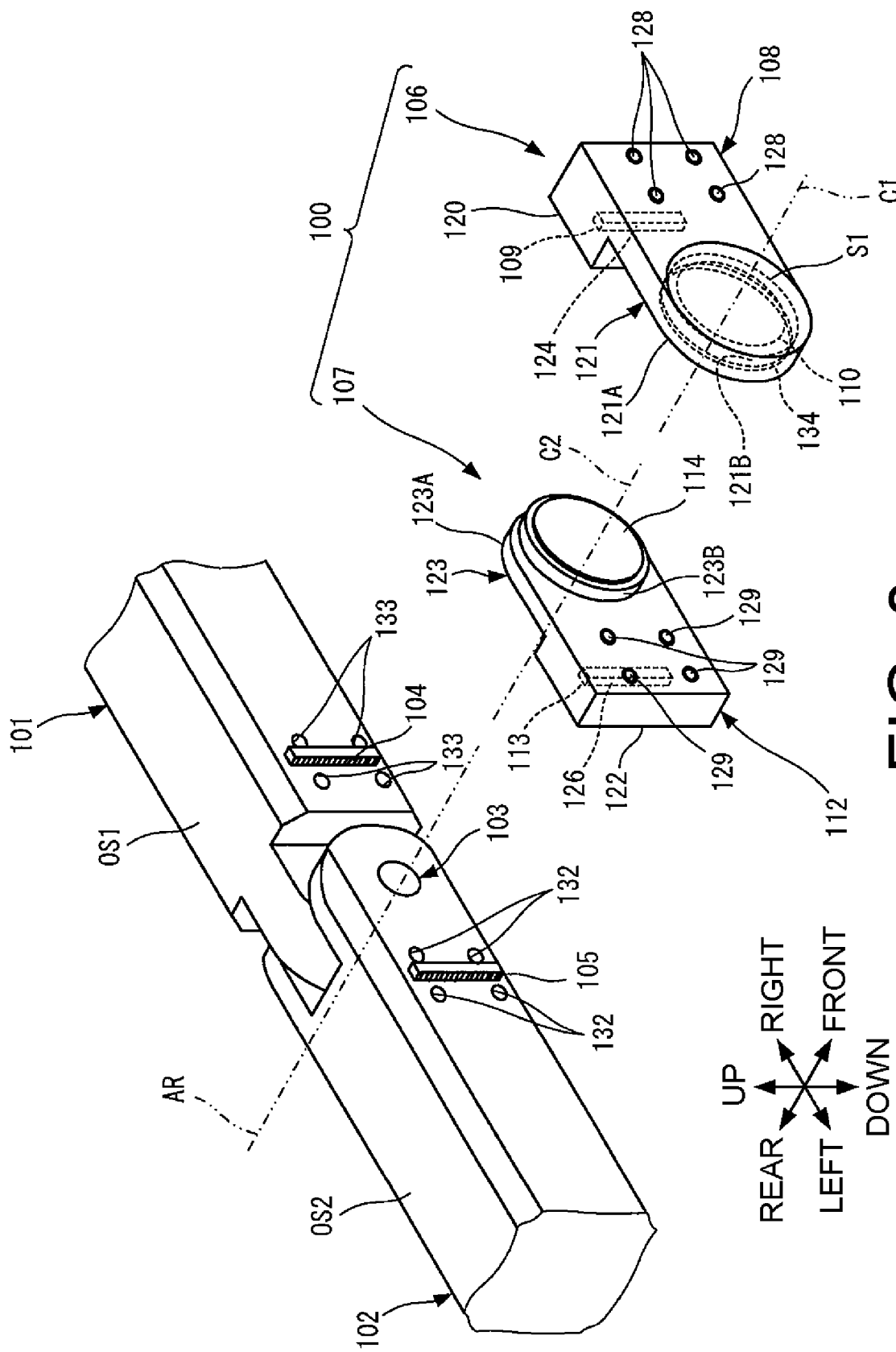
FIG. 3 is an exploded perspective view of the first arm part, the second arm part, and the wireless connector illustrated in FIG. 1.

A wireless connector 100 according to a first embodiment of the present invention is a connector for wirelessly transmitting electric power between a first arm part 101 and a second arm part 102 as shown in a perspective view of FIG. 1, a plan view of FIG. 2, and an exploded perspective view of FIG. 3. The wireless connector 100 is removably attached to an outside of the first arm part 101 and the second arm part 102. In the first embodiment, an example in which electric power is transmitted wirelessly by magnetic field coupling (in detail, electromagnetic induction) will be described. The first arm part 101 may be called a first object while the second arm part may be called a second object.

An arm assembly (101, 102) is connected via a joint mechanism 103 in a robot device such as an industrial robot and a humanoid robot. Here, the "arm assembly (101, 102)" is a generic term (assembly parts) including the first arm part 101 and the second arm part 102. The same applies also in the following. The first arm part 101 and the second arm part 102 are covered with a first outer shell OS1 and a second outer shell OS2, respectively Therefore, a mechanism and wiring inside the first arm part 101 and the second arm part 102 are not exposed.

The joint mechanism 103 is a mechanism for connecting the first arm part 101 and the second arm part 102 so that they are rotatable with a rotation axis AR as a fulcrum. Thus, the first arm part 101 and the second arm part 102 are connected to be bendable and stretchable.

For example, the joint mechanism 103 according to the first embodiment is provided with a shaft part 103A fixed to the second arm part 102 and a hole part 103B formed in the first arm part 101. The joint mechanism 103 is configured so that the shaft part 103A and the hole part 103B are fitted to each other. The joint mechanism 103 connects the first arm part 101 and the second arm part 102 so that they are rotatable around a shaft center of the shaft part 103A as the rotation axis AR.

Any one of the first arm part 101 and the second arm part 102 may be a power supply side. In the first embodiment, an example in which the first arm part 101 is the power supply side while the second arm part 102 is a load side will be described.

For example, it is assumed that the first arm part 101 and the second arm part 102 are included in the industrial robot. In this case, another member (another arm part, a base, or the like) is connected to a first end portion (not shown) of the first arm part 101 on one side opposite to the joint mechanism 103. Further, another member (another arm part, a hand part for holding a component, or the like) is connected to a second end portion (not shown) of the second arm part 102 on the other side opposite to the joint mechanism 103.

A load comprises, for example, an actuator, a control circuit, and the like, which are mounted to the second arm part 102 and another member connected thereto. The load may include a motor provided in the joint mechanism 103 to rotate the first arm part 101 and the second arm part 102.

In the following description, terms indicating upward, downward, frontward, rearward, rightward and leftward directions are used as defined in a state where the arm assembly (101,102) with the wireless connector 100 attached thereto is extended straight (i.e., in a state where it is not bent).

Specifically, a direction along the rotation axis AR is defined as a back-and-forth direction, and a direction along the arm assembly (101, 102) extended straight is defined as a right-and-left direction. In addition, a direction in which parts (a first transmission/reception part 110 and a second transmission/reception part 114, which will later be described) facing each other in order to wirelessly transmit electric power in the wireless connector 100 are positioned with respect to the arm assembly (101, 102) is defined as a front side, and a direction opposite thereto is defined as a rear side. Each of the upward, the downward, the leftward, and the rightward directions is defined according to a direction viewed from the front side. The back-and-forth direction may be called a first direction or a thickness direction, the right-and-left direction may be called a second direction, a transverse direction, or an extending direction, and an up-and-down direction may be called a third direction or a height direction. The first through the third directions are perpendicular to one another and define an orthogonal coordinate system. In the example being illustrated, the first arm part 101 is arranged in the rightward direction with respect to the rotation axis AR and the second arm part 102 is arranged in the leftward direction with respect to the rotation axis AR.

It is to be noted that those terms indicating the directions are used for the purpose of explanation and are not intended to limit the present invention.

The first arm part 101 and the second arm part 102 include a first mating connector part 104 and a second mating connector part 105, respectively. Each of the first mating connector part 104 and the second mating connector part 105 is a connector for transmitting electric power to/from the wireless connector 100. The first mating connector part 104 and the second mating connector part 105 are provided in the first arm part 101 and the second arm part 102, respectively, to be exposed to the outside.

Each of the first mating connector part 104 and the second mating connector part 105 according to the first embodiment is an electric connector of a male type including a plurality of electric contacts arranged at intervals in the up-and-down direction (third direction).

Specifically, the first mating connector part 104 is provided on the right side with respect to the rotation axis AR, and protrudes forward from a front surface of the first outer shell OS1 of the first arm part 101. On the other hand, the second mating connector part 105 is provided on the left side with respect to the rotation axis AR, and protrudes forward from a front surface of the second outer shell OS2 of the second arm part 102.

As shown in FIGS. 1 to 3, the wireless connector 100 includes a first unit 106 and a second unit 107 which are removably attached to the first arm part 101 and the second arm part 102, respectively, from the outside.

The first unit 106 and the second unit 107 are configured to be separable. When the first unit 106 and the second unit 107 are attached to the first arm part 101 and the second arm part 102, respectively, the first unit 106 and the second unit 107 can be rotated relative to each other around the rotation axis AR.

Figure 4:
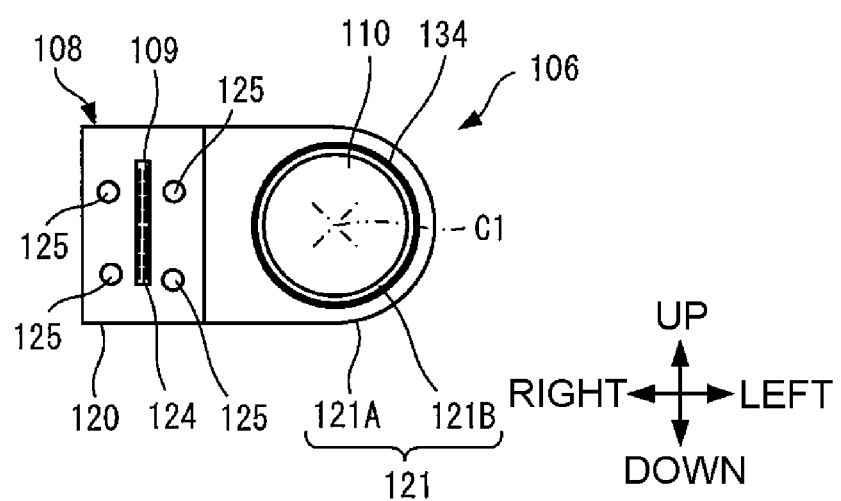
FIG. 4 is a view of a first unit used in the wireless connector illustrated in FIG. 1, as viewed from the rear.

As shown in FIGS. 1 to 3 and FIG. 4 as viewed from the rear, the first unit 106 includes a first housing 108, a first connector part 109, the first transmission/reception part 110, a first circuit part 111, and a protection part 134. In FIG. 4, first bolts 128 to be described later are not illustrated.

Figure 5A:
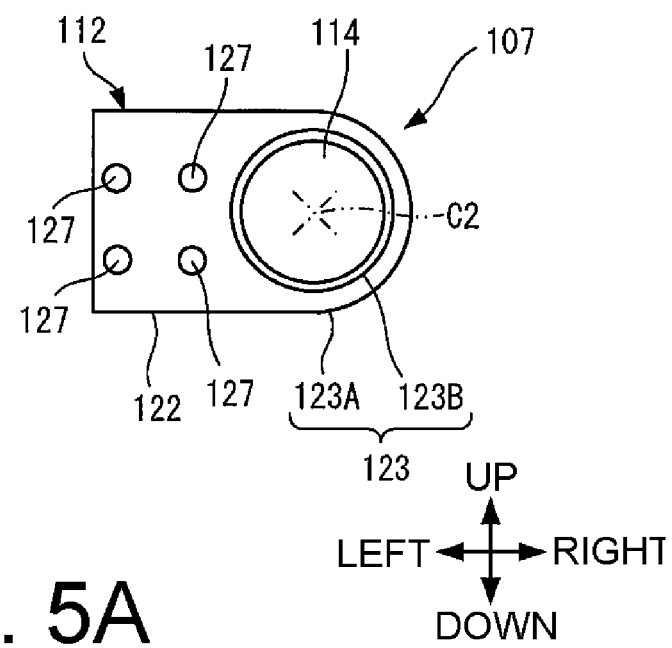
FIG. 5A is a view of a second unit used in the wireless connector illustrated in FIG. 1, as viewed from the front.
Figure 5B:
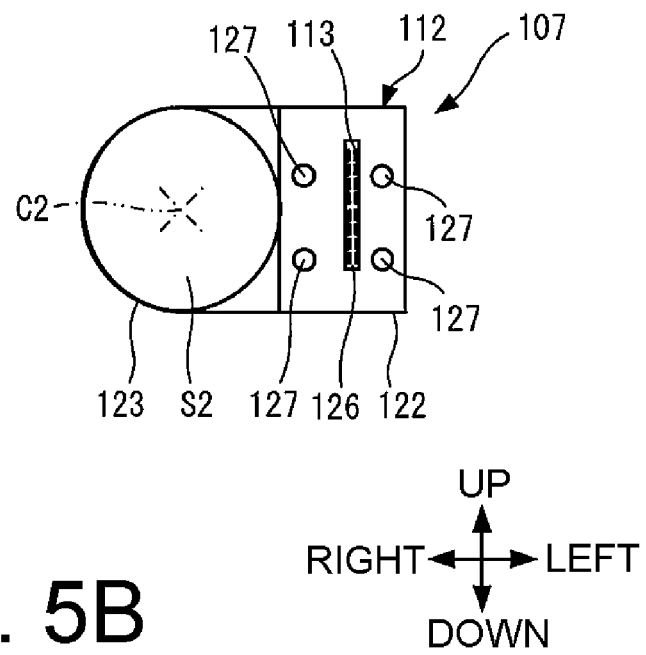
FIG. 5B is a view of the second unit illustrated in FIG. 5A, as viewed from the rear.

As shown in FIGS. 1 to 3 and FIGS. 5A and 5B, the second unit 107 includes components 112 to 115 corresponding to the components 108 to 111 included in the first unit 106, respectively. Specifically, the second unit 107 includes a second housing 112, a second connector part 113, the second transmission/reception part 114, and a second circuit part 115. In FIGS. 5A and 5B, the second unit 107 is viewed from the front and the rear, respectively, and second bolts 129 to be described later are not shown in these figures.

The first housing 108 is a hollow member to which the other components 109 to 111 included in the first unit 106 are attached, and is typically made of a non-magnetic material such as resin. Similarly, the second housing 112 is a hollow member to which the other components 113 to 115 included in the second unit 107 are attached, and is typically made of a non-magnetic material such as resin.

The first housing 108 according to the first embodiment includes a first arm mounting part 120 for attaching the first unit 106 to the first arm part 101, and a first facing part 121. Similarly, the second housing 112 includes a second arm mounting part 122 for attaching the second unit 107 to the second arm part 102, and a second facing part 123. The second facing part 123 is disposed in a state of being spaced from and faced to the first facing part 121 along the rotation axis AR.

Each of the first arm mounting part 120 and the second arm mounting part 122 forms a substantially rectangular parallelepiped outer shape. The first arm mounting part 120 and the second arm mounting part 122 have substantially the same size except for a length in the back-and-forth direction (first direction). The length in the back-and-forth direction (first direction) of the first arm mounting part 120 is longer than that of the second arm mounting part 122.

Specifically, the first arm mounting part 120 includes a first opening 124 and four first bolt holes 125, as shown in FIG. 4. The second arm mounting part 122 includes a second opening 126 and four second bolt holes 127, as shown in FIG. 5.

The first opening 124 is provided in a rear wall portion so as to connect a space inside the first arm mounting part 120 to the outside. Similarly, the second opening 126 is provided in the rear wall portion so as to connect a space inside the second arm mounting part 122 to the outside. The first connector part 109 which will later be described in detail is provided on an inner side (front side) of the first opening 124. Similarly, the second connector part 113 which will later be described in detail is provided on an inner side (front side) of the second opening 126.

It is desirable that the first housing 108 has a sealed structure enough to inhibit passage of a liquid except at the first opening 124 for fitting to the first mating connector part 104. Similarly, it is desirable that the second housing 112 has a sealed structure enough to inhibit passage of the liquid except at the second opening 126 for fitting to the second mating connector part 105.

Each of the four first bolt holes 125 and the four second bolt holes 127 is a through hole extending in the back-and-forth direction (first direction). The four first bolts 128 for fixing the first housing 108 to the first arm part 101 are arranged in the four first bolt holes 125 in a penetrated state. Similarly, the four second bolts 129 for fixing the second housing 112 to the second arm part 102 are arranged in the four second bolt holes 127 in a penetrated state.

As shown in FIGS. 2 to 5, for example, the first facing part 121 and the second facing part 123 are parts whose respective base ends are connected to a left end of the first arm mounting part 120 and a right end of the second arm mounting part 122, respectively, and which extend in mutually approaching directions with respect to the back-and-forth direction (first direction) as viewed from the front. Thus, the first facing part 121 and the second facing part 123 are spaced from each other along the rotation axis AR and faced to each other in the back-and-forth direction (first direction).

Specifically, the first facing part 121 has a right end which is the base end connected to the left end of the first arm mounting part 120. The first facing part 121 includes a first flat-plate part 121A and a recessed part 121B.

The first flat-plate part 121A is a part of a flat-plate shape connected to the first arm mounting part 120 and extending leftward and has a front surface flush with a front surface of the first arm mounting part 120. The first flat-plate part 121A has a constant height substantially same as a height of the first arm mounting part 120, and has a tip forming a semicircular shape protruding leftward when viewed from the front. Here, the "height" is the length in the up-and-down direction (third direction). The same applies also in the following.

The recessed part 121B is a part forming a columnar recess in the vicinity of a left end of a rear surface of the first flat-plate part 121A. The recessed part 121B includes a circular flat bottom surface having a center through which a first central axis C1 passes, and an inner peripheral surface extending rearward from an outer edge of the bottom surface.

Here, the "vicinity" means a reference position or a position or a region spaced by a predetermined distance from the reference position. The same applies also in the following. For example, the vicinity of the left end of the rear surface of the first flat-plate part 121A is a position or a region spaced by a predetermined distance from the left end of the rear surface.

The second facing part 123 has a left end which is the base end connected to the right end of the second arm mounting part 122. The second facing part 123 includes a second flat-plate part 123A and a protruding part 123B.

The second flat-plate part 123A is a part of a flat-plat shape connected to the second arm mounting part 122 and extending rightward and has a front surface flush with a front surface of the second arm mounting part 122. The second flat-plate part 123A has a constant height substantially same as a height of the second arm mounting part 122, and has a tip forming a semicircular shape protruding rightward when viewed from the front.

The protruding part 123B is a part of a columnar shape protruding forward in the vicinity of a right end of the front surface of the second flat-plate part 123A. The protruding part 123B includes a circular flat tip surface having a center through which a second central axis C2 passes, and an outer peripheral surface extending rearward from an outer edge of the tip surface.

The first flat-plate part 121A has a thickness which is thinner than a difference between a thickness of the first arm mounting part 120 and a thickness of the second arm mounting part 122. Thus, the first flat-plate part 121A has a tip which is arranged in front of the second flat-plate part 123A with a space left therefrom. By fitting the protruding part 123B to the recessed part 121B with a predetermined gap left therebetween, the tip surface of the protruding part 123B and the bottom surface of the recessed part 121B are arranged in a state of being spaced from and faced to each other along the rotation axis AR outside the joint mechanism 103. The second flat-plate part 123A has a thickness which may be set as appropriate but is thinner than that of the second arm mounting part 122 and which is substantially same as the thickness of the first flat-plate part 121A in the present embodiment. Here, the "thickness" is the length in the back-and-forth direction (first direction). The same applies also in the following.

In the first embodiment, a case where the protruding part 123B is provided in the second facing part 123 disposed near the arm assembly (101, 102) while the recessed part 121B is provided in the first facing part 121 disposed away from the arm assembly (101, 102) will be described by way of example, and vice versa. That is, the recessed part 121B may be provided in one of the first facing part 121 and the second facing part 123 which is disposed near the arm assembly (101, 102) while the protruding part 123B may be provided in one of them which is disposed away from the arm assembly (101, 102).

The first connector part 109 is a part for transmitting electric power to/from the first arm part 101. The first connector part 109 is removably attached to the first arm part 101 from the outside of the first arm part 101. The first connector part 109 is attached to the first mating connector part 104, thereby transmitting electric power to/from the first arm part 101.

The first connector part 109 according to the first embodiment is an electric connector of a female type fixed to the first housing 108, and includes a plurality of electric contacts arranged at intervals in the up-and-down direction (third direction) in front of the first opening 124. As a result, the first connector part 109 is exposed to an outside of the first housing 108 through the first opening 124, so that the first connector part 109 and the first mating connector part 104 inserted through the first opening 124 from the rear of the first housing 108 are fitted to each other in the back-and-forth direction (first direction). The first connector part 109 and the first mating connector part 104 fitted to each other are electrically connected to each other by bringing their respective electric contacts into contact with each other, so that electric power can be transmitted. Therefore, the back-and-forth direction (first direction) is a fitting direction of the first connector part 109.

The relationship between the female type and the male type of the first connector part 109 and the first mating connector part 104 may be replaced. The first mating connector part 104, also in case of being the female type, only has to be exposed to the outside of the first arm part 101, whereby the first connector part 109 can removably be attached from the outside of the first arm part 101. Specifically, for example, an opening may be provided in the first outer shell OS1 of the first arm part 101, and the electric contacts constituting the first mating connector part 104 may be provided inside the opening.

The second connector part 113 is a part for transmitting electric power to/from the second arm part 102. The second connector part 113 is removably attached to the second arm part 102 from the outside of the second arm part 102. The second connector part 113 is attached to the second mating connector part 105, thereby transmitting electric power to/from the second arm part 102.

The second connector part 113 according to the first embodiment is an electric connector of the female type fixed to the second housing 112, and includes a plurality of electric contacts arranged at intervals in the up-and-down direction (third direction) in front of the second opening 126. As a result, the second connector part 113 is exposed to an outside of the second housing 112 through the second opening 126, so that the second connector part 113 and the second mating connector part 105 inserted through the second opening 126 from the rear of the second housing 112 are fitted to each other in the back-and-forth direction (first direction). The second connector part 113 and the second mating connector part 105 fitted to each other are electrically connected to each other by bringing their respective electric contacts into contact with each other, so that electric power can be transmitted. Therefore, the back-and-forth direction (first direction) is a fitting direction of the second connector part 113. Accordingly, the first connector part 109 and the second connector part 113 have the same fitting direction.

The relationship between the female type and the male type of the second connector part 113 and the second mating connector part 105 may be replaced. The second mating connector part 105, also in case of the female type, only has to be exposed to the outside of the second arm part 102, whereby the second connector part 113 can removably be attached from the outside of the second arm part 102. Specifically, for example, an opening may be provided in the second outer shell OS2 of the second arm part 102, and the electric contacts constituting the second mating connector part 105 may be provided inside the opening.

The first transmission/reception part 110 and the second transmission/reception part 114 are members for wirelessly transmitting electric power (AC power) therebetween, and are disposed in a state of being spaced from and faced to each other along the rotation axis AR outside the joint mechanism 103 so as to wirelessly transmit electric power (AC power). Typically, the first transmission/reception part 110 and the second transmission/reception part 114 have a shape centered on the first central axis C1 and the second central axis C2, respectively, for example, a disc shape.

In the first embodiment, the first transmission/reception part 110 is fixed to the bottom surface of the recessed part 121B by a fixing member, for example, an adhesive, a screw or the like. The second transmission/reception part 114 is fixed to the tip surface of the protruding part 123B by a fixing member, for example, an adhesive, a screw, or the like. As a result, the first transmission/reception part 110 and the second transmission/reception part 114 are fixed to regions facing each other along the rotation axis AR (first central axis C1 and second central axis C2) of the first facing part 121 and the second facing part 123, respectively.

Therefore, the first transmission/reception part 110 and the second transmission/reception part 114 are arranged so as to face each other along the rotation axis AR (first central axis C1 and second central axis C2) outside the joint mechanism 103. The first transmission/reception part 110 and the second transmission/reception part 114 are arranged in the state of being spaced from each other without coming into contact with each other. Preferably, the first transmission/reception part 110 and the second transmission/reception part 114 are arranged to be in parallel with each other with their surfaces (facing surfaces) perpendicular to the rotation axis AR being faced to each other.

The first transmission/reception part 110 and the second transmission/reception part 114 according to the first embodiment comprise a first coil member and a second coil member, respectively, which are disc-shaped and substantially same in size. That is, the first coil member has a disc-like outer shape centered on the first central axis C1. The second coil member has a disc-like outer shape centered on the second central axis C2.

The first coil member may be constituted of, for example, a lead wire spirally wound around the first central axis C1, a printed wiring spirally printed on a substrate around the first central axis C1, or the like. Similarly, the second coil member may be constituted of, for example, a lead wire spirally wound around the second central axis C2, a printed wiring spirally printed on a substrate around the second central axis C2, or the like.

Since the first coil member and the second coil member are arranged in a state of facing each other along the rotation axis AR (first central axis C1 and second central axis C2), they are magnetically coupled by electromagnetic induction. Thus, electric power (AC power) can wirelessly be transmitted between the first coil member and the second coil member.

Here, in order to strengthen the coupling (magnetic field coupling in the first embodiment) between the first transmission/reception part 110 and the second transmission/reception part 114, areas (facing areas) of the regions facing each other are desirably large, and the rotation axis AR, the first central axis C1, and the second central axis C2 are desirably coincident. However, it is only necessary that the first transmission/reception part 110 and the second transmission/reception part 114 are arranged in the state of being faced to each other along the rotation axis AR so as to transmit electric power (AC power) (so as to cause magnetic field coupling in the first embodiment) and the rotation axis AR, the first central axis C1, and the second central axis C2 may be misaligned due to a manufacturing error, a design constraint, or the like.

In the first embodiment, a first sheet-like shield members S1 and a second sheet-like shield member S2, each of which is made of a metal, a soft magnetic material, or the like, are provided in front of the first transmission/reception part 110 and at the rear of the second transmission/reception part 114, respectively. As a result, the first transmission/reception part 110 and the second transmission/reception part 114 are sandwiched by the first and the second shield members S1 and S2 along the rotation axis AR, so that electromagnetic waves emitted from the wireless connector 100 to the outside can be suppressed.

The first transmission/reception part 110 may further include a capacitor or the like connected in series or in parallel with the first coil member, and may further include a resin case in which the first coil member or the like is accommodated. Similarly, the second transmission/reception part 114 may further include a capacitor or the like connected in series or in parallel with the second coil member, and may further include a resin case in which the second coil member or the like is accommodated.

The protection part 134 comprises an annular elastic member for preventing intrusion of a foreign matter into a facing space, and is provided so as to close at least a part of a gap continuous to the facing space which is a space between the first transmission/reception part 110 and the second transmission/reception part 114 in the state of being faced to each other. The protection part 134 according to the first embodiment comprises an oil seal and closes the gap continuous to the facing space at a sealing degree enough to inhibit passage of a liquid (i.e., in a liquid-tight state).

The protection part 134 may be provided so as to close a part or a whole of the gap continuous to a facing space where the facing space is a space between the first coil member included in the first transmission/reception part 110 and the second coil member included in the second transmission/reception part 114.

Figure 6:
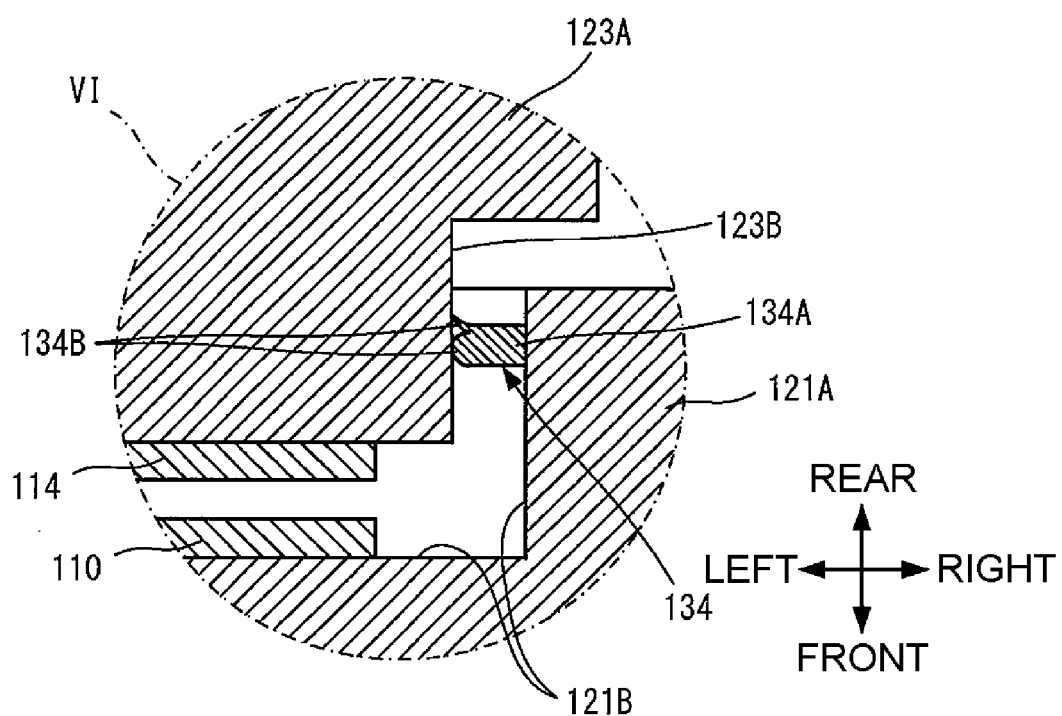
FIG. 6 is an enlarged sectional view of a portion surrounded by a dash-dot-dash line VI in FIG. 2.

As shown in FIG. 6, the protection part 134 includes a fixed part 134A and a contacting part 134B and is integrally formed by, for example, an elastic member such as rubber. FIG. 6 is an enlarged view showing, in a section of the wireless connector 100 at an approximate center in the up-and-down direction (third direction), a portion surrounded by a dash-dot-dash line IV in FIG. 2.

The fixed part 134A of the protection part 134 forms an annular shape centered on the first central axis C1, and its outer peripheral surface is fixed to the inner peripheral surface of the recessed part 121B of the first facing part 121 by an adhesive or the like.

The contacting part 134B of the protection part 134 has a base end connected to the fixed part 134A, and a tip pressed against the outer peripheral surface of the protruding part 123B of the second facing part 123, so that the contacting part 134B is annularly and continuously brought into contact with the outer peripheral surface. In detail, the contacting part 134B of the protection part 134 is pressed against the outer peripheral surface of the protruding part 123B of the second facing part 123 with a strength sufficient to prevent a liquid, dust or the like from entering into the facing space, so that the facing space is sealed to prevent the foreign matter from entering the facing space.

In the first embodiment, as shown in FIG. 6, the contacting part 134B of the protection part 134 is in contact with the outer peripheral surface of the protruding part 123B of the second facing part 123 at two positions. However, the contacting part 134B of the protection part 134 may be in contact with the outer peripheral surface of the protruding part 123B of the second facing part 123 at one position only or at three or more positions.

The first unit 106 and the second unit 107 according to the first embodiment are in contact with each other only at the protection part 134 and, except at the protection part 134, are spaced from each other without coming into contact with each other.

Referring to FIG. 2, the first circuit part 111 is an electric circuit electrically connected to the first connector part 109 and the first transmission/reception part 110. The first circuit part 111 is fixed inside the first housing 108 while being electrically connected to each of the first connector part 109 and the first transmission/reception part 110.

In the first embodiment, the first circuit part 111 is fixed to a front end of the first connector part 109, and the first circuit part 111 and the first transmission/reception part 110 are electrically connected to each other via a first lead wire 130.

In the first embodiment, as described above, the first arm part 101 is a power supply side. Therefore, the first circuit part 111 comprises a power transmission circuit and includes, for example, an inverter circuit for converting input electric power (DC power) supplied from the first arm part 101 through the first connector part 109 into output electric power (AC power) to be output to the first transmission/reception part 110.

The second circuit part 115 is an electric circuit electrically connected to the second connector part 113 and the second transmission/reception part 114. The second circuit part 115 is fixed inside the second housing 112 while being electrically connected to each of the second connector part 113 and the second transmission/reception part 114.

In the first embodiment, the second circuit part 115 is fixed to a front end of the second connector part 113, and the second circuit part 115 and the second transmission/reception part 114 are electrically connected to each other via a second lead wire 131.

In the first embodiment, as described above, the second arm part 102 is a load side. Therefore, the second circuit part 115 comprises a power reception circuit and includes, for example, a rectifying/smoothing circuit for converting input electric power (AC power) received by the second transmission/reception part 114 magnetically coupled to the first transmission/reception part 110 into output electric power (DC power) to be output to the second arm part 102 through the second connector part 113.

Hereinbefore, the configuration of the wireless connector 100 according to the first embodiment of the present invention has been described.

In general, when the first unit 106 and the second unit 107 are attached to the arm assembly (101, 102), there is a possibility that a designed rotation axis (for example, an axis coinciding with the first central axis C1 and the second central axis C2) does not coincide with the rotation axis AR due to a manufacturing error or the like. As described above, except at the protection part 134, the first unit 106 and the second unit 107 according to the first embodiment are spaced from each other without coming into contact with each other and the protection part 134 as a part of mutual contact has an elasticity. Therefore, even if the designed rotation axis is slightly misaligned with the rotation axis AR, the first unit 106 and the second unit 107 can be rotated around the rotation axis AR in accordance with bending of the arm assembly (101, 102).

(Operation of Wireless Connector 100 According to First Embodiment)

Hereinafter, the operation of the wireless connector 100 according to the first embodiment will be described with reference to the circuit configuration diagram of FIG. 7.

Figure 7:
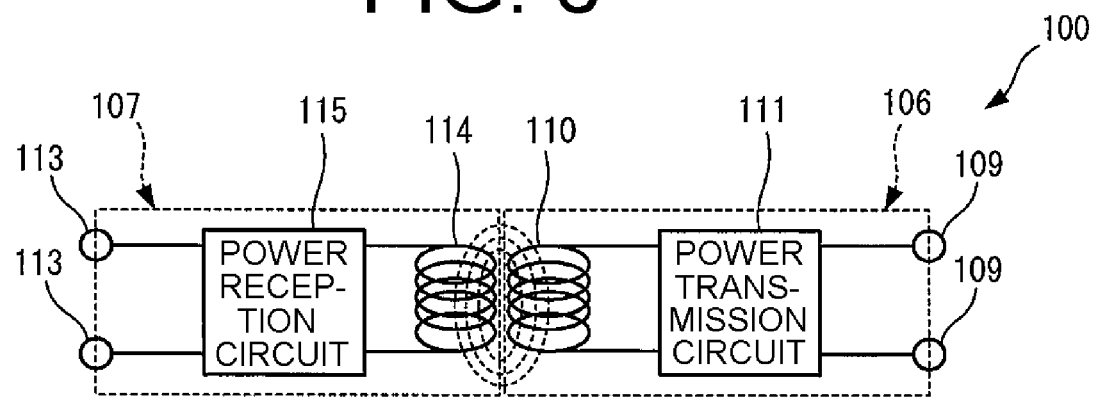
FIG. 7 is a view showing a circuit configuration of the wireless connector illustrated in FIG. 1.

Electric power (DC power) supplied from the first arm part 101 (power supply side) is converted into the AC power through the first connector part 109 and the first circuit part (power transmission circuit) 111 and supplied to the first transmission/reception part 110, as shown in FIG. 7. Thus, an AC current flows through the first transmission/reception part 110, and an AC magnetic field is generated around the first transmission/reception part 110.

The first transmission/reception part 110 and the second transmission/reception part 114 are arranged in the state of being spaced from and faced to each other along the rotation axis AR, as described above. Therefore, the first transmission/reception part 110 and the second transmission/reception part 114 are magnetically coupled, and an induced electromotive force corresponding to the magnetic field generated around the first transmission/reception part 110 is generated in the second transmission/reception part 114. That is, in the first embodiment, the first coil member constituting the first transmission/reception part 110 functions as a power transmission coil while the second coil member constituting the second transmission/reception part 114 functions as a power reception coil.

Electric power (AC power) generated in the second transmission/reception part 114 is converted into the DC power through the second circuit part (power reception circuit) 115 and the second connector part 113 and supplied to the second arm part 102 (load side). Thus, electric power can be transmitted wirelessly between the first arm part 101 and the second arm part 102 by the wireless connector 100.

In the first embodiment, as described above, the arm assembly (101, 102) is bent and stretched by rotating around the rotation axis AR and, in accordance therewith, the first unit 106 and the second unit 107 rotate around the rotation axis AR.

Since a transmission/reception assembly (110, 114) is arranged in the state of being spaced from and faced to each other along the rotation axis AR, magnetic field coupling is performed by electromagnetic induction even when the first unit 106 and the second unit 107 are rotated. Therefore, regardless of a bending/stretching state of the arm assembly (101, 102) and even if the arm assembly (101, 102) is during a bending/stretching operation, the wireless connector 100 can operate similarly to the above-described operation, so that electric power can wirelessly be transmitted between the first arm part 101 and the second arm part 102. Here, the "transmission/reception assembly (110, 114)" is a generic term (assembly parts) including the first transmission/reception part 110 and the second transmission/reception part 114. The same applies also in the following.

In the first embodiment, the protruding part 123B of the second facing part 123 is fitted to the recessed part 121B of the first facing part 121. Therefore, the transmission/reception assembly (110, 114) is arranged in a state where the relative movement is restricted. That is, the transmission/reception assembly (110, 114) is arranged so that the relative positional relationship is limited within a predetermined range even when it is rotated around the rotation axis AR.

Here, the relative positional relationship of the transmission/reception assembly (110, 114) is a distance (separation distance) at which the first transmission/reception part 110 and the second transmission/reception part 114 are spaced from each other along the rotation axis AR, the areas (facing areas) of the regions facing each other, an angle with respect to the rotation axis AR, and so on. In the first embodiment, the first transmission/reception part 110 and the second transmission/reception part 114 are arranged in parallel to each other. This is one example of the arrangement in the state where the relative positional relationship is restricted.

By restricting the relative positional relationship of the transmission/reception assembly (110, 114), the first transmission/reception part 110 and the second transmission/reception part 114 can magnetically be coupled at a relatively stable strength in a predetermined range regardless of the bending/stretching state and the bending/stretching operation of the arm assembly (101, 102). Therefore, even when the wireless connector 100 is arranged outside the arm assembly (101, 102), stable wireless power transmission can be performed.

Furthermore, in the first embodiment, the protection part 134 surrounding the facing space is provided. The contacting part 134B of the protection part 134 is brought into contact with the outer peripheral surface of the protruding part 123B of the second facing part 123, so that the gap continuous to the facing space is closed. Even during the bending/stretching operation of the arm assembly (101, 102), the contacting part 134B of the protection part 134 maintains a state of being in contact with the outer peripheral surface of the protruding part 123B of the second facing part 123. That is, during the bending/stretching operation of the arm assembly (101, 102), the protruding part 123B of the second facing part 123 rotates around the rotation axis AR with respect to the protection part 134 in a state where the outer peripheral surface is in contact with the contacting part 134B of the protection part 134. Therefore, intrusion of a foreign matter into the facing space can be prevented regardless of the bending/stretching state and the bending/stretching operation of the arm assembly (101, 102).

For example, when a small piece enters the facing space as a foreign matter, the foreign matter may possibly be caught between the first housing 108 and the second housing 112. As an example of the small piece, a metal piece is conceivable when the wireless connector 100 is used in an industrial robot device operating indoors. When the wireless connector 100 is used in a robot device operating outdoors, gravel and pebbles are conceivable.

When the first unit 106 and the second unit 107 perform a rotating operation in a state where the small piece is caught between the first housing 108 and the second housing 112, there is a risk of causing a failure in the rotating operation and a risk of damaging the wireless connector 100. In the first embodiment, the oil seal is provided as the protection part 134. Therefore, the small piece hardly enters the facing space. As a result, it is possible to reduce the possibility of a failure caused by intrusion of the small piece into the facing space.

For example, when the wireless connector 100 is used in a working space where magnetic powder is suspended, the magnetic powder entering the facing space is accumulated on a surface of the transmission/reception assembly (110, 114) and may possibly cause magnetic field coupling thereof to be weakened or become unstable. In the first embodiment, the oil seal is provided as the protection part 134. Therefore, the magnetic powder hardly enters the facing space. As a result, it is possible to reduce the possibility of a failure caused by intrusion of the magnetic powder into the facing space.

Furthermore, for example, when the wireless connector 100 is used in a fluid containing the magnetic powder, the magnetic powder entering the facing space may possibly cause the magnetic field coupling of the transmission/reception assembly (110, 114) to be weakened or become unstable. In the first embodiment, the oil seal is provided as the protection part 134. Therefore, the magnetic powder hardly enters the facing space. As a result, electric power can stably be transmitted even in the fluid containing the magnetic powder.

Accordingly, it becomes possible to provide a wireless connector 100 having excellent durability under various environments.

(Wireless Connector Attachment/Detachment Method According to First Embodiment)

Hereinbefore, the operation of the wireless connector 100 according to the first embodiment of the present invention has been described. Now, a wireless connector attachment/detachment method according to the first embodiment will be described with reference to FIGS. 8 to 9. The wireless connector attachment/detachment method according to the first embodiment is a method for attaching/detaching the wireless connector 100 to/from the arm assembly (101, 102), and includes an attaching method and a detaching method for the wireless connector 100.

(Attaching Method for Wireless Connector 100)

Figure 8:
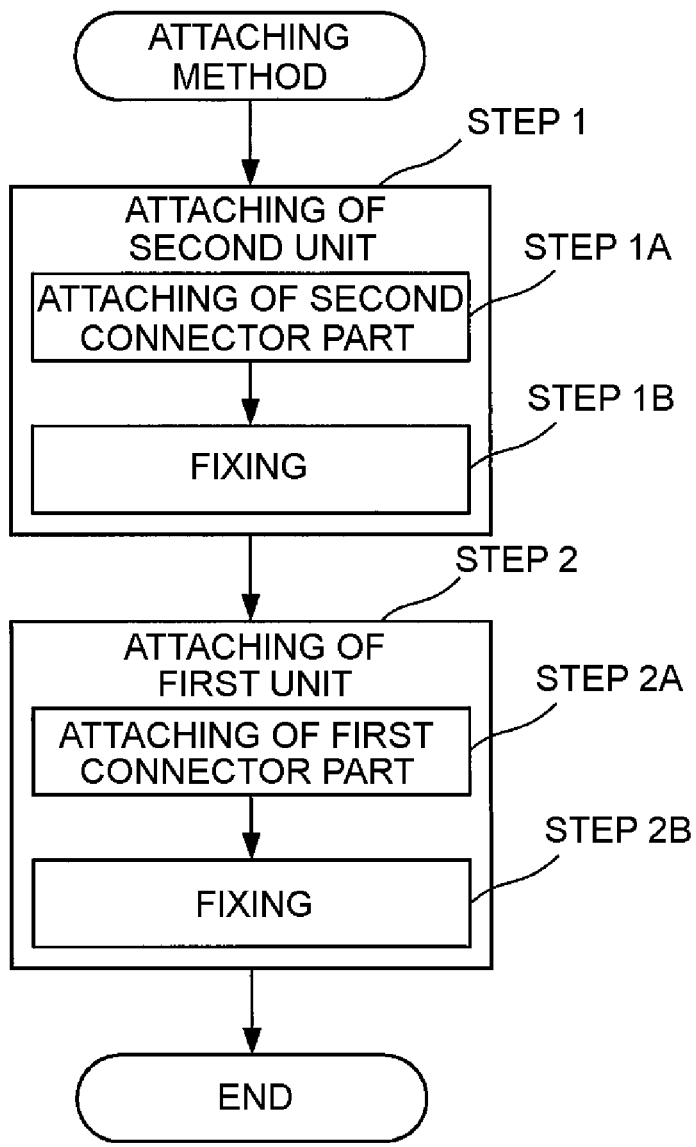
FIG. 8 is a diagram showing a flow of an attaching method for the wireless connector illustrated in FIG. 1.

FIG. 8 is a flowchart showing a flow of the attaching method for the wireless connector 100. The attaching method for the wireless connector 100 is started by preparing a robot device including the arm assembly (101, 102) connected via the joint mechanism 103, and the wireless connector 100.

As shown in FIG. 8, the second unit 107 is attached to the second arm part 102 from the outside of the second arm part 102 (step 1: step of attaching the second unit).

Specifically, in the step 1, the second connector part 113 is attached to the second arm part 102 in a state where the second transmission/reception part 114 is positioned in front of the joint mechanism 103 on the rotation axis AR (step 1A: step of attaching the second connector part).

In the first embodiment, by fitting the second mating connector part 105 to the second connector part 113, the second connector part 113 is attached to the second arm part 102. Since the second mating connector part 105 is exposed to the outside of the second arm part 102, the second connector part 113 is attached to the second arm part 102 from the outside of the second arm part 102.

By attaching the second connector part 113 to the second arm part 102 in the above-mentioned manner, the second connector part 113 and the second mating connector part 105 are electrically connected. In the first embodiment, since the second connector part 113 is fixed to the second housing 112, the second housing 112 is attached to the second arm part 102 together with the second connector part 113. As a result, the second unit 107 is attached to the second arm part 102.

As shown in FIG. 8, the second unit 107 is fixed to the second arm part 102 (step 1B; fixing step)

In the first embodiment, the four second bolts 129 are inserted into the four second bolt holes 127, respectively, and fitted to four second threaded hole parts 132 provided in the second arm part 102 by a screw action, so that the second housing 112 is fixed to the second arm part 102. The method for fixing the second unit 107 to the second arm part 102 is not limited to bolt fastening, and may be, for example, locking by engagement between lances and a peripheral portion of the second opening 126.

As shown in FIG. 8, the first unit 106 is attached to the first arm part 101 from the outside of the first arm part 101 (step 2: step of attaching the first unit).

Specifically, in the step 2, in a state where the first transmission/reception part 110 is positioned in front of the joint mechanism 103 and the second transmission/reception part 114 on the rotation axis AR, the first connector part 109 is attached to the first arm part 101 (step 2A: step of attaching the first connector part).

In the first embodiment, the first mating connector part 104 is fitted to the first connector part 109. At that time, the protruding part 123B of the second facing part 123 is fitted to the recessed part 121B of the first facing part 121 so that its tip surface and the bottom surface of the recessed part 121B of the first facing part 121 are faced to each other along the rotation axis AR and inserted into the protection part 134. Thus, the first connector part 109 is attached to the first arm part 101. Since the first mating connector part 104 is exposed to the outside of the first arm part 101, the first connector part 109 is attached to the first arm part 101 from the outside of the first arm part 101.

In the first embodiment, the protruding part 123B of the second facing part 123 is fitted to the recessed part 121B of the first facing part 121, so that the tip surface of the protruding part 123B of the second facing part 123 is arranged inside the recessed part 121B of the first facing part 121. However, if the tip surface of the protruding part 123B of the second facing part 123 and the bottom surface of the recessed part 121B of the first facing part 121 face each other, the tip surface of the protruding part 123B of the second facing part 123 may be disposed outside the recessed part 121B of the first facing part 121 (for example, see FIG. 17 related to an eighth modification).

By attaching the first connector part 109 to the first arm part 101 in the above-mentioned manner, the first connector part 109 and the first mating connector part 104 are electrically connected. The gap continuous to the facing space is closed by the protection part 134 so as to prevent the foreign matter from entering the facing space. Furthermore, in the first embodiment, since the first connector part 109 is fixed to the first housing 108, the first housing 108 is attached to the first arm part 101 together with the first connector part 109. As a result, the first unit 106 is attached to the first arm part 101.

As shown in FIG. 8, the first unit 106 is fixed to the first arm part 101 (step 2B; fixing step).

In the first embodiment, the four first bolts 128 are inserted into the four first bolt holes 125, respectively, and fitted to four first threaded hole parts 133 provided in the first arm part 101 by a screw action, so that the first housing 108 is fixed to the first arm part 101. The method for fixing the first unit 106 to the first arm part 101 is not limited to bolt fastening, and may be, for example, locking by engagement between lances and a peripheral portion of the first opening 124.

Thus, the attaching method for the wireless connector 100 is finished, and the electric connector 100 is mounted in a state of being fixed to the first arm part 101 and the second arm part 102. The first transmission/reception part 110 and the second transmission/reception part 114 are arranged to be substantially in parallel and to face a plane substantially perpendicular to the rotation axis AR in a state of being spaced from and faced to each other along the rotation axis AR outside the joint mechanism 103 so as to wirelessly transmit electric power (AC power).

(Detaching Method for Wireless Connector 100)

Figure 9:
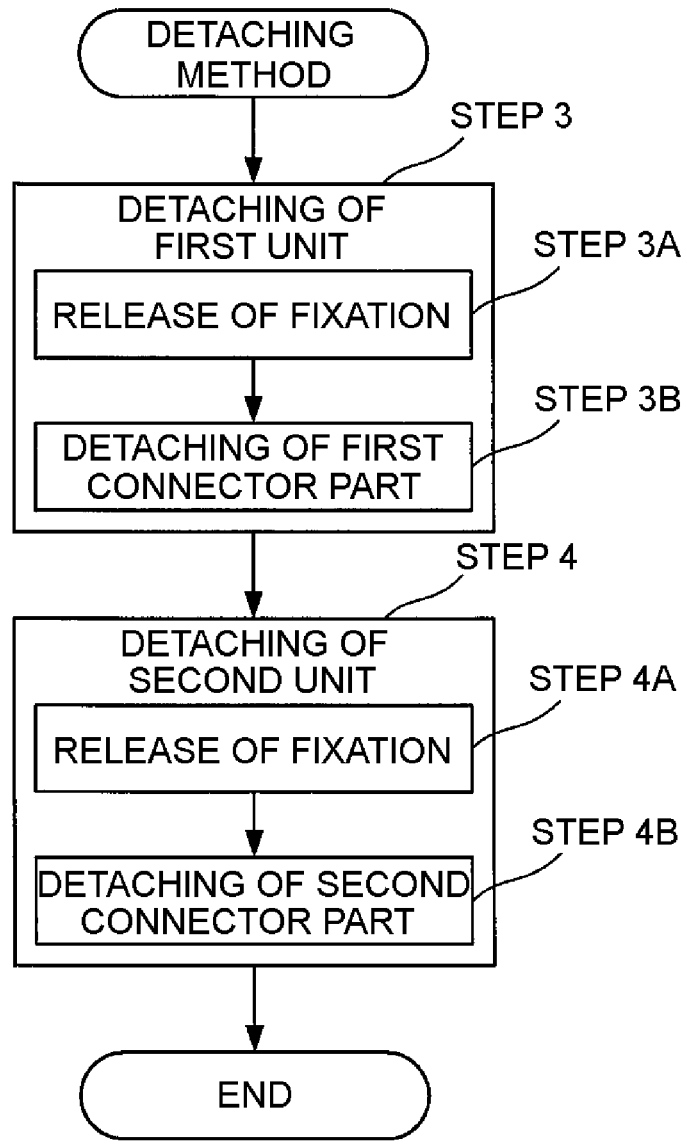
FIG. 9 is a diagram showing a flow of a detaching method for the wireless connector illustrated in FIG. 1.

FIG. 9 is a flowchart illustrating a flow of the detaching method for the wireless connector 100. Typically, the detaching method for the wireless connector 100 is performed if necessary, after the wireless connector 100 is attached to the robot device by the above-described attaching method for the wireless connector 100. As an example of a case where the wireless connector 100 is required to be detached, there is a case where the wireless connector 100 in which a failure has occurred is replaced by a normal wireless connector 100 for the purpose of repair.

As shown in FIG. 9, the first unit 106 is detached from the first arm part 101 by work outside the first arm part 101 (step 3: step of detaching the first unit).

In detail, as shown in FIG. 9, fixation between the first unit 106 and the first arm part 101 is released (step 3A: fixation release step). In the first embodiment, after fitting of the four first bolts 128 and the four first threaded hole parts 133 by the screw action is released, the four first bolts 128 are detached from the four first bolt holes 125.

As shown in FIG. 9, the first connector part 109 is detached from the first arm part 101 (step 3B: step of detaching the first connector part).

In the first embodiment, for example, a worker grips the first housing 108 by using a hand, a jig, or the like outside the first arm part 101. Then, by pulling out the first connector part 109 from the first mating connector part 104, the first connector part 109 is detached from the first arm part 101.

In the first embodiment, since the first connector part 109 and the protection part 134 are fixed to the first housing 108 as described above. Therefore, the first housing 108 and the protection part 134 are detached from the first arm part 101 and the second unit 107 together with the first connector part 109. Thus, the first unit 106 is detached from the first arm part 101 and the second unit 107.

As shown in FIG. 9, the second unit 107 is detached from the second arm part 102 by work outside the second arm part 102 (step 4; step of detaching the second unit).

In detail, as shown in FIG. 9, fixation between the second unit 107 and the second arm part 102 is released (step 4A: fixation release step). In the first embodiment, after fitting of the four second bolts 129 and the four second threaded hole parts 132 by the screw action is released, the four second bolts 129 are detached from the four second bolt holes 127.

As shown in FIG. 9, the second connector part 113 is detached from the second arm part 102 (step 4B: step of detaching the second connector part).

In the first embodiment, for example, a worker grips the second housing 112 by using a hand, a jig, or the like outside the second arm part 102. Then, by pulling out the second connector part 113 from the second mating connector part 105, the second connector part 113 is detached from the second arm part 102.

In the first embodiment, since the second connector part 113 is fixed to the second housing 112, the second housing 112 is detached from the first arm part 101 together with the second connector part 113. Thus, the second unit 107 is detached from the second arm part 102.

The detaching method for the wireless connector 100 is finished, and the wireless connector 100 is detached from the arm assembly (101, 102).

Hereinbefore, the first embodiment of the present invention has been described.

According to the first embodiment, the wireless connector 100 can be attached to and detached from the arm assembly (101, 102) by work outside the arm assembly (101, 102). As a result, for example, the wireless connector 100 in which a failure has occurred can easily be replaced by a normal wireless connector 100. Therefore, the wireless connector 100 can easily be repaired.

The wireless connector 100 is disposed outside the arm assembly (101, 102). Therefore, as compared with a case where the wireless connector is provided inside the arm assembly (101, 102), the influence on a design of an inside of the arm assembly (101, 102) is reduced. Therefore, it is possible to improve the degree of freedom in the design of the arm assembly (101, 102).

Further, since the first unit 106 and the second unit 107 are spaced from each other without being brought into contact with each other except at the protection part 134, the first unit 106 and the second unit 107 are hardly worn even when the first unit 106 and the second unit 107 are relatively rotated. Even if the protection part 134 is worn, the protection part 134 can easily be replaced by work outside the arm assembly (101, 102). Therefore, the durability of the wireless connector 100 can be improved.

In the first embodiment, both of the fitting direction of the first connector part 109 and the first mating connector part 104 and the fitting direction of the second connector part 113 and the second mating connector part 105 are the same back-and-forth direction (first direction). The first transmission/reception part 110 and the second transmission/reception part 114 are provided on the tip surface of the protruding part 123B protruding along the fitting direction and on the bottom surface of the recessed part 121B recessed along the fitting direction, respectively, and, therefore, are arranged in a state of being spaced from and faced to each other along the fitting direction (first direction) to cause magnetic field coupling therebetween.

In this case, in the arm assembly (101, 102), the first mating connector part 104 and the second mating connector part 105 may be provided in mutually opposite directions (i.e., leftward and rightward) via the rotation axis AR of the joint mechanism 103. Therefore, the first mating connector part 104 and the second mating connector part 105 can easily be provided to the first arm part 101 and the second arm part 102, respectively. Further, in the wireless connector 100, the configuration of the first unit 106 and the second unit 107 can relatively be simple, as will be understood from the foregoing description of the configuration.

Accordingly, the wireless connector 100 with a simple configuration can easily be provided to the arm assembly (101, 102).

Further, according to the first embodiment, the first central axis C1 and the second central axis C2 are oriented in parallel in the back-and-forth direction (first direction), and are parallel to the fitting direction of the first connector part 109 and the second connector part 113. Thus, with a simple configuration, the first transmission/reception part 110 (first coil member) and the second connector part 113 (second coil member) can be arranged substantially in parallel with each other to cause excellent magnetic field coupling. Accordingly, it is possible to wirelessly transmit electric power from the first arm part 101 to the second arm part 102 with a simple configuration and in a good condition.

Hereinbefore, the first embodiment of the present invention has been described. The present invention is not limited to the first embodiment, and includes configurations in which the first embodiment is modified as follows.
<First Modification>

In the first embodiment, the example in which the first connector part 109 and the second connector part 113 are fixed to the first housing 108 and the second housing 112, respectively, has been described. However, the first connector part 109 and the second connector part 113 may be attached without being fixed to the first housing 108 and the second housing 112, respectively.

Figure 10:
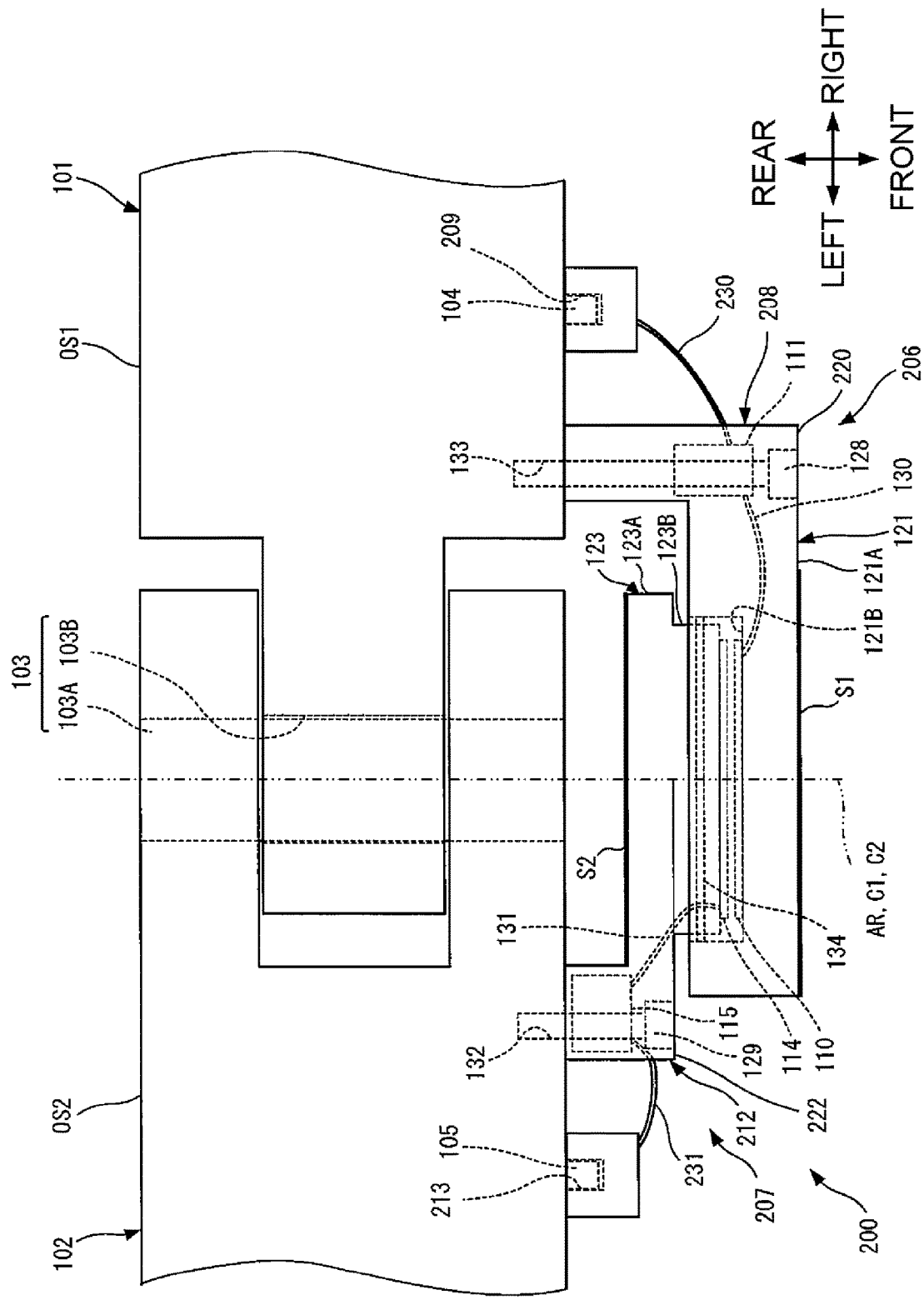
FIG. 10 is a view of a wireless connector attached to the first arm part and the second arm part according to a first modification of the present invention as viewed from above.

As shown in FIG. 10, a wireless connector 200 according to the first modification includes a first unit 206 and a second unit 207 which are configured to be separable in the manner similar to the first embodiment. The first unit 206 and the second unit 207 are spaced from each other without being in contact with each other except at the protection part 134.

The first unit 206 includes the first transmission/reception part 110, the first circuit part 111, and the protection part 134 which are similar to those of the first embodiment, and a first connector part 209 and a first housing 208 which are different from those of the first embodiment.

Similarly to the first embodiment, the first connector part 209 is an electric connector which is a part for transmitting electric power to/from the first arm part 101 and which is removably attached to the first mating connector part 104 by being fitted to each other. The first connector part 209 includes a first lead wire 230 extending to the outside of the first housing 208, and is connected to the first circuit part 111 provided inside the first housing 208 through the first lead wire 230.

The first housing 208 includes the first facing part 121, similar to that of the first embodiment, in which the first transmission/reception part 110 is fixed to the bottom surface of the recessed part 121B, and a first arm mounting part 220 different from that of the first embodiment.

The first arm mounting part 220 may be substantially similar in configuration to the first arm mounting part 120 according to the first embodiment except that the first connector part 209 is not provided inside the first housing 208.

The second unit 207 includes the second transmission/reception part 114 and the second circuit part 115 which are similar to those of the first embodiment, and a second connector part 213 and a second housing 212 which are different from those of the first embodiment.

Similarly to the first embodiment, the second connector part 213 is an electric connector which is a part for transmitting electric power to/from the second arm part 102 and which is removably attached to the second mating connector part 105 by being fitted to each other. The second connector part 213 includes a second lead wire 231 extending to the outside of the second housing 212, and is connected to the second circuit part 115 provided inside the second housing 212 through the second lead wire 231.

The second housing 212 includes the second facing part 123, similar to that of the first embodiment, in which the second transmission/reception part 114 is fixed to the tip surface of the protruding part 123B, and a second arm mounting part 222 different from that of the first embodiment.

The second arm mounting part 222 may be substantially similar in configuration to the second arm mounting part 122 according to the first embodiment except that the second connector part 113 is not provided inside the second housing 212.

In the first modification also, when the wireless connector 200 is attached to the arm assembly (101, 102), the first transmission/reception part 110 and the second transmission/reception part 114 are arranged in the state of being spaced from and faced to each other along the rotation axis AR outside the joint mechanism 103 so as to wirelessly transmit electric power (AC power) by electromagnetic induction, as in the first embodiment. Thus, according to the wireless connector 200, electric power can wirelessly be transmitted between the first arm part 101 and the second arm part 102 in the manner similar to the first embodiment.

Further, the wireless connector 200 can be attached to and detached from the arm assembly (101, 102) by work outside the arm assembly (101, 102). As a result, for example, the wireless connector 200 in which a failure has occurred can easily be replaced by a normal wireless connector 200. Therefore, the wireless connector 200 can easily be repaired.

Furthermore, in the manner similar to the first embodiment, the gap continuous to the facing space is closed by the protection part 134. Therefore, according to the wireless connector 200, intrusion of a foreign matter into the facing space can be prevented regardless of the bending/stretching state and the bending/stretching operation of the arm assembly (101, 102), as in the first embodiment. Accordingly, it is possible to provide the wireless connector 200 having excellent durability under various environments.

<Second Through Eighteenth Modifications>

In the first embodiment, an example in which the fixed part 134A of the protection part 134 is provided on the inner peripheral surface of the recessed part 121B of the first facing part 121, and the contacting part 134B of the protection part 134 is in contact with the outer peripheral surface of the protruding part 123B of the second facing part 123, so that the gap continuous to the facing space is closed has been described. However, it is only necessary that the protection part 134 is provided so as to close the gap continuous to the facing space in order to prevent intrusion of a foreign matter into the facing space.

Specifically, for example, the fixed part 134A of the protection part 134 may be fixed to any of the inner peripheral surface, the bottom surface, and a peripheral portion of the recessed part 121B of the first facing part 121 and the outer peripheral surface, the tip surface, and a peripheral portion of the protruding part 123B of the second facing part 123. When the fixed part 134A of the protection part 134 is fixed to any of the inner peripheral surface, the bottom surface, and the peripheral portion of the recessed part 121B of the first facing part 121, the contacting part 134B of the protection part 134 may be in contact with any of the outer peripheral surface, the tip surface, and the peripheral portion of the protruding part 123B of the second facing part 123. When the fixed part 134A of the protection part 134 is fixed to any of the outer peripheral surface, the tip surface, and the peripheral portion of the protruding part 123B of the second facing part 123, the contacting part 134B of the protection part 134 may be in contact with any of the inner peripheral surface, the bottom surface, and the peripheral portion of the recessed part 121B of the first facing part 121.

Among those mounting modes of the protection part 134, the mounting modes except the mounting mode in the first embodiment will be described with reference to FIGS. 11 to 27 as second to eighteenth modifications. The wireless connectors according to the second to the eighteenth modifications may be configured substantially similarly to the wireless connector 100 according to the first embodiment except the mounting mode of the protection part 134.

FIGS. 11 to 27 are enlarged cross-sectional views, corresponding to FIG. 6, of wireless connectors according to the respective modifications, that is, views each showing, in a cross section at the center in the up-and-down direction of the wireless connector according to each modification, a portion corresponding to the portion surrounded by the dash-dot-dash line VI in FIG. 2. In FIGS. 11 to 27, components corresponding to the components of the wireless connector 100 according to the first embodiment are assigned with same reference symbols.

Figure 11:
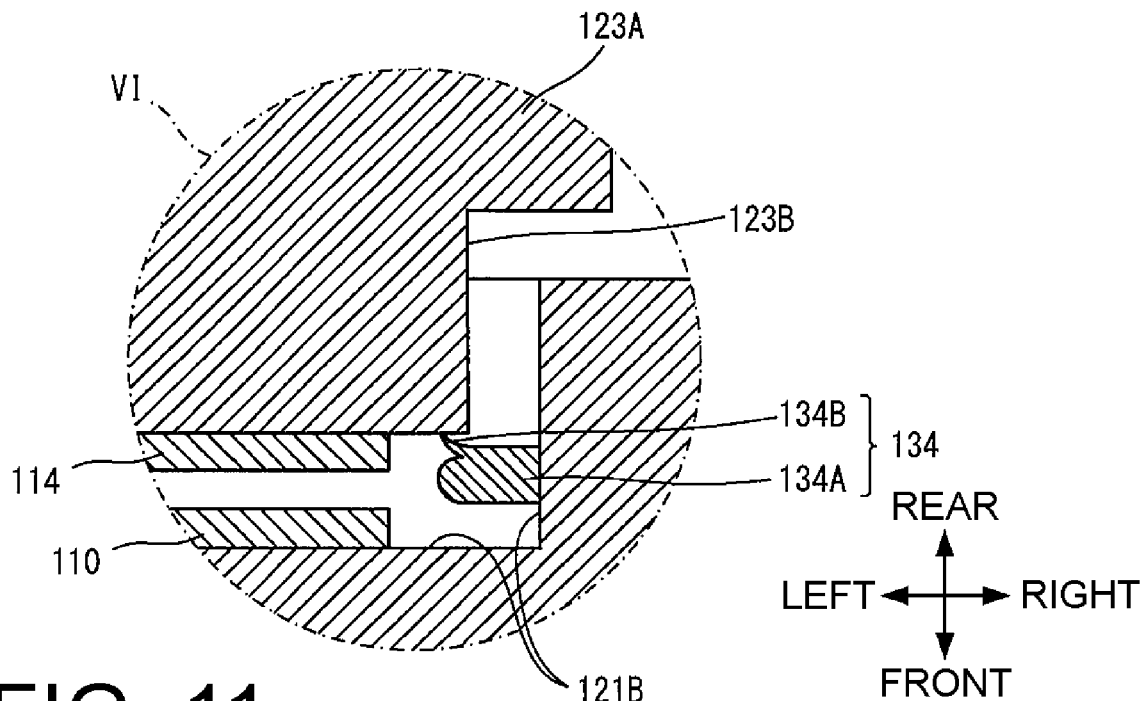
FIG. 11 is an enlarged view showing, in a section of a wireless connector according to a second modification of the present invention at a center in an up-and-down direction, a portion corresponding to the portion surrounded by the dash-dot-dash line VI in FIG. 2.
Figure 12:
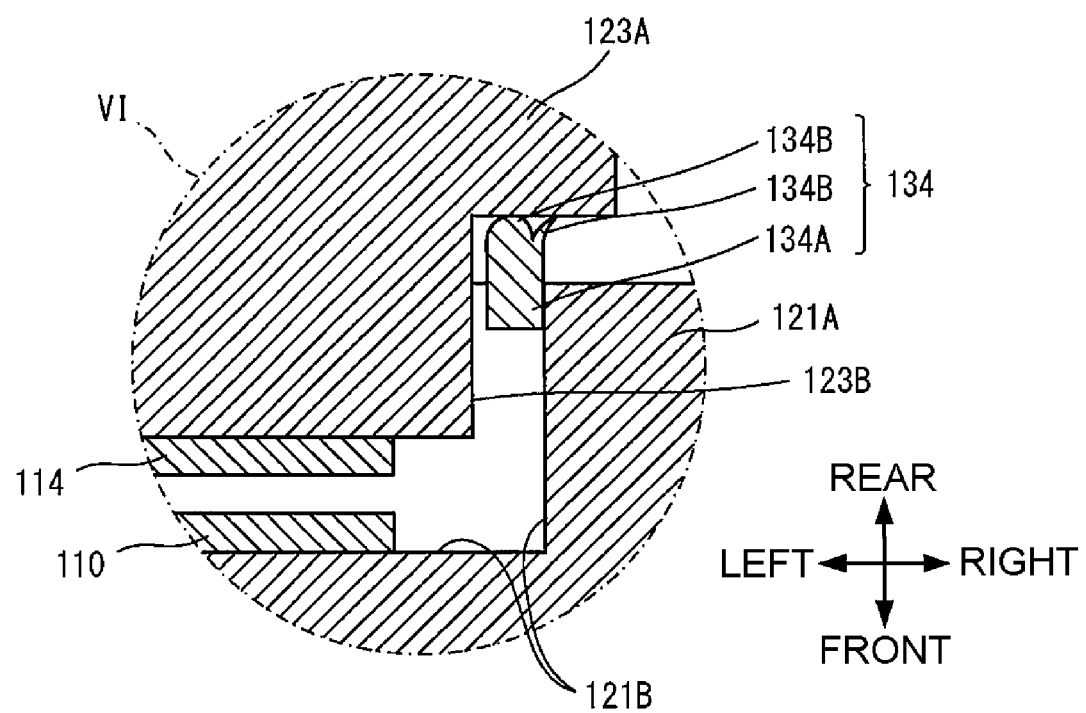
FIG. 12 is an enlarged view showing, in a section of a wireless connector according to a third modification of the present invention at a center in an up-and-down direction, a portion corresponding to the portion surrounded by the dash-dot-dash line VI in FIG. 2.

In the second and the third modifications, as shown in FIGS. 11 and 12, respectively, the fixed part 134A of the protection part 134 is fixed to the inner peripheral surface of the recessed part 121B of the first facing part 121 as in the first embodiment. In the second modification, as shown in FIG. 11, the contacting part 134B of the protection part 134 is pressed against the tip surface of the protruding part 123B of the second facing part 123 to be brought into contact therewith. In the third modification, as shown in FIG. 12, the contacting part 134B of the protection part 134 is pressed against the peripheral portion of the protruding part 123B of the second facing part 123 to be brought into contact therewith.

Figure 13:
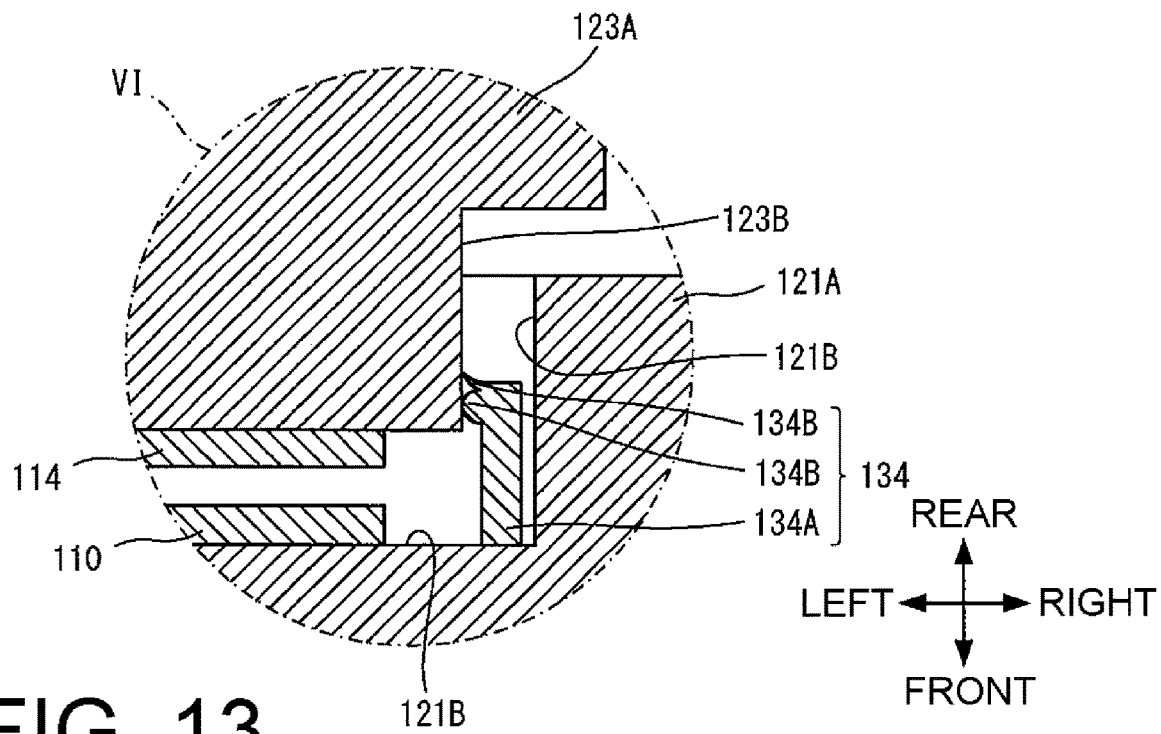
FIG. 13 is an enlarged view showing, in a section of a wireless connector according to a fourth modification of the present invention at a center in an up-and-down direction, a portion corresponding to the portion surrounded by the dash-dot-dash line VI in FIG. 2.
Figure 14:
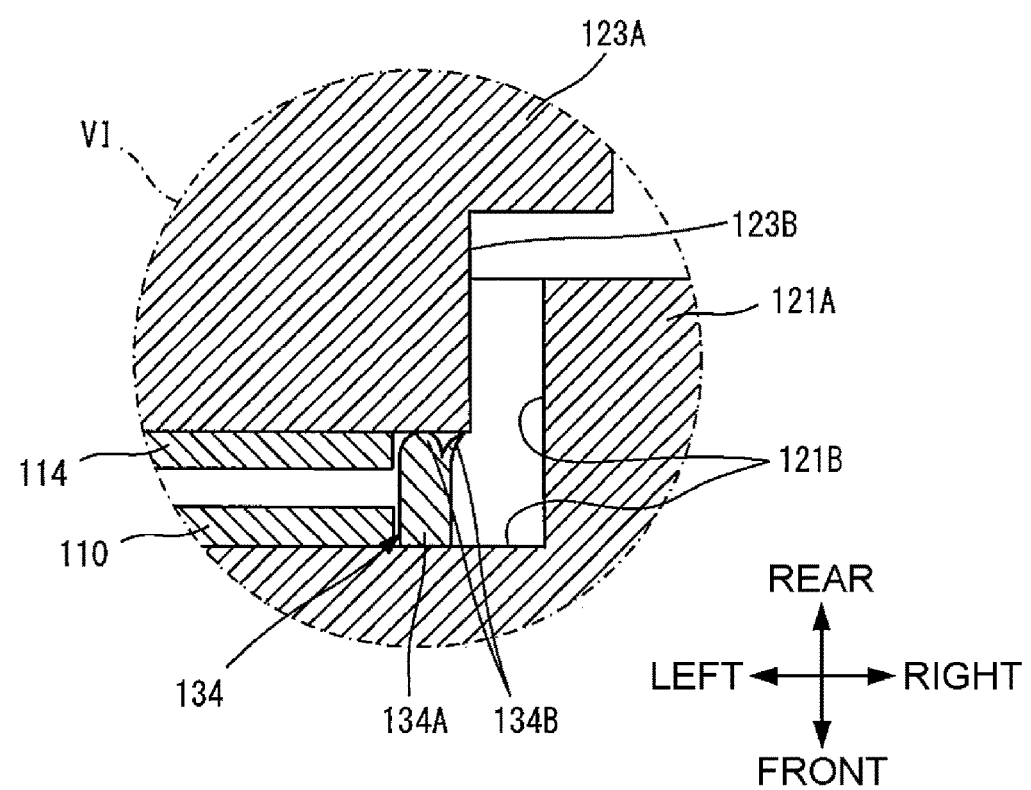
FIG. 14 is an enlarged view showing, in a section of a wireless connector according to a fifth modification of the present invention at a center in an up-and-down direction, a portion corresponding to the portion surrounded by the dash-dot-dash line VI in FIG. 2.
Figure 15:
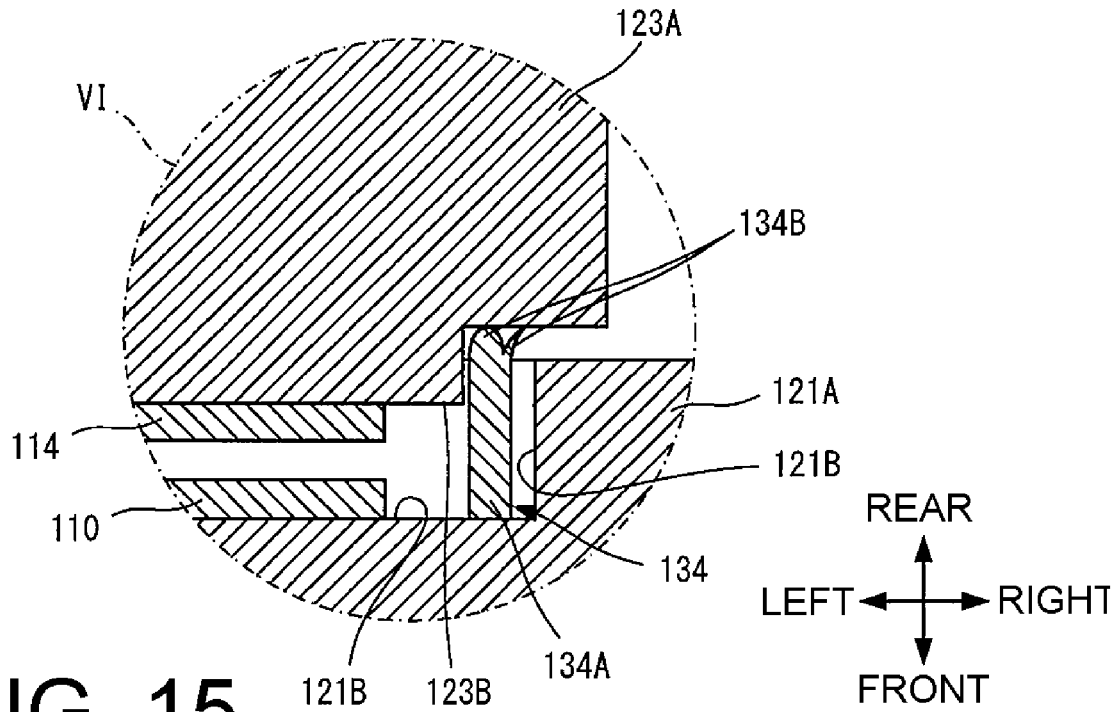
FIG. 15 is an enlarged view showing, in a section of a wireless connector according to a sixth modification of the present invention at a center in an up-and-down direction, a portion corresponding to the portion surrounded by the dash-dot-dash line VI in FIG. 2.

In the fourth to the sixth modifications, as shown in FIGS. 13 to 15, respectively, the fixed part 134A of the protection part 134 is fixed to the bottom surface of the recessed part 121B of the first facing part 121. In the fourth modification, as shown in FIG. 13, the contacting part 134B of the protection part 134 is pressed against the outer peripheral surface of the protruding part 123B of the second facing part 123 to be brought into contact therewith. In the fifth modification, as shown in FIG. 14, the contacting part 134B of the protection part 134 is pressed against the tip surface of the protruding part 123B of the second facing part 123 to be brought into contact therewith. In the sixth modification, as shown in FIG. 15, the contacting part 134B of the protection part 134 is pressed against the peripheral portion of the protruding part 123B of the second facing part 123 to be brought into contact therewith.

Figure 16:
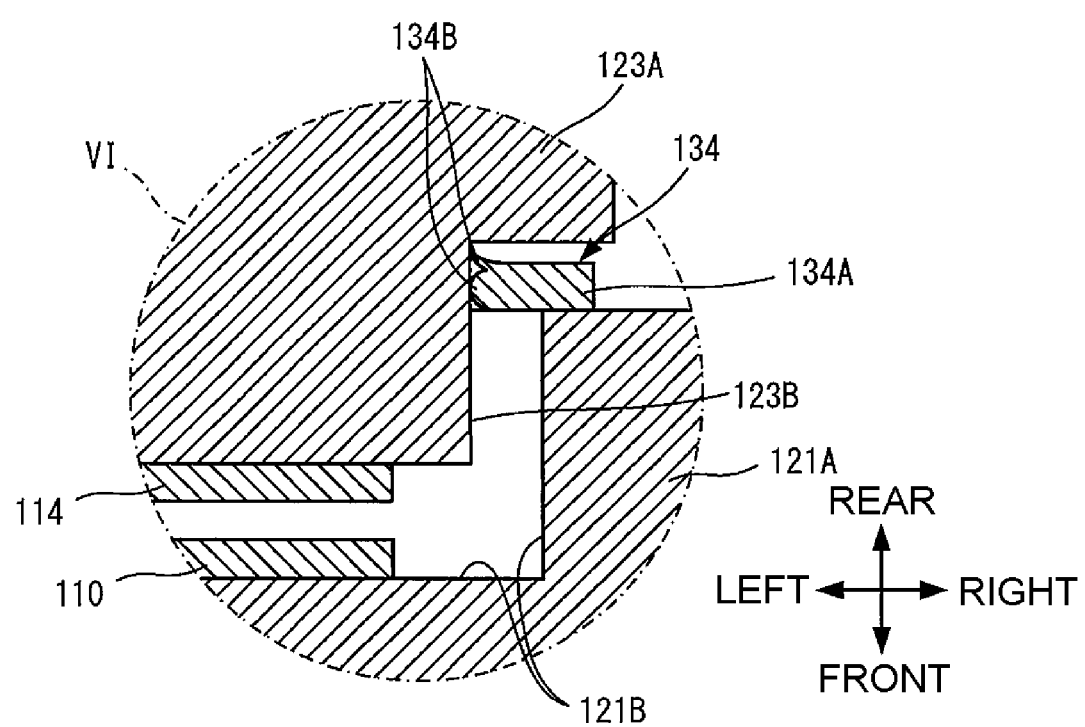
FIG. 16 is an enlarged view showing, in a section of a wireless connector according to a seventh modification of the present invention at a center in an up-and-down direction, a portion corresponding to the portion surrounded by the dash-dot-dash line VI in FIG. 2.
Figure 17:
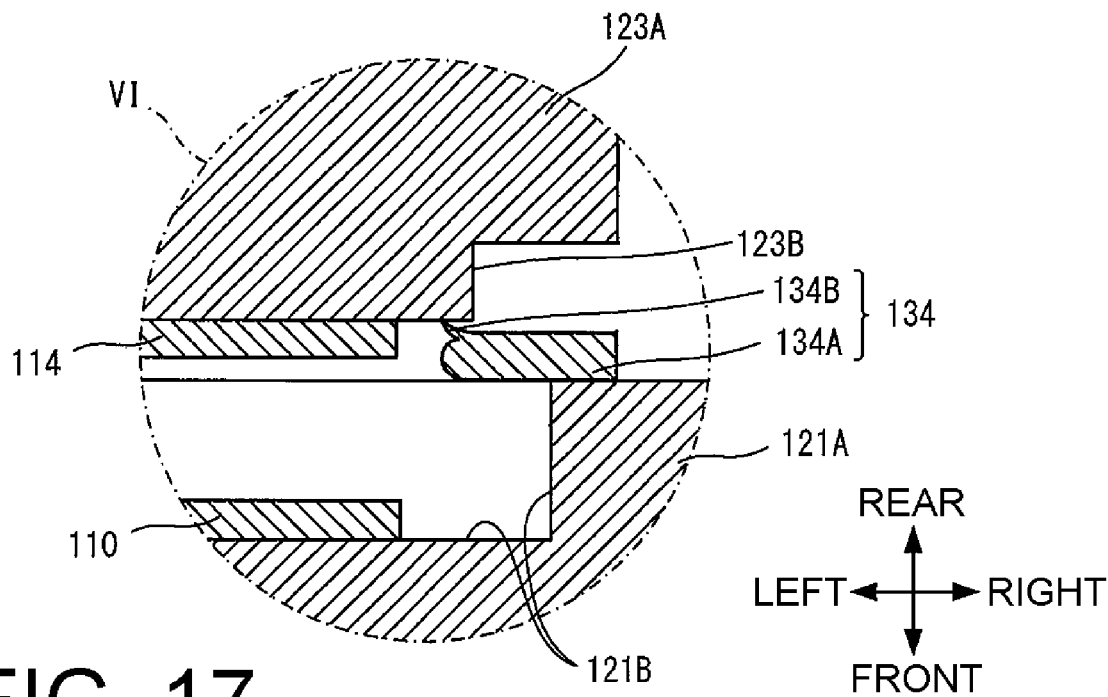
FIG. 17 is an enlarged view showing, in a section of a wireless connector according to an eighth modification of the present invention at a center in an up-and-down direction, a portion corresponding to the portion surrounded by the dash-dot-dash line VI in FIG. 2.
Figure 18:
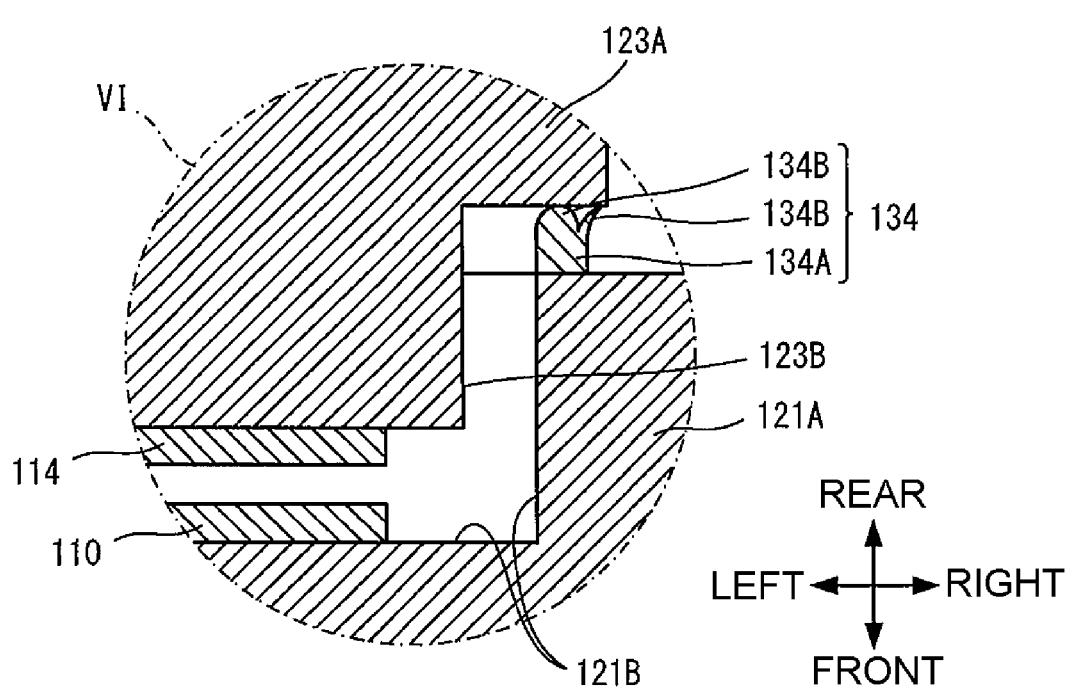
FIG. 18 is an enlarged view showing, in a section of a wireless connector according to a ninth modification of the present invention at a center in an up-and-down direction, a portion corresponding to the portion surrounded by the dash-dot-dash line VI in FIG. 2.

In the seventh to the ninth modifications, as shown in FIGS. 16 to 18, respectively, the fixed part 134A of the protection part 134 is fixed to the peripheral portion of the recessed part 121B of the first facing part 121. In the seventh modification, as shown in FIG. 16, the contacting part 134B of the protection part 134 is pressed against the outer peripheral surface of the protruding part 123B of the second facing part 123 to be brought into contact therewith. In the eighth modification, as shown in FIG. 17, the contacting part 134B of the protection part 134 is pressed against the tip surface of the protruding part 123B of the second facing part 123 to be brought into contact therewith. In the ninth modification, as shown in FIG. 18, the contacting part 134B of the protection part 134 is pressed against the peripheral portion of the protruding part 123B of the second facing part 123 to be brought into contact therewith.

Figure 19:
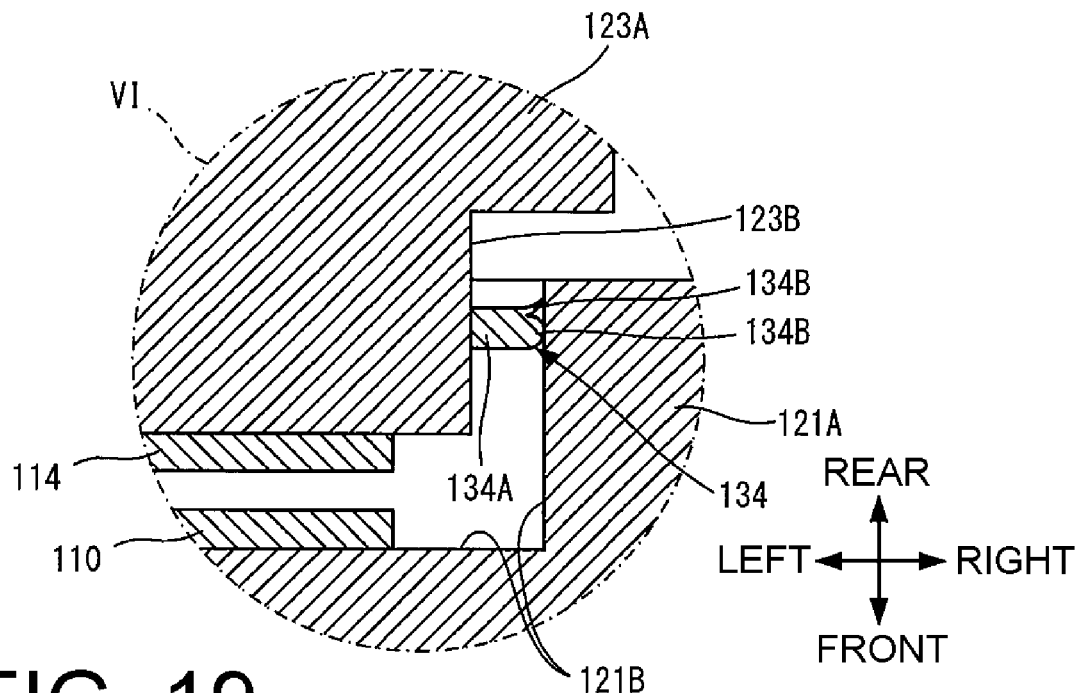
FIG. 19 is an enlarged view showing, in a section of a wireless connector according to a tenth modification of the present invention at a center in an up-and-down direction, a portion corresponding to the portion surrounded by the dash-dot-dash line VI in FIG. 2.
Figure 20:
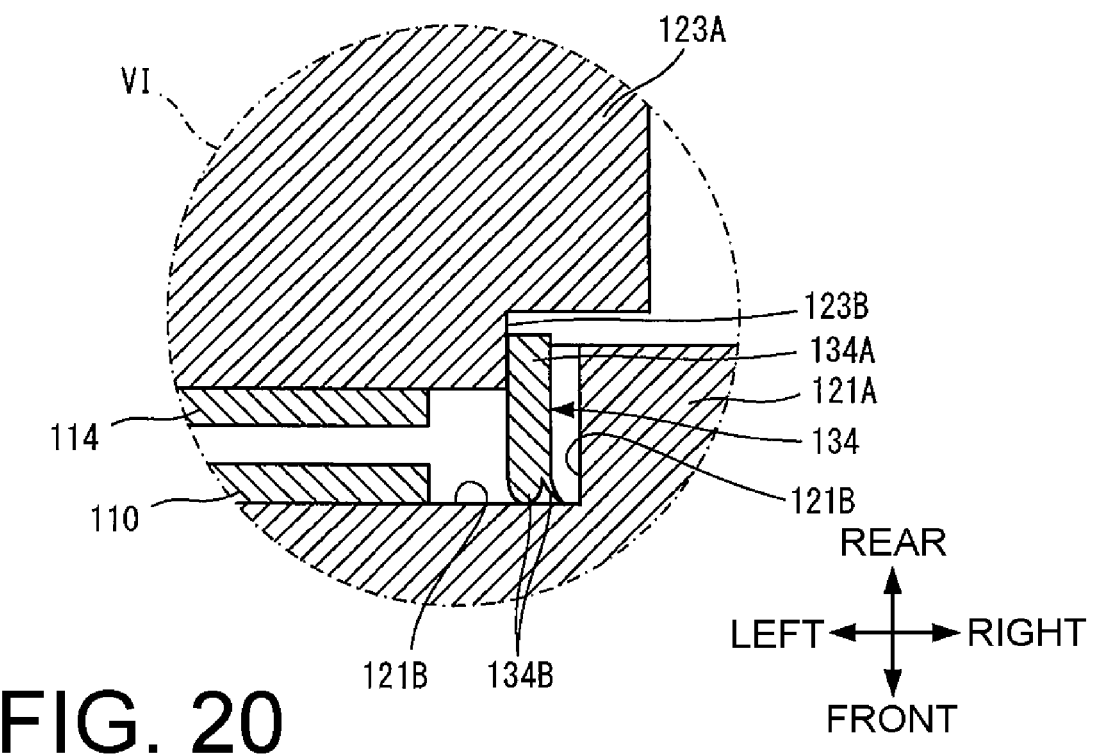
FIG. 20 is an enlarged view showing, in a section of a wireless connector according to an eleventh modification of the present invention at a center in an up-and-down direction, a portion corresponding to the portion surrounded by the dash-dot-dash line VI in FIG. 2.
Figure 21:
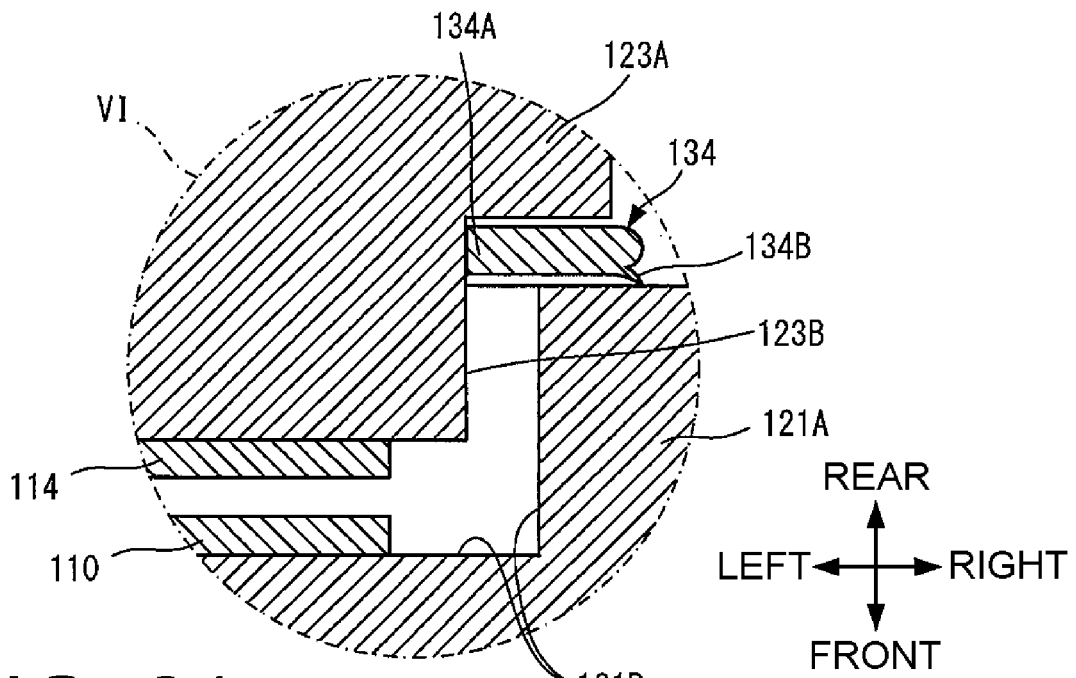
FIG. 21 is an enlarged view showing, in a section of a wireless connector according to a twelfth modification of the present invention at a center in an up-and-down direction, a portion corresponding to the portion surrounded by the dash-dot-dash line VI in FIG. 2.

In the tenth to the twelfth modifications, as shown in FIGS. 19 to 21, respectively, the fixed part 134A of the protection part 134 is fixed to the outer peripheral surface of the protruding part 123B of the second facing part 123. In the tenth modification, as shown in FIG. 19, the contacting part 134B of the protection part 134 is pressed against the inner peripheral surface of the recessed part 121B of the first facing part 121 to be brought into contact therewith. In the eleventh modification, as shown in FIG. 20, the contacting part 134B of the protection part 134 is pressed against the bottom surface of the recessed part 121B of the first facing part 121 to be brought into contact therewith. In the twelfth modification, as shown in FIG. 21, the contacting part 134B of the protection part 134 is pressed against the peripheral portion of the recessed part 121B of the first facing part 121 to be brought into contact therewith.

Figure 22:
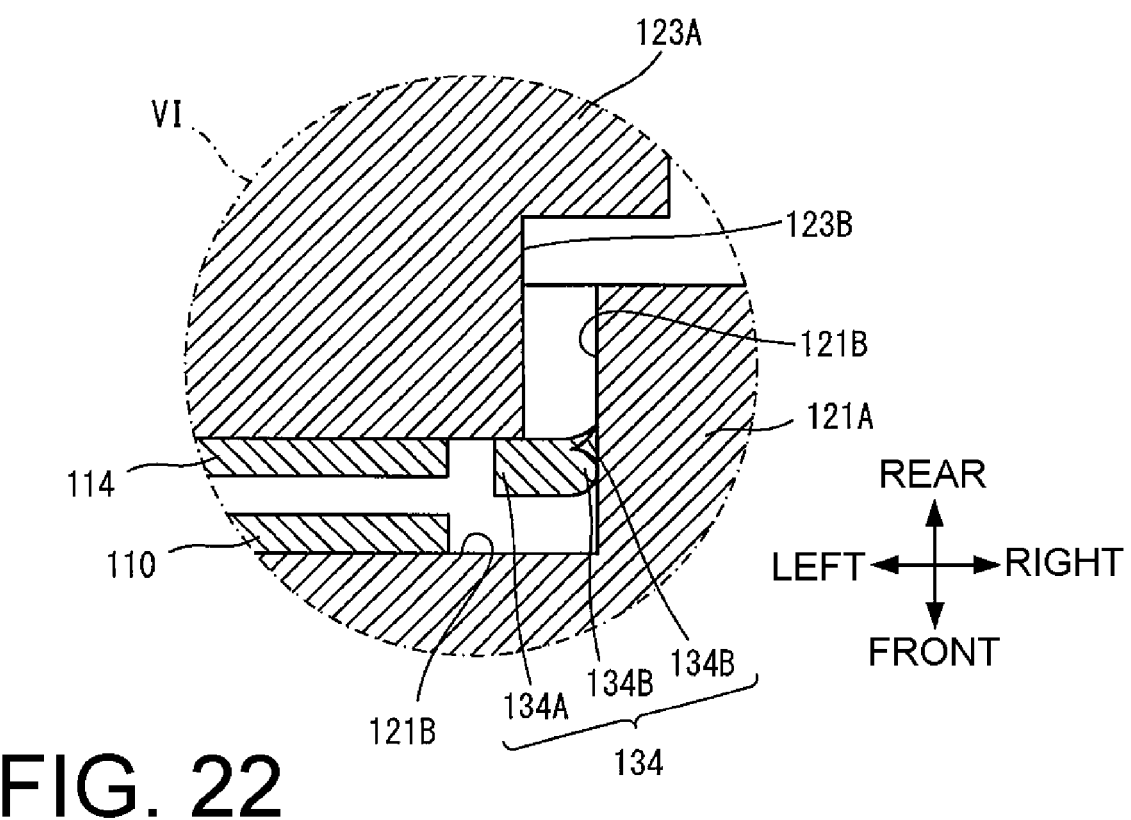
FIG. 22 is an enlarged view showing, in a section of a wireless connector according to a thirteenth modification of the present invention at a center in an up-and-down direction, a portion corresponding to the portion surrounded by the dash-dot-dash line VI in FIG. 2.
Figure 23:
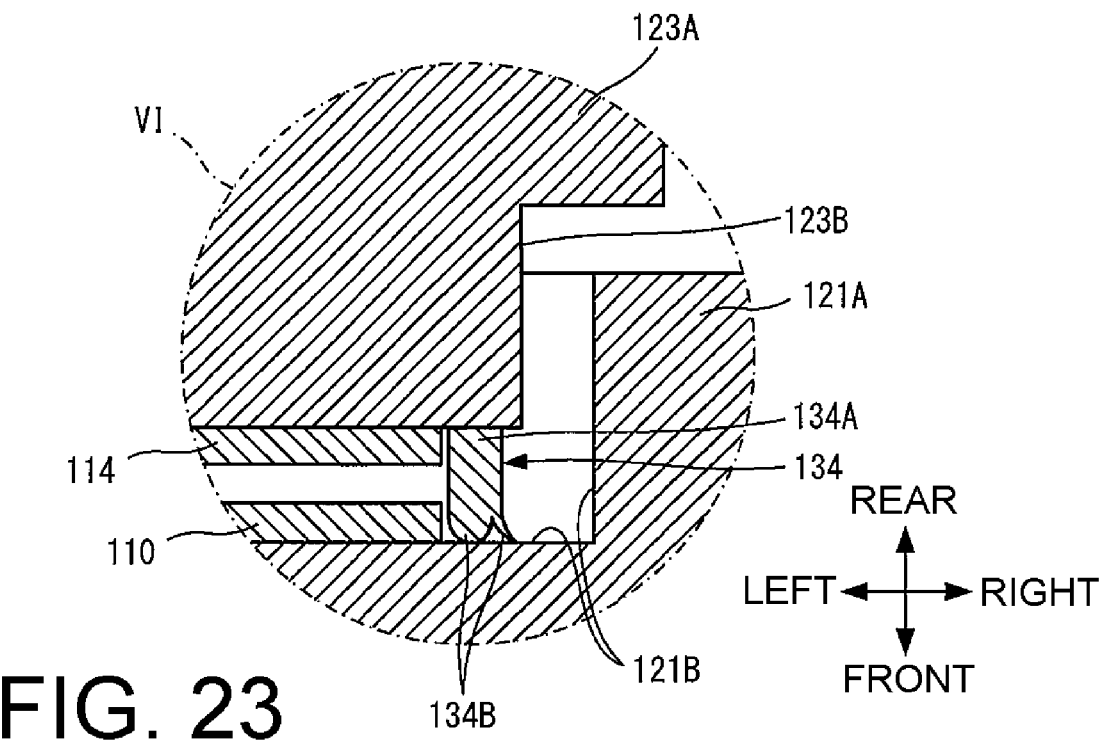
FIG. 23 is an enlarged view showing, in a section of a wireless connector according to a fourteenth modification of the present invention at a center in an up-and-down direction, a portion corresponding to the portion surrounded by the dash-dot-dash line VI in FIG. 2.
Figure 24:
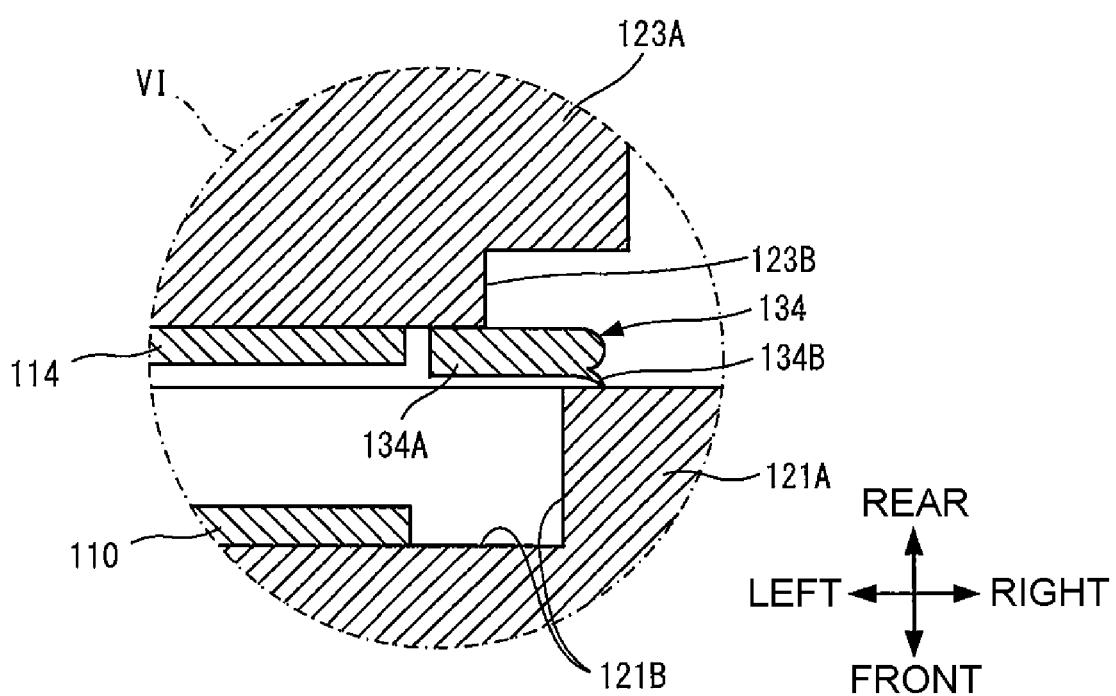
FIG. 24 is an enlarged view showing, in a section of a wireless connector according to a fifteenth modification of the present invention at a center in an up-and-down direction, a portion corresponding to the portion surrounded by the dash-dot-dash line VI in FIG. 2.

In the thirteenth to fifteenth modifications, as shown in FIGS. 22 to 24, respectively, the fixed part 134A of the protection part 134 is fixed to the tip surface of the protruding part 123B of the second facing part 123. In the thirteenth modification, as shown in FIG. 22, the contacting part 134B of the protection part 134 is pressed against the inner peripheral surface of the recessed part 121B of the first facing part 121 to be brought into contact therewith. In the fourteenth modification, as shown in FIG. 23, the contacting part 134B of the protection part 134 is pressed against the bottom surface of the recessed part 121B of the first facing part 121 to be brought into contact therewith. In the fifteenth modification, as shown in FIG. 24, the contacting part 134B of the protection part 134 is pressed against the peripheral portion of the recessed part 121B of the first facing part 121 and to be brought into contact therewith.

Figure 25:
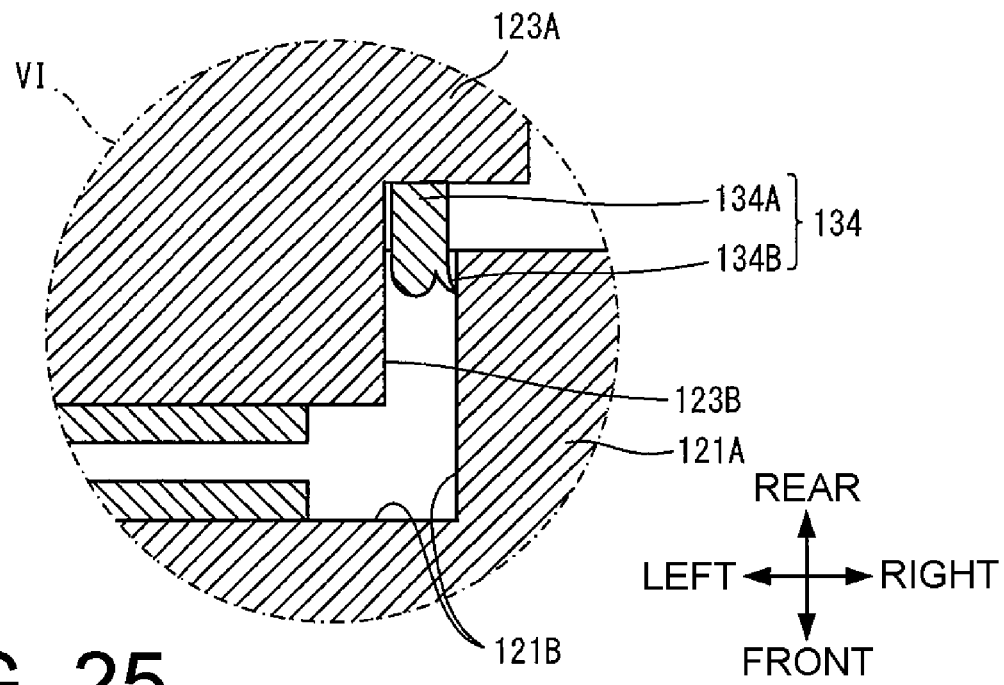
FIG. 25 is an enlarged view showing, in a section of a wireless connector according to a sixteenth modification of the present invention at a center in an up-and-down direction, a portion corresponding to the portion surrounded by the dash-dot-dash line VI in FIG. 2.
Figure 26:
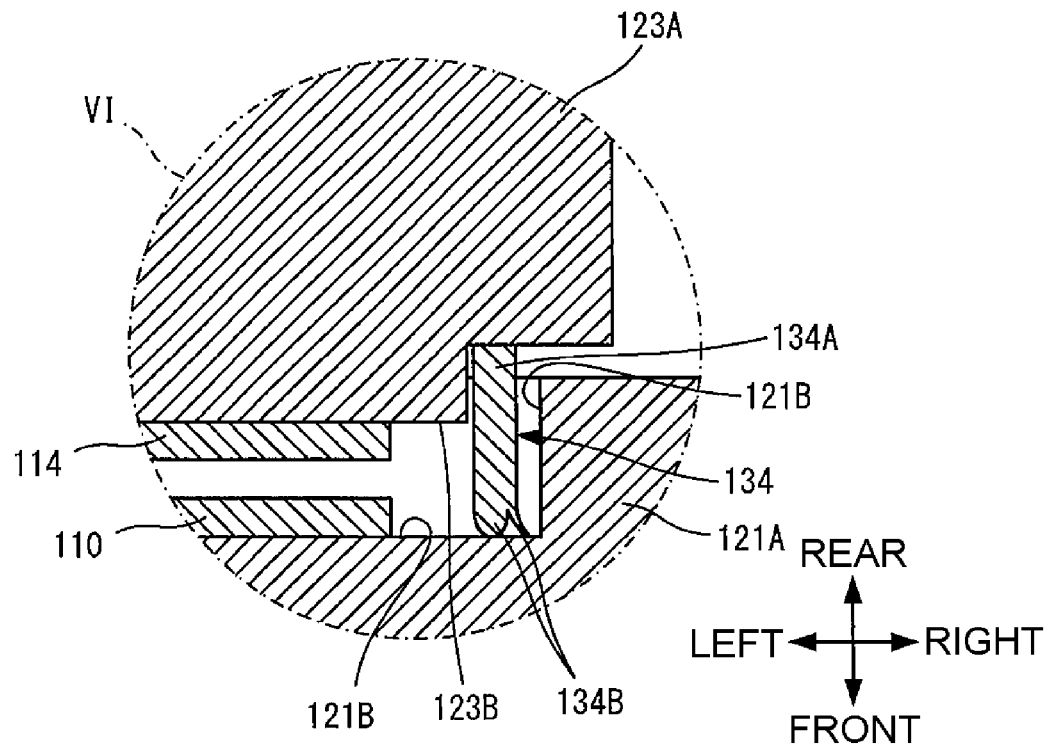
FIG. 26 is an enlarged view showing, in a section of a wireless connector according to a seventeenth modification of the present invention at a center in an up-and-down direction, a portion corresponding to the portion surrounded by the dash-dot-dash line VI in FIG. 2.
Figure 27:
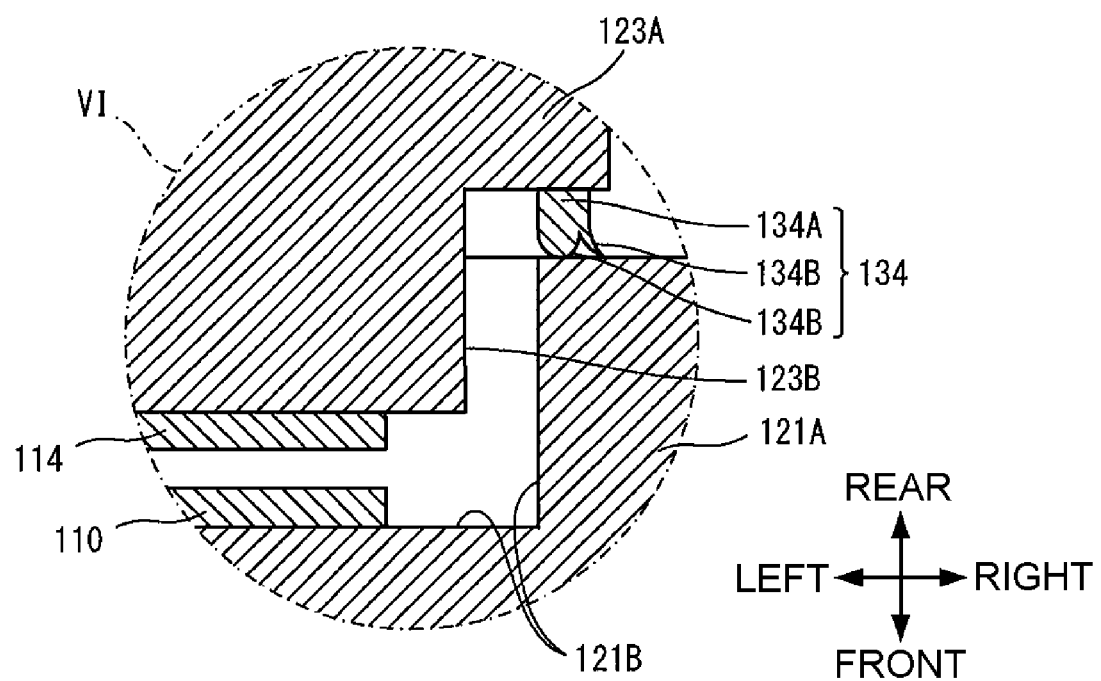
FIG. 27 is an enlarged view showing, in a section of a wireless connector according to an eighteenth modification of the present invention at a center in an up-and-down direction, a portion corresponding to the portion surrounded by the dash-dot-dash line VI in FIG. 2.

In the sixteenth to the eighteenth modifications, as shown in FIGS. 25 to 27, respectively, the fixed part 134A of the protection part 134 is fixed to the peripheral portion of the protruding part 123B of the second facing part 123. In the sixteenth modification, as shown in FIG. 25, the contacting part 134B of the protection part 134 is pressed against the inner peripheral surface of the recessed part 121B of the first facing part 121 to be brought into contact therewith. In the seventeenth modification, as shown in FIG. 26, the contacting part 134B of the protection part 134 is pressed against the bottom surface of the recessed part 121B of the first facing part 121 to be brought into contact therewith. In the eighteenth modification, as shown in FIG. 27, the contacting part 134B of the protection part 134 is pressed against the peripheral portion of the recessed part 121B of the first facing part 121 to be brought into contact therewith.

The second to the eighteenth modifications exhibit the similar effects to those in the first embodiment.

Second Embodiment

In the first embodiment described above, an example in which the wireless connector 100 includes the transmission/reception assembly (110, 114) to wirelessly transmit electric power has been described. In the second embodiment, an example of a wireless connector will be described which includes a third transmission/reception part and a fourth transmission/reception part for transmitting information in addition to the first transmission/reception part and the second transmission/reception part for transmitting electric power.

The electric power according to the second embodiment is one example of a first to-be-transmitted target, and the information is one example of a second to-be-transmitted target.

(Configuration of Wireless Connector 300 According to Second Embodiment)

Figure 28:
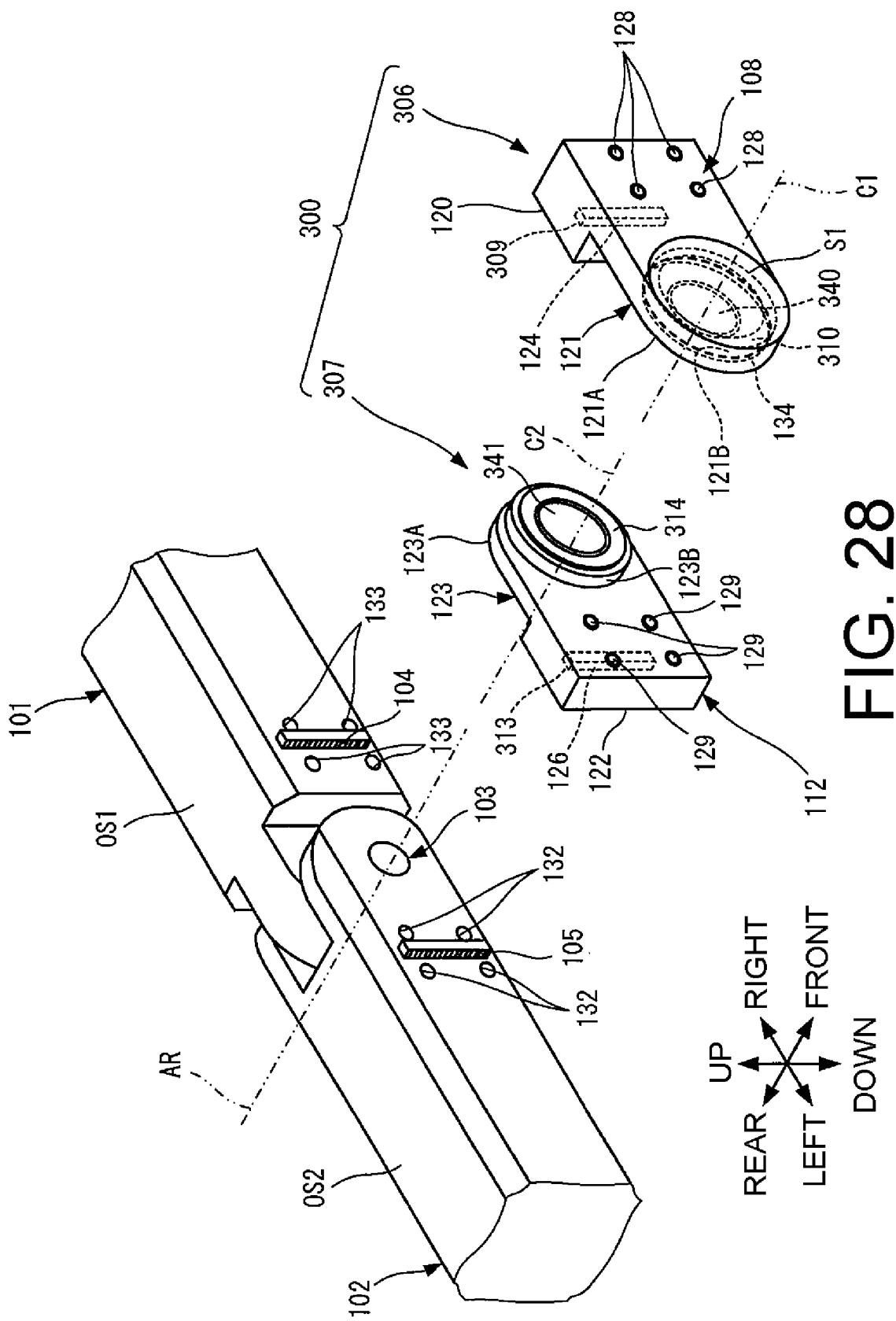
FIG. 28 is an exploded perspective view of the first arm part, the second arm part, and a wireless connector according to a second embodiment of the present invention.

As shown in an exploded perspective view of FIG. 28, a wireless connector 300 according to the second embodiment of the present invention is a connector for wirelessly transmitting electric power (first to-be-transmitted target) and information (second to-be-transmitted target) between the first arm part 101 and the second arm part 102 similar to those of the first embodiment. The wireless connector 300 is removably attached to the outside of the arm assembly (101, 102). In the second embodiment, an example in which electric power (first to-be-transmitted target) and information (second to-be-transmitted target) are wirelessly transmitted by magnetic field coupling (electromagnetic induction) and electromagnetic waves will be described.

As shown in FIG. 28, the wireless connector 300 includes a first unit 306 and a second unit 307 which are removably attached to the first arm part 101 and the second arm part 102 from the outside, respectively. The first unit 306 and the second unit 307 are configured to be separable and can be relatively rotated around the rotation axis AR when they are attached to the first arm part 101 and the second arm part 102, respectively, as in the above-mentioned first embodiment.

Figure 29:
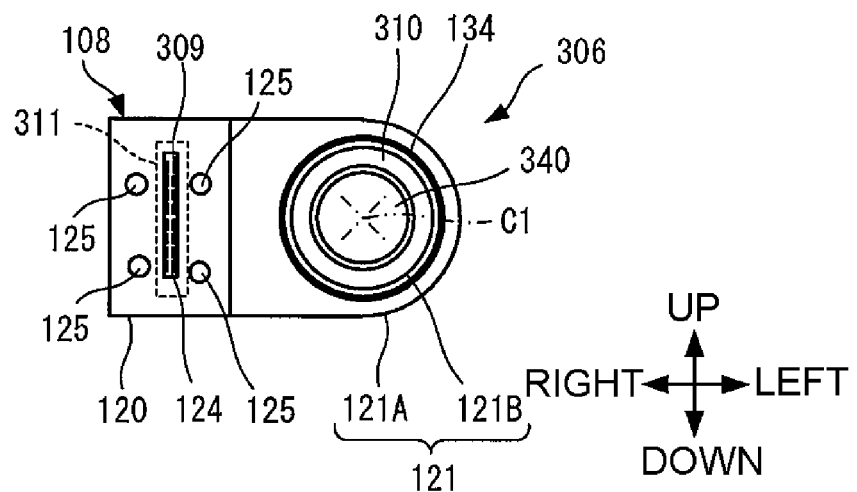
FIG. 29 is a view of a first unit used in the wireless connector illustrated in FIG. 28 as viewed from the rear.

As shown in FIG. 28 and FIG. 29 as viewed from the rear, the first unit 306 includes the first housing 108 and the protection part 134 similar to those of the first embodiment, and a first connector part 309, a first transmission/reception part 310, and a first circuit part 311 which are different from those of the first embodiment. Further, the first unit 306 includes a third transmission/reception part 340. In FIG. 29, the first bolts 128 similar to those of the first embodiment are omitted.

Figure 30:
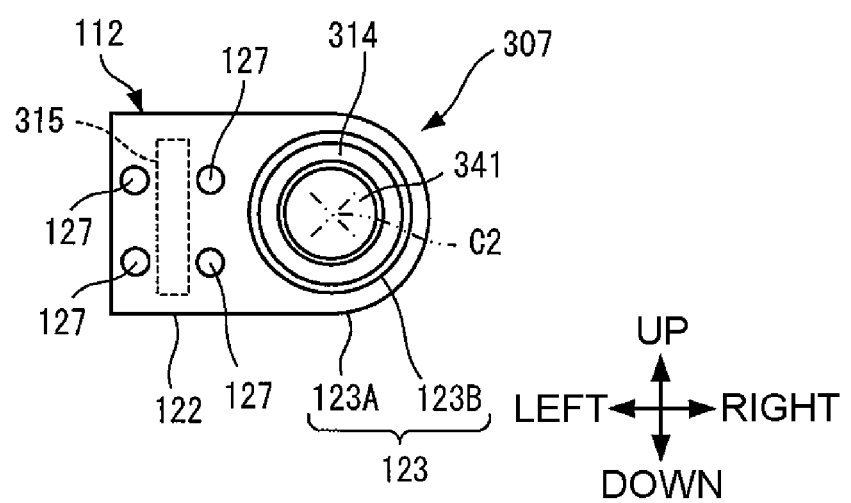
FIG. 30 is a view of a second unit used in the wireless connector illustrated in FIG. 28 as viewed from the front.

As shown in FIG. 28 and FIG. 30 as viewed from the front, the second unit 307 includes components 112, 313 to 315, and 341 corresponding to the components 108, 309 to 311, and 340 included in the first unit 306, respectively. Specifically, the second unit 307 includes the second housing 112 similar to that of the first embodiment, and a second connector part 313, a second transmission/reception part 314, and a second circuit part 315 which are different from those of the first embodiment. Further, the first second unit 307 includes a fourth transmission/reception part 341. In FIG. 30, the second bolts 129 similar to those of the first embodiment are omitted.

The first connector part 309 is a part for transmitting electric power (first to-be-transmitted target) and information (second to-be-transmitted target) to/from the first arm part 101. The first connector part 309 is removably attached to the first arm part 101 from the outside of the first arm part 101, thereby transmitting electric power and information to/from the first arm part 101.

The first connector part 309 may be configured substantially similarly to the first connector part 109 according to the first embodiment except that electric contacts for transmitting information (second to-be-transmitted target) are included in addition to the electric contacts for transmitting electric power (first to-be-transmitted target).

The second connector part 313 is a part for transmitting electric power (first to-be-transmitted target) and information (second to-be-transmitted target) to/from the second arm part 102. The second connector part 313 is removably attached to the second arm part 102 from the outside of the second arm part 102, thereby transmitting electric power and information to/from the second arm part 102.

The second connector part 313 may be configured substantially similarly to the second connector part 113 according to the first embodiment except that electric contacts for transmitting information (second to-be-transmitted target) are included in addition to the electric contacts for transmitting electric power (first to-be-transmitted target).

The first transmission/reception part 310 and the second transmission/reception part 314 are members for wirelessly transmitting electric power (first to-be-transmitted target: AC power) therebetween, and are disposed in a state of being spaced from and faced to each other along the rotation axis AR outside the joint mechanism 103 so as to wirelessly transmit electric power (first to-be-transmitted target: AC power). Typically, the first transmission/reception part 310 and the second transmission/reception part 314 have an outer shape centered on the first central axis C1 and the second central axis C2, respectively, for example, a hollow disc shape.

The first transmission/reception part 310 and the second transmission/reception part 314 may be configured similarly to the first transmission/reception part 110 and the second transmission/reception part 114 according to the first embodiment, respectively, except that those parts are hollow. That is, the first transmission/reception part 310 and the second transmission/reception part 314 according to the second embodiment comprise a first coil member and a second coil member, respectively, each of which has a hollow disc shape.

The third transmission/reception part 340 and the fourth transmission/reception part 341 are members for wirelessly transmitting information (second to-be-transmitted target) therebetween, and are disposed in a state of being spaced from and faced to each other along the rotation axis AR outside the joint mechanism 103 so as to wirelessly transmit information. Typically, the third transmission/reception part 340 and the fourth transmission/reception part 341 have an outer shape centered on the first central axis C1 and the second central axis C2, respectively, for example, a disc shape.

The third transmission/reception part 340 and the fourth transmission/reception part 341 are provided inside the first transmission/reception part 310 and the second transmission/reception part 314, respectively.

In other words, the first transmission/reception part 310 is provided around the third transmission/reception part 340 and centered at the substantially common first central axis C1. The second transmission/reception part 314 is provided around the fourth transmission/reception part 341 and centered at the substantially common second central axis C2.

The third transmission/reception part 340 and the fourth transmission/reception part 341 may be constituted similarly to the first transmission/reception part 110 and the second transmission/reception part 114 according to the first embodiment except for places where they are arranged and a transmission method. That is, the third transmission/reception part 340 and the fourth transmission/reception part 341 according to the second embodiment comprise a first antenna member and a second antenna member, respectively, each of which has a disc shape.

The first circuit part 311 is an electric circuit electrically connected to the first connector part 309, the first transmission/reception part 310, and the third transmission/reception part 340. The first circuit part 311 may be configured substantially similarly to the first circuit part 111 according to the first embodiment except that an information transmission/reception circuit for transmitting and/or receiving information (second to-be-transmitted target) is further included. Here, "transmitting and/or receiving" means that one or both of transmission and reception are performed. The same applies also in the following.

The second circuit part 315 is an electric circuit electrically connected to the second connector part 313, the second transmission/reception part 314, and the fourth transmission/reception part 341. The second circuit part 315 may be configured substantially similarly to the second circuit part 115 according to the first embodiment except that an information transmission/reception circuit for transmitting and/or receiving information (second to-be-transmitted target) is further included.

In the second embodiment also, the first unit 306 and the second unit 307 are spaced from each other without coming into contact with each other except at the protection part 134. Therefore, similarly to the first embodiment, when the first unit 306 and the second unit 307 are attached to the arm assembly (101, 102), they can be rotated around the rotation axis AR in accordance with bending and stretching of the arm assembly (101, 102) even if a designed rotation axis is misaligned with the rotation axis AR.

(Operation of Wireless Connector 300 According to Second Embodiment)

Hereinbefore, the configuration of the wireless connector 300 according to the second embodiment of the present invention has been described. Now, the operation of the wireless connector 300 according to the second embodiment will be described with reference to the circuit configuration diagram of FIG. 31.

Figure 31:
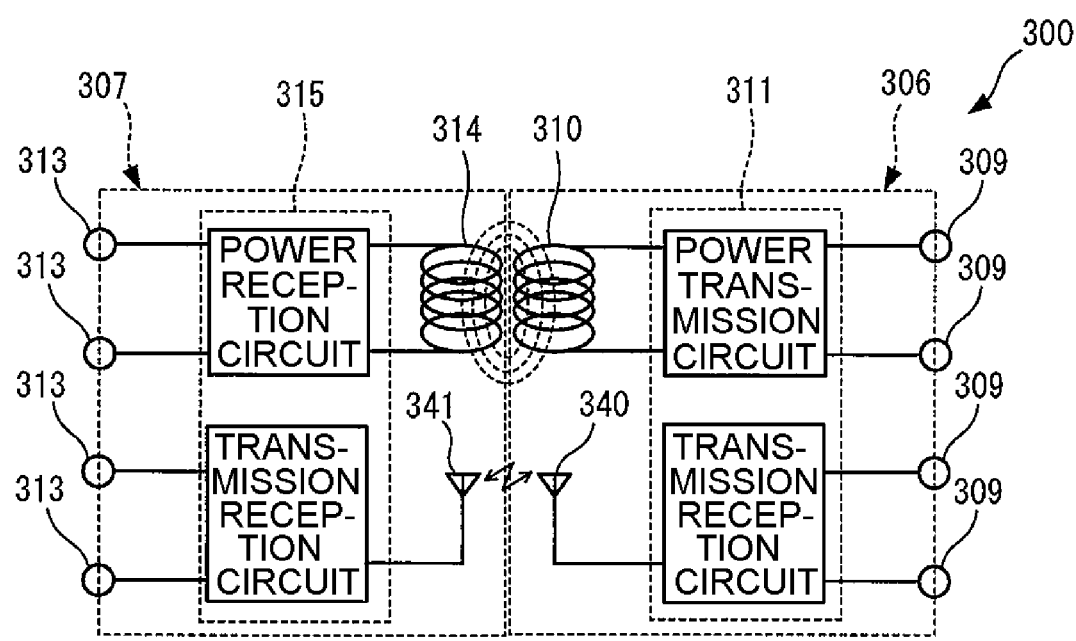
FIG. 31 is a diagram showing a circuit configuration in the wireless connector illustrated in FIG. 28.

As described above, the first transmission/reception assembly (310, 314) is arranged in the state of being spaced from and faced to each other along the rotation axis AR. As a result, as shown in FIG. 31, the first transmission/reception part 310 connected to a power transmission circuit included in the first circuit part 311 and the second transmission/reception part 314 connected to the power reception circuit included in the second circuit part 315 can be magnetically coupled by electromagnetic induction. Therefore, by operating in the manner similar to the wireless connector 100 described with reference to FIG. 7, electric power can be transmitted wirelessly between the first arm part 101 and the second arm part 102. Here, the "first transmission/reception assembly (310, 314)" is a generic term (assembly parts) including the first transmission/reception part 310 and the second transmission/reception part 314. The same also applies in the following.

Since the first transmission/reception part 310 and the second transmission/reception part 314 are arranged in the state of being spaced from and faced to each other along the rotation axis AR, they are magnetically coupled by electromagnetic induction even when the first unit 106 and the second unit 107 are rotated around the rotation axis AR. As a result, similarly to the transmission/reception assembly (110, 114) according to the first embodiment, the wireless connector 300 can wirelessly transmit electric power between the first arm part 101 and the second arm part 102 regardless of the state and the operation of bending and stretching of the arm assembly (101, 102).

The second transmission/reception assembly (340, 341) wirelessly transmits information (second to-be-transmitted target) by electromagnetic waves such as microwaves or light. Here, the "the second transmission/reception assembly (340, 341)" is a generic term (assembly parts) including the third transmission/reception part 340 and the fourth transmission/reception part 341. The same applies also in the following.

Specifically, the second transmission/reception assembly (340, 341) is arranged in the state of being spaced from and faced to each other along the rotation axis AR, as described above. As a result, as shown in FIG. 31, the third transmission/reception part 340 connected to the information (second to-be-transmitted target) transmission/reception circuit included in the first circuit part 311 and the fourth transmission/reception part 341 connected to the information (second to-be-transmitted target) transmission/reception circuit included in the second circuit part 315 can transmit and receive electromagnetic waves to/from each other. Therefore, for example, an electric signal including information from the first arm part 101 is transmitted to the third transmission/reception part 340 through the first connector part 309 and the first circuit part 311 (information transmission/reception circuit), and is received by the fourth transmission/reception part 341 as an electromagnetic wave including the information. The fourth transmission/reception part 341 converts the received electromagnetic wave into an electric signal including the information included in the electromagnetic wave, and outputs the electric signal. The electric signal including the information from the fourth transmission/reception part 341 is transmitted to the second arm part 102 through the second circuit part 315 (information transmission/reception circuit) and the second connector part 313. By such an operation, the information (second to-be-transmitted target) can be transmitted wirelessly from the first arm part 101 to the second arm part 102.

When the information (second to-be-transmitted target) is transmitted from the second arm part 102 to the first arm part 101, the information may be transmitted in a reverse order to that mentioned above.

Specifically, an electric signal including the information from the second arm part 102 is transmitted to the fourth transmission/reception part 341 through the second connector part 313 and the second circuit part 315 (information transmission/reception circuit), and is received by the third transmission/reception part 340 as an electromagnetic wave including the information. The third transmission/reception part 340 converts the received electromagnetic wave into an electric signal including the information included in the electromagnetic wave, and outputs the electric signal. The electric signal including the information from the third transmission/reception part 340 is transmitted to the first arm part 101 through the first circuit part 311 (information transmission/reception circuit) and the first connector part 309.

Since the third transmission/reception part 340 and the fourth transmission/reception part 341 are arranged in the state of being spaced from and faced to each other along the rotation axis AR, the information (second to-be-transmitted target) is wirelessly transmitted even when the first unit 106 and the second unit 107 are rotated around the rotation axis AR. As a result, the wireless connector 300 can operate as described above regardless of the state and the operation of bending and stretching of the arm assembly (101, 102), so that the information (second to-be-transmitted target) can be transmitted wirelessly between the first arm part 101 and the second arm part 102.

Also in the second embodiment, as in the first embodiment, the protruding part 123B of the second facing part 123 is fitted to the recessed part 121B of the first facing part 121. Therefore, the relative positional relationship in the first transmission/reception assembly (110, 114) and the relative positional relationship in the second transmission/reception assembly (340, 341) are restricted. Thus, for the same reason as in the first embodiment, even when the wireless connector 300 is arranged outside the arm assembly (101, 102), stable wireless transmission of electric power (first to-be-transmitted target) and information (second to-be-transmitted target) can be performed.

Furthermore, in the second embodiment also, as in the first embodiment, the protection part 134 surrounding the facing space is provided. Accordingly, as in the first embodiment, it becomes possible to provide the wireless connector 300 having excellent durability in various environments.

(Wireless Connector Attachment/Detachment Method According to Second Embodiment)

Hereinbefore, the operation of the wireless connector 300 according to the second embodiment of the present invention has been described. Now, a wireless connector attachment/detachment method according to the second embodiment will be described.

The wireless connector attachment/detachment method according to the second embodiment is a method for attaching/detaching the wireless connector 300 to/from the arm assembly (101, 102), and includes an attaching method and a detaching method for the wireless connector 300. The attaching method and the detaching method for the wireless connector 300 are similar to the attaching method and the detaching method for the wireless connector 100 according to the first embodiment, respectively. That is, in the description of the wireless connector attachment/detachment method according to the first embodiment, the components of the wireless connector 100 according to the first embodiment may be replaced by the respective corresponding components of the wireless connector 300 according to the second embodiment. In order to simplify the description, detailed description of the attaching method and the detaching method for the wireless connector 300 will be omitted.

Hereinbefore, the second embodiment of the present invention has been described.

In the second embodiment also, the wireless connector 300 can be attached to and detached from the arm assembly (101, 102) by work outside the arm assembly (101, 102). As a result, for example, the wireless connector 300 in which a failure has occurred can easily be replaced by a normal wireless connector 300. Therefore, the wireless connector 300 to the arm assembly (101, 102) can easily be repaired. In addition, the second embodiment exhibits the effects similar to those of the first embodiment.

In the second embodiment, not only the first transmission/reception assembly (310, 314) but also the second transmission/reception assembly (340, 341) is also arranged substantially in parallel to each other. By limiting the relative positional relationship of the second transmission/reception assembly (340, 341), the second transmission/reception assembly (340, 341) can be magnetically coupled at a relatively stable strength within a predetermined range, regardless of the bending/stretching states and the bending/stretching operations of the arm assembly (101, 102), similarly to the transmission/reception assembly (110, 114) according to the first embodiment. Therefore, even when the wireless connector 300 is arranged outside the arm assembly (101, 102), stable wireless transmission of electric power and information is enabled.

Third Embodiment

In the above-mentioned first embodiment, an example in which the recessed part 121B and the protruding part 123B are provided in the first facing part 121 and the second facing part 123, respectively, and the first transmission/reception part 110 and the second transmission/reception part 114 are provided in the recessed part 121B and an outer surface of the protruding part 123B (that is, the bottom surface of the recessed part 121B and the tip surface of the protruding part 123B), respectively, has been described.

However, the recessed part 121B and the protruding part 123B may not be provided. Alternatively, the recessed parts 121B may be provided in both of the first facing part 121 and the second facing part 123 with their bottom surfaces facing each other. Furthermore, the protruding parts 123B may be provided in both of the first facing part 121 and the second facing part 123 with their tip surfaces facing each other. Furthermore, one or both of the first transmission/reception part 110 and the second transmission/reception part 114 may be accommodated inside the first housing 108 and the second housing 112.

In the third embodiment, an example in which the first transmission/reception part and the second transmission/reception part are provided inside the first housing and the second housing, respectively, and wirelessly transmit electric power between the first arm part 101 and the second arm part 102 connected by the joint mechanism 103 to be bendable and stretchable will be described.

(Configuration of Wireless Connector 400 According to Third Embodiment)

Figure 32:
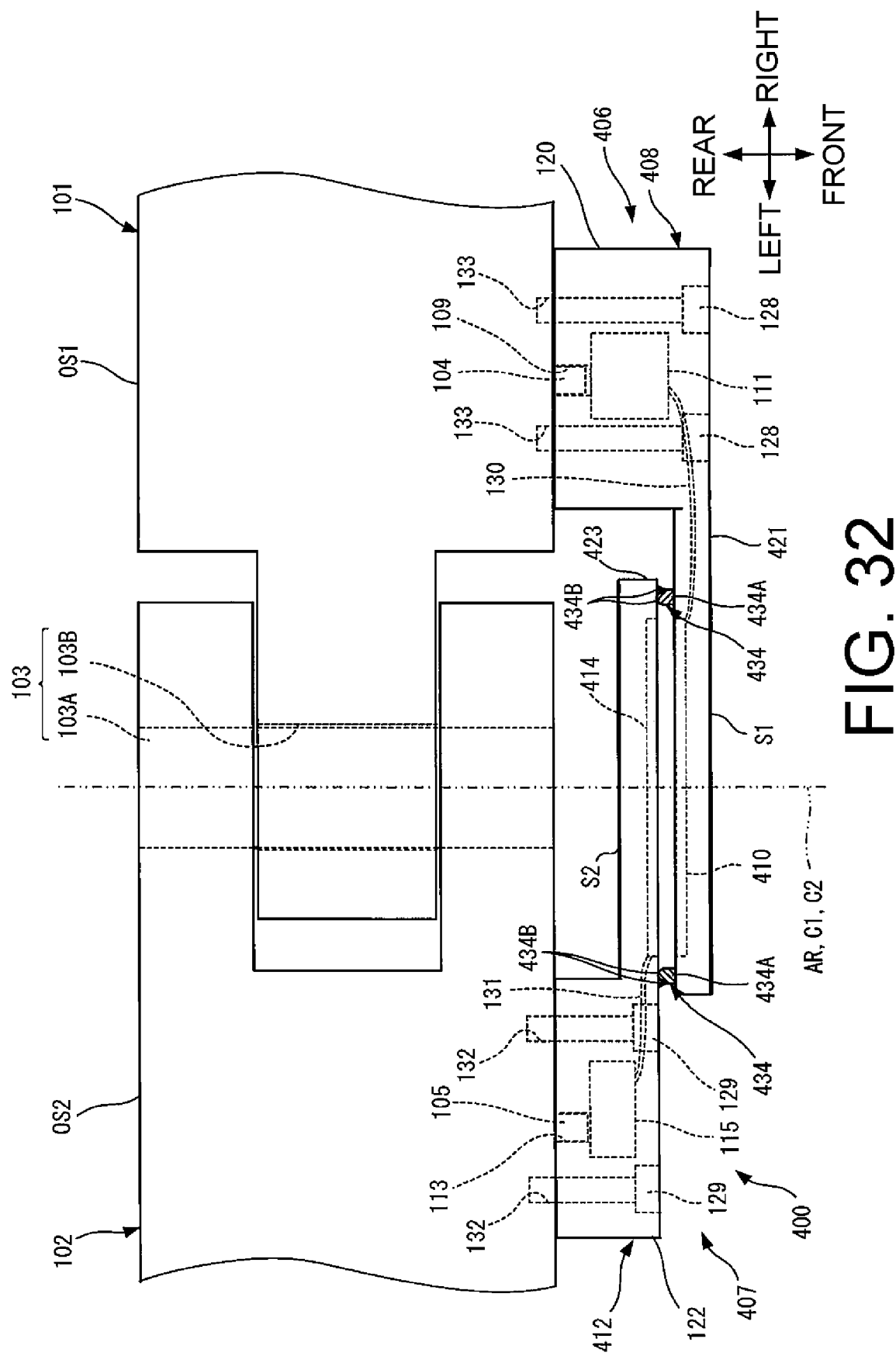
FIG. 32 is a view of a wireless connector attached to the first arm part and the second arm part according to a third embodiment of the present invention as viewed from the above.

As shown in a plan view of FIG. 32, a wireless connector 400 according to a third embodiment of the present invention is provided with a first unit 406 and a second unit 407 which are removably attached from the outside to the first arm part 101 and the second arm part 102 similar to those of the first embodiment, respectively. The first unit 406 and the second unit 407 are configured to be separable like in the first embodiment and, when they are attached to the first arm part 101 and the second arm part 102, respectively, they can be rotated relative to each other around the rotation axis AR.

Figure 33:
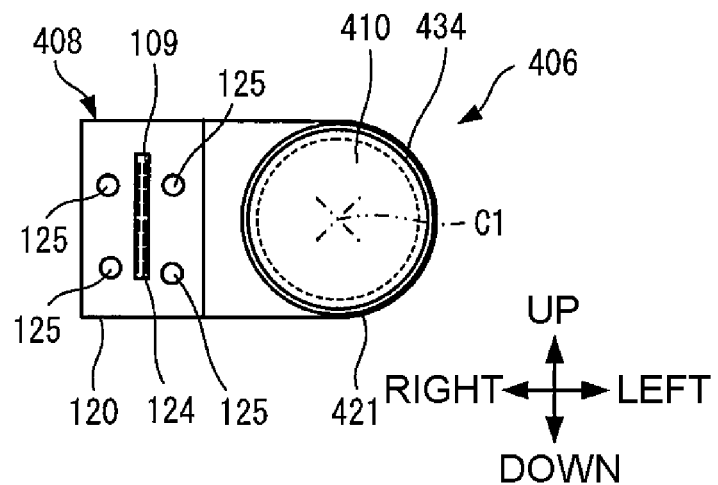
FIG. 33 is a first unit used in the wireless connector illustrated in FIG. 32 as viewed from the rear.

As shown in FIG. 32 and FIG. 33 as viewed from the rear, the first unit 406 includes the first connector part 109 and the first circuit part 111 similar to those of the first embodiment, and a first housing 408, a first transmission/reception part 410, and a protection part 434 which are different from those of the first embodiment. In FIG. 33, the first bolts 128 similar to those of the first embodiment are omitted.

Figure 34:
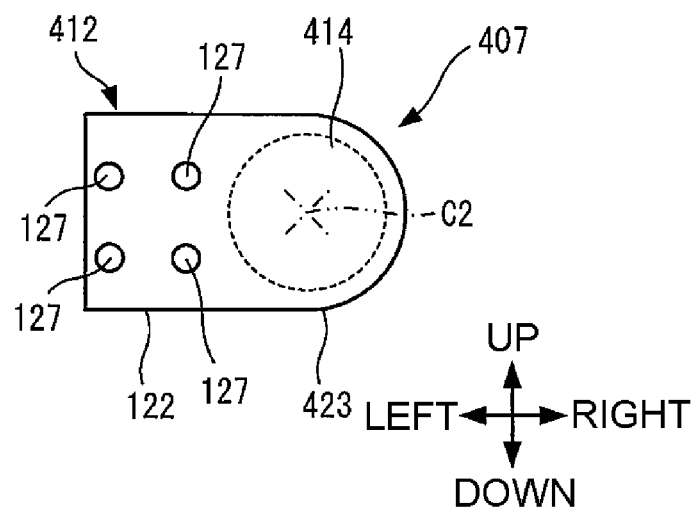
FIG. 34 is a second unit used in the wireless connector illustrated in FIG. 32 as viewed from the front.
Figure 35A:
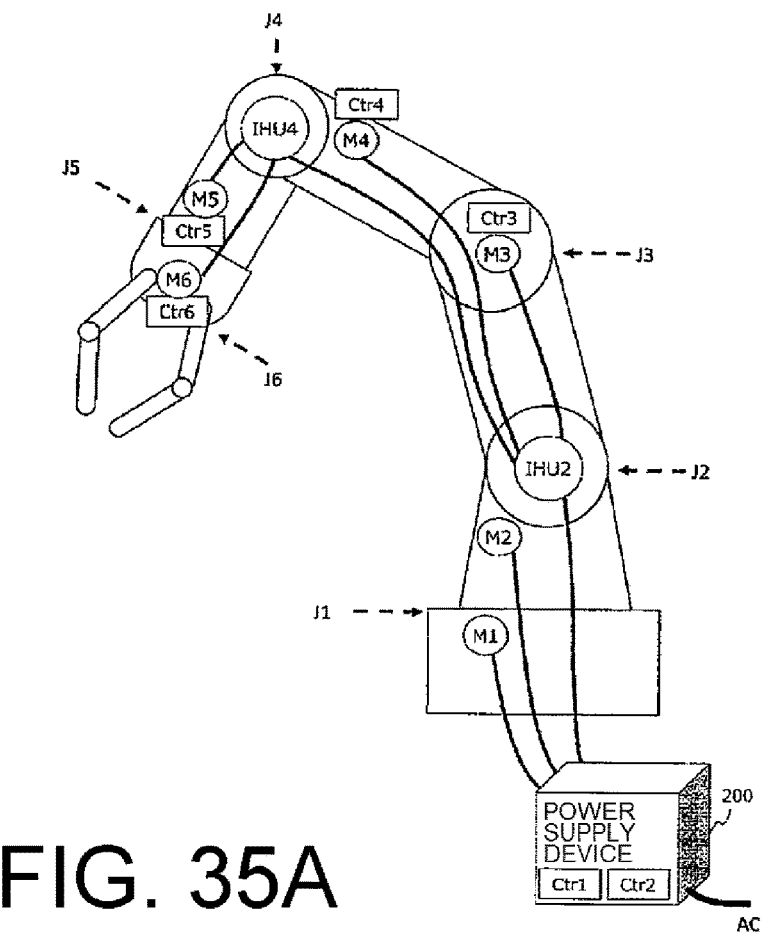
FIG. 35A is a diagram showing a configuration of a robot arm device according to the related art disclosed in Patent Document 1.
Figure 35B:
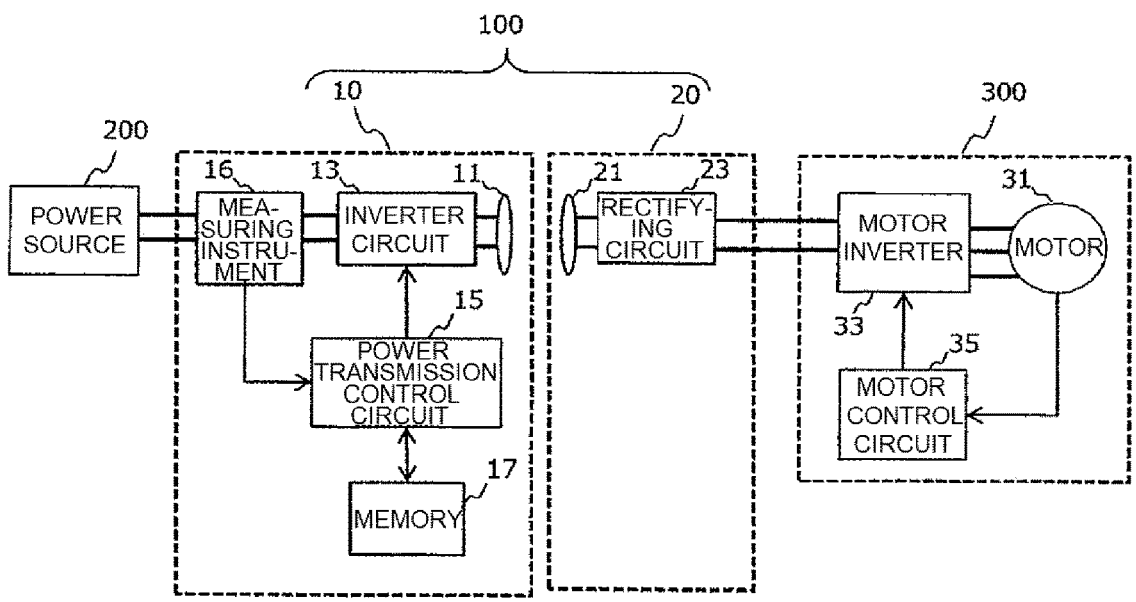
FIG. 35B is a diagram showing a circuit configuration of a wireless power transmission system according to the related art disclosed in Patent Document 1.

As shown in FIG. 32 and FIG. 34 as viewed from the front, the second unit 407 includes components 412,113, 414, 115 corresponding to the components 408,109, 410, 111 included in the first unit 406, respectively. Specifically, the second unit 407 includes the second connector part 113 and the second circuit part 115 which are similar to those of the first embodiment, and a second housing 412 and a second transmission/reception part 414 which are different from those of the first embodiment. In FIG. 34, the second bolts 129 similar to those of the first embodiment are omitted.

As in the first embodiment, the first housing 408 is a hollow member to which the other components 109,410,111, and 434 included in the first unit 406 are attached. As in the first embodiment, the second housing 412 is a hollow member to which the other components 113, 414, and 115 included in the second unit 407 are attached. Each of the first housing 408 and the second housing 412 is typically made of a non-magnetic material such as resin.

The first housing 408 according to the third embodiment includes the first arm mounting part 120 similar to that of the first embodiment and a first facing part 421 different from that of the first embodiment. The second housing 412 includes the second arm mounting part 122 similar to that of the first embodiment and a second facing part 423 different from that of the first embodiment.

The first housing 408 has a sealed structure sufficient to inhibit passage of a liquid except at the first opening 124 for fitting to the first mating connector part 104. Similarly, the second housing 412 has a sealed structure sufficient to inhibit passage of a liquid except at the second opening 126 for fitting to the second mating connector part 105.

The first facing part 421 and the second facing part 423 are flat-plate-shaped parts whose respective base ends are connected to a left end of the first arm mounting part 120 and a right end of the second arm mounting part 122, respectively, and which extend in mutually approaching directions as viewed from the front. Thus, the first facing part 121 and the second facing part 123 are spaced from and faced to each other along the rotation axis AR.

That is, the first facing part 421 is different from the first facing part 121 according to the first embodiment in that the recessed part 121B is not provided. In addition, the second facing part 423 is different from the second facing part 123 according to the first embodiment in that the protruding part 123B is not provided.

Specifically, the first facing part 421 forms a flat-plate shape connected to the first arm mounting part 120 and extending leftward and has a front surface flush with the front surface of the first arm mounting part 120. The first facing part 421 has a constant height substantially the same as the height of the first arm mounting part 120, and has a tip forming a semicircular shape protruding leftward when viewed from the front.

The second facing part 423 forms a flat-plate shape connected to the second arm mounting part 122 and extending rightward and has a front surface flush with the front surface of the second arm mounting part 122. The second facing part 423 has a constant height substantially the same as the height of the second arm mounting part 122, and has a tip forming a semicircular shape protruding rightward when viewed from the front.

The first facing part 421 has a thickness which is thinner than the difference between the thickness of the first arm mounting part 120 and the thickness of the second arm mounting part 122. Thus, the tip of the first facing part 421 is arranged in front of the second facing part 423 with a space left therefrom. The first facing part 421 and the second facing part 423 are arranged in a state where substantially circular regions including the respective tips are spaced from and faced to each other along the rotation axis AR outside the joint mechanism 103. The second facing part 423 has a thickness which may be set as appropriate but is thinner than that of the second arm mounting part 122 and which is substantially same as the thickness of the first facing part 421 in the third embodiment.

Similarly to the first transmission/reception part 110 and the second transmission/reception part 114 according to the first embodiment, the first transmission/reception part 410 and the second transmission/reception part 414 are members for wirelessly transmitting electric power (AC power) therebetween and are disposed in a state of being spaced from and faced to each other along the rotation axis AR outside the joint mechanism 103 so as to wirelessly transmit electric power.

In the third embodiment, the first transmission/reception part 410 is fixed to an inside of the first facing part 421, for example, fixed to an inner surface on the rear side of the first facing part 421 by a fixing member such as an adhesive or a screw. The second transmission/reception part 414 is fixed to an inside of the second facing part 423, for example, fixed to an inner surface on the front side of the second facing part 423 by a fixing means such as an adhesive, a screw.

Thus, the first transmission/reception part 410 and the second transmission/reception part 414 are disposed to face each other along the rotation axis AR outside the joint mechanism 103. The first transmission/reception part 410 and the second transmission/reception part 414 are arranged in the state of being spaced from each other without contacting each other, and preferably arranged in parallel with each other towards a direction perpendicular to the rotation axis AR.

Thus, the first transmission/reception part 410 and the second transmission/reception part 414 are different from the first transmission/reception part 110 and the second transmission/reception part 114 according to the first embodiment in positions where they are fixed to the first housing 408 and the second housing 412, respectively. Except this point, the first transmission/reception part 410 and the second transmission/reception part 414 may be configured substantially similarly to the first transmission/reception part 110 and the second transmission/reception part 114 according to the first embodiment.

Similarly to the protection part 134 according to the first embodiment, the protection part 434 comprises an annular elastic member for preventing intrusion of a foreign matter into the facing space, and is provided so as to close at least a part of the gap continuous to the facing space which is a space between the first transmission/reception part 410 and the second transmission/reception part 414 in the state of being faced to each other. In the third embodiment, the facing space is sandwiched between a rear surface of the first facing part 421 and a front surface of the second facing part 423.

As in the first embodiment, the protection part 434 according to the third embodiment comprises an oil seal and closes the gap continuous to the facing space in a liquid-tight state.

The protection part 434 may be provided so as to close a part or a whole of a gap continuous to a facing space where the facing space is a space between the first coil member included in the first transmission/reception part 410 and the second coil member included in the second transmission/reception part 414.

As shown in FIG. 32, the protection part 434 includes a fixed part 434A and a contacting part 434B and is integrally formed by, for example, an elastic member such as rubber.

The fixed part 434A of the protection part 434 has an annular shape centered on the first central axis C1. The fixed part 434A of the protection part 434 is fixed to the rear surface of the first facing part 421 (that is, a surface facing the second facing part 423) so as to surround the first transmission/reception part 410 when viewed from the rear.

The contacting part 434B of the protection part 434 has a base end connected to the fixed part 434A, and a tip pressed against the front surface of the second facing part 423 (that is, a surface facing the first facing part 421), so that the contacting part 434B is annularly and continuously brought into contact with the front surface. The contacting part 434B of the protection part 434 is provided so that a portion brought into contact with the second facing part 423 surrounds the second transmission/reception part 414 when viewed from the front.

In detail, as in the first embodiment, the contacting part 434B of the protection part 434 is pressed against the front surface of the second facing part 423 with a strength sufficient to prevent a liquid, dust or the like from entering into the facing space. In the third embodiment, as shown in FIG. 32, an example in which each of the two contacting parts 434B is in contact with the front surface of the second facing part 423 is illustrated. However, one contacting part 434B may be sufficient.

The first unit 406 and the second unit 407 according to the third embodiment are in contact with each other only at the protection part 434, and are spaced from each other without being in contact with each other except at the protection part 434.

In the third embodiment, the protection part 434 is fixed to the first housing 408 and brought into contact with the second housing 412 but may be fixed to the second housing 412 and brought into contact with the first housing 408 so as to close a part or a whole of the gap continuous to the facing space.

Hereinbefore, the configuration of the wireless connector 400 according to the third embodiment of the present invention has been described.

In the third embodiment also, similarly to the first embodiment, the first unit 406 and the second unit 407 are spaced from each other without being brought into contact with each other except at the protection part 434. The protection part 434 as a part of mutual contact has an elasticity. Therefore, even if the designed rotation axis is slightly misaligned with the rotation axis AR, they can be rotated around the rotation axis AR in accordance with bending of the arm assembly (101, 102).

(Operation of Wireless Connector 400 According to Third Embodiment)

In the third embodiment also, the first transmission/reception part 410 and the second transmission/reception part 414 are arranged in the state of being spaced from and faced to each other along the rotation axis AR. Therefore, the first transmission/reception part 410 and the second transmission/reception part 414 can operate in the manner similar to the first transmission/reception part 110 and the second transmission/reception part 114 according to the first embodiment. As a result, the wireless connector 400 can wirelessly transmit electric power regardless of the bending/stretching state and the bending/stretching operation of the arm assembly (101, 102), as in the wireless connector 100 according to the first embodiment.

Also in the third embodiment, by providing the protection part 434 surrounding the facing space, the intrusion of a foreign matter into the facing space can be prevented regardless of the bending/stretching state and the bending/stretching operation of the arm assembly (101, 102), as in the first embodiment. Accordingly, it is possible to provide the wireless connector 400 having excellent durability under various environments.

(Wireless Connector Attachment/Detachment Method According to Third Embodiment)

A wireless connector attachment/detachment method according to the third embodiment is substantially similar to the wireless connector attachment/detachment method according to the first embodiment.

The attachment method for the wireless connector 400 according to the third embodiment is started by preparing a robot device including the arm assembly (101, 102) connected via the joint mechanism 103 and the wireless connector 400, in the manner similar to the first embodiment.

Then, by the step similar to the step 1 (see FIG. 8) according to the first embodiment, the second unit 407 is attached to the second arm part 102 from the outside of the second arm part 102.

Next, by the step similar to the step 2 according to the first embodiment, the first unit 406 is attached to the first arm part 101 from the outside of the first arm part 101. The step 2 according to the third embodiment includes the steps 2A and 2B similar to those of the first embodiment. However, in the third embodiment, it is only necessary that the first mating connector part 104 is fitted to the first connector part 109 in the step 2A, and the protruding part 123B need not be fitted to the recessed part 121B. Thus, the wireless connector 400 can more easily be attached as compared with the wireless connector 100 according to the first embodiment.

As in the first embodiment, the detaching method for the wireless connector 400 according to the third embodiment is performed if necessary, after the wireless connector 400 is attached to the robot device. Also in the third embodiment, the wireless connector 400 is detached from the arm assembly (101, 102) by performing the steps 3 and 4 (see FIG. 9) similar to those in the first embodiment.

Hereinbefore, the third embodiment of the present invention has been described.

The present invention is not limited to the first through the third embodiments and the first through the eighteenth modifications but may be modified as follows.

According to the third embodiment, the wireless connector 400 can be attached to and detached from the arm assembly (101, 102) by work outside the arm assembly (101, 102). As a result, for example, the wireless connector 400 in which a failure has occurred can easily be replaced by a normal wireless connector 400. Therefore, the wireless connector 400 can easily be repaired.

In order to easily repair the wireless connector 400, the protection part 434 is not an essential structure. In the third embodiment, the protection part 434 is provided as in the first embodiment. Therefore, it becomes possible to provide the wireless connector 400 having excellent durability under various environments.

In the third embodiment, the example in which the mutually facing surfaces of the first facing part 421 and the second facing part 423 are flat has been described. However, the protruding part 123B and the recessed part 121B fitted to each other as in the first embodiment may be provided on one and the other of the mutually facing surfaces of the first facing part 421 and the second facing part 423, respectively.

The protruding part 123B and the recessed part 121B function as a guide mechanism for restricting the relative positional relationship of the first transmission/reception part 410 and the second transmission/reception part 414 within a predetermined range even when they are rotated around the rotation axis AR. Therefore, similarly to the first embodiment, the first transmission/reception part 410 and the second transmission/reception part 414 can magnetically be coupled at a relatively stable strength in a predetermined range regardless of the bending/stretching state and the bending/stretching operation of the arm assembly (101, 102). Accordingly, even when the wireless connector is arranged outside the arm assembly (101, 102), stable wireless power transmission can be performed.

<Modifications of Protection Part 134, 434>

For example, in the first to the third embodiments, the example in which the protection parts 134 and 434 comprise the oil seal. However, it is sufficient that the protection parts 134 and 434 comprise an elastic member provided so as to close at least a part (that is, a part or a whole) of the gap continuous to the facing space.

For example, the protection parts 134 and 434 may be a brush-like object in which linear members made of resin, rubber or the like are provided at a predetermined density or intervals. For example, the protection parts 134 and 434 may comprise elongated belt-like members made of resin, rubber or the like which are arranged at predetermined intervals. In such a case, the protection parts 134 and 434 may not continuously close the gap continuous to the facing space, but may intermittently close the gap.

For example, the protection parts 134 and 434 may be provided in both of the first housing 108, 208, or 408 and the second housing 112, 212, or 412.

Furthermore, for example, the protection parts 134 and 434 provided in one of the first housing 108, 208, or 408 and the second housing 112, 212, or 412 may be spaced from the other housing at a predetermined interval without being brought into contact with the other housing.

With these modifications also, at least a part of the gap continuous to the facing space is closed. It is therefore possible to at least reduce the possibility that a small piece or magnetic powder enters the facing space. Thus, the wireless connectors 100, 200, 300, and 400 having excellent durability can be provided.

<Other Modifications>

For example, in the first embodiment, an example in which electric power is transmitted as a to-be-transmitted target has been described. However, the to-be-transmitted target may be information or may be both electric power and information. In such a case, for example, the configuration of the first circuit part 111 and the second circuit part 115 of the wireless connector 100 according to the first embodiment may be changed depending on the to-be-transmitted target.

For example, in the first embodiment, an example in which the wireless connector 100 is attached to the arm assembly (101,102) of the robot device has been described. However, an object to which the wireless connector 100 is attached is not limited to the robot device. The first arm part 101 is an example of a first object to which the first unit 106 is attached, while the second arm part 102 is an example of a second object to which the second unit 107 is attached. It is only necessary that the first object and the second object are rotatably connected to each other with the rotation axis AR as a fulcrum. Typically, the first object and the second object are mounted to various types of devices and apparatuses, and each have a length like the first arm part 101 and the second arm part 102.

For example, in the first embodiment, the case where a transmission medium for the to-be-transmitted target between the transmission/reception assembly (110, 114) is electromagnetic induction has been described by way of example. However, the transmission medium is not limited to the electromagnetic induction, which is one mode of magnetic field coupling. The transmission medium may be, for example, magnetic resonance which is another mode of magnetic field coupling, and may be electric field coupling similar to that between electrodes constituting a capacitor, transmission/reception of electromagnetic waves such as microwaves and light, and so on. The configurations of the first transmission/reception part 110, the second transmission/reception part 114, the first circuit part 111, and the second circuit part 115 may be changed depending on the transmission medium between the first transmission/reception part 110 and the second transmission/reception part 114.

For example, in the first embodiment, an example in which the first transmission/reception part 110 and the second transmission/reception part 114 have a disc-like outer shape has been described. However, the outer shape of each of the first transmission/reception part 110 and the second transmission/reception part 114 is not limited to the disc shape, and may be a flat-plate-like outer shape of other configurations. The first transmission/reception part 110 and the second transmission/reception part 114 are not limited to the flat-plate-like outer shape, and may have, for example, complementary three-dimensional shapes such as a mountain shape having a vertex on the first central axis C1 and a valley shape having a bottom on the second central axis C2. Similarly, the outer shapes of the first coil member and the second coil member included respectively in the first transmission/reception part 110 and the second transmission/reception part 114 are not limited to the disc shape, and may be a flat plate shape of other configurations, complementary three-dimensional shapes, or the like. Furthermore, the bottom surface of the recessed part 121B of the first facing part 121 and the tip surface of the protruding part 123B of the second facing part 123 are not limited to a flat surface, and may be complementary three-dimensional shapes or the like.

For example, in the first embodiment, an example in which the first connector part 109 and the first mating connector part 104 are contact-type electric connectors which are electrically connected by being fitted to each other has been described. However, each of the first connector part and the first mating connector part is not limited to the contact-type electric connector, and may comprise a contactless connector constituted of, for example, an element, a component, or the like for wirelessly transmitting electric power by magnetic field coupling, electric field coupling, and transmission/reception of electromagnetic waves such as microwaves or light. Similarly, the second connector part 113 and the second mating connector part 105 may comprise a contactless connector so as to wirelessly transmit electric power.

Although the embodiments and the modifications of the present invention have been described above, the present invention is not limited thereto. For example, the present invention includes a mode obtained by appropriately combining some or all of the embodiments and the modifications described above, and a mode obtained by appropriately changing the above-mentioned mode.

DESCRIPTION OF REFERENCE NUMERALS 100, 200, 300, 400 wireless connector
101 first arm part (first object)
102 second arm part (second object)
103 joint mechanism
103A shaft part
103B hole part
104 first mating connector part
105 second mating connector part
106, 206, 306, 406 first unit
107, 207, 307, 407 second unit
108, 208, 408 first housing
109, 209, 309 first connector part
110, 310, 410 first transmission/reception part
111 first circuit part (power transmission circuit)
311 first circuit part (power transmission circuit, transmission/reception circuit)
112, 212, 412 second housing
113, 213, 313 second connector part
114, 314, 414 second transmission/reception part
115 second circuit part (power reception circuit)
315 second circuit part (power reception circuit, power reception circuit)
120, 220 first arm mounting part
121, 421 first facing part
121A first flat-plate part
121B recessed part
122, 222 second arm mounting part
123, 423 second facing part
123A second flat-plate part
123B protruding part
124 first opening
125 first bolt hole
126 second opening
127 second bolt hole
128 first bolt
129 second bolt
130, 230 first lead wire
131, 231 second lead wire
132 second threaded bole part
133 first threaded bole part
134, 434 protection part
134A, 434A fixed part
134B, 434B contacting part
340 third transmission/reception part
341 fourth transmission/reception part
OS1 first outer shell
OS2 second outer shell
AR rotation axis
C1 first central axis
C2 second central axis
S1 first shield member
S2 second shield member

The invention claimed is:

1. A robot device comprising:
a first arm part and a second arm part which are connected via a joint mechanism configured to rotatably connect the first and the second arm parts with a rotation axis as a fulcrum, and
a wireless connector disposed outside the first arm part and the second arm part, the wireless connector being configured to wirelessly transmit outside the joint mechanism a to-be-transmitted target, which is at least one of electric power and information, between the first arm part and the second arm part,
wherein:
the first arm part includes a first mating connector part exposed to an outside of the first arm part, and
the second arm part includes a second mating connector part exposed to an outside of the second arm part,
wherein the wireless connector comprises:
a first housing to which a first transmission/reception part configured to wirelessly transmit the to-be-transmitted target, and a first connector part configured to transmit the to-be-transmitted target to/from the first arm part by being removably attached to the first mating connector part are fixed; and
a second housing to which a second transmission/reception part configured to wirelessly transmit the to-be-transmitted target to/from the first transmission/reception part, and a second connector part configured to transmit the to-be-transmitted target to/from the second arm part by being removably attached to the second mating connector part are fixed,
wherein, when the first connector part and the second connector part are attached to the first mating connector part and the second mating connector part, respectively, the first transmission/reception part and the second transmission/reception part are arranged in a state of being spaced from and faced to each other along the rotation axis so as to wirelessly transmit the to-be-transmitted target outside the joint mechanism,
wherein the wireless connector further includes a protection part comprising an elastic member for preventing intrusion of a foreign matter into a facing space, which is a space between the first transmission/reception part and the second transmission/reception part in the state of being faced to each other, the protection part being provided in at least one housing of the first housing and the second housing so as to close at least a part of a gap continuous to the facing space.

2. The robot device according to claim 1, wherein:
the first housing serving as the one housing includes a recessed part forming a recess of a columnar shape in which the first transmission/reception part is arranged,
the second housing serving as the other housing includes a protruding part of a columnar shape on which the second transmission/reception part is arranged, and
the protection part is provided on a bottom surface, an inner peripheral surface, or a peripheral portion of the recessed part,
wherein, when the first connector part and the second connector part are attached to the first mating connector part and the second mating connector part, respectively, the first transmission/reception part and the second transmission/reception part are arranged in a state of being spaced from and faced to each other along the rotation axis so as to wirelessly transmit the to-be-transmitted target outside the joint mechanism and a tip surface of the protruding part and the bottom surface of the recessed part are faced to each other with a tip of the protection part brought into contact with the tip surface, an outer peripheral surface, or a peripheral portion of the protruding part.

3. The robot device according to claim 1, wherein:
the first housing serving as the one housing includes a recessed part forming a recess of a columnar shape in which the first transmission/reception part is arranged,
the second housing serving as the other housing includes a protruding part of a columnar shape on which the second transmission/reception part is arranged, and
wherein the protection part is provided on a tip surface, an outer peripheral surface, or a peripheral portion of the protruding part,
wherein, when the first connector part and the second connector part are attached to the first mating connector part and the second mating connector part, respectively, the first transmission/reception part and the second transmission/reception part are arranged in a state of being spaced from and faced to each other along the rotation axis so as to wirelessly transmit the to-be-transmitted target outside the joint mechanism and the protruding part and the recessed part are faced to each other with a tip of the protection part brought into contact with a bottom surface, an inner peripheral surface, or a peripheral portion of the recessed part.

4. A robot device comprising:
a first arm part and a second arm part which are connected via a joint mechanism configured to rotatably connect the first and the second arm parts with a rotation axis as a fulcrum, and
a wireless connector disposed outside the first arm part and the second arm part, the wireless connector being configured to wirelessly transmit outside the joint mechanism a to-be-transmitted target, which is at least one of electric power and information, between the first arm part and the second arm part,
wherein:
the first arm part includes a first mating connector part exposed to an outside of the first arm part, and
the second arm part includes a second mating connector part exposed to an outside of the second arm part,
wherein the wireless connector comprises:
a first housing to which a first transmission/reception part configured to wirelessly transmit the to-be-transmitted target, and a first connector part configured to transmit the to-be-transmitted target to/from the first arm part by being removably attached to the first mating connector part are fixed; and
a second housing to which a second transmission/reception part configured to wirelessly transmit the to-be-transmitted target to/from the first transmission/reception part, and a second connector part configured to transmit the to-be-transmitted target to/from the second arm part by being removably attached to the second mating connector part are fixed,
wherein each of the first housing and the second housing has a sealed structure formed of a non-magnetic material,
the first transmission/reception part is accommodated inside the first housing, and
the second transmission/reception part is accommodated inside the second housing,
wherein, when the first connector part and the second connector part are attached to the first mating connector part and the second mating connector part, respectively, the first transmission/reception part and the second transmission/reception part are arranged in a state of being spaced from and faced to each other along the rotation axis so as to wirelessly transmit the to-be-transmitted target outside the joint mechanism.

5. The robot device according to claim 4, wherein:
the wireless connector further includes a protection part comprising an elastic member for preventing intrusion of a foreign matter into a facing space, which is a space between the first transmission/reception part and the second transmission/reception part in the state of being faced to each other, the protection part being provided in at least one housing of the first housing and the second housing so as to close at least a part of a gap continuous to the facing space.

6. A wireless connector for wirelessly transmitting outside a joint mechanism a first to-be-transmitted target, which is electric power, between a first object and a second object which are rotatably connected via the joint mechanism with a rotation axis as a fulcrum, wherein the wireless connector is disposed outside the first object and the second object, and the wireless connector comprises:
a first unit removably attached to the first object from an outside of the first object, and
a second unit removably attached to the second object from an outside of the second object,
wherein the first unit comprises:
a first transmission/reception part configured to wirelessly transmit the first to-be-transmitted target;
a first connector part configured to transmit the first to-be-transmitted target to/from the first object by being removably attached to the first object from the outside of the first object; and
a first housing to which the first transmission/reception part and the first connector part are fixed,
wherein the second unit comprises:
a second transmission/reception part configured to wirelessly transmit the first to-be-transmitted target to/from the first transmission/reception part;
a second connector part configured to transmit the first to-be-transmitted target to/from the second object by being removably attached to the second object from the outside of the second object; and
a second housing to which the second transmission/reception part and the second connector part are fixed,
wherein, when the first unit and the second unit are attached to the first object and the second object, respectively, the first transmission/reception part and the second transmission/reception part are arranged in a state of being spaced from and faced to each other so as to wirelessly transmit the first to-be-transmitted target,
wherein the wireless connector further includes a protection part comprising a member for preventing intrusion of a foreign matter into a facing space, which is a space between the first transmission/reception part and the second transmission/reception part in the state of being faced to each other, the protection part being provided in at least one housing of the first housing and the second housing so as to close at least a part of a gap continuous to the facing space.

7. The wireless connector according to claim 6, wherein:
the first housing serving as the one housing includes a recessed part forming a recess of a columnar shape in which the first transmission/reception part is arranged, the second housing serving as the other housing includes a protruding part of a columnar shape on which the second transmission/reception part is arranged, and the protection part is provided on a bottom surface, an inner peripheral surface, or a peripheral portion of the recessed part, wherein, when the first connector part and the second connector part are attached to the first object and the second object, respectively, the first transmission/reception part and the second transmission/reception part are arranged in a state of being spaced from and faced to each other along the rotation axis so as to wirelessly transmit the to-be-transmitted target outside the joint mechanism and the protruding part and the recessed part are faced to each other with the protection part brought into contact with a tip surface, an outer peripheral surface, or a peripheral portion of the protruding part.

8. The wireless connector according to claim 6, wherein:

the first housing serving as the one housing includes a recessed part forming a recess of a columnar shape in which the first transmission/reception part is arranged, the second housing serving as the other housing includes a protruding part of a columnar shape on which the second transmission/reception part is arranged, and the protection part is provided on a tip surface, an outer peripheral surface, or a peripheral portion of the protruding part, and wherein, when the first connector part and the second connector part are attached to the first object and the second object, respectively, the first transmission/reception part and the second transmission/reception part are arranged in a state of being spaced from and faced to each other along the rotation axis so as to wirelessly transmit the to-be-transmitted target outside the joint mechanism and the protruding part and the recessed part are faced to each other with the protection part brought into contact with a bottom surface, an inner peripheral surface, or a peripheral portion of the recessed part.

9. A wireless connector for wirelessly transmitting a first to-be-transmitted target outside a joint mechanism, which is electric power, between a first object and a second object which are rotatably connected via the joint mechanism with a rotation axis as a fulcrum, wherein the wireless connector is disposed outside the first object and the second object, and the wireless connector comprises:

a first unit removably attached to the first object from an outside of the first object, and a second unit removably attached to the second object from an outside of the second object, wherein the first unit comprises:

a first transmission/reception part configured to wirelessly transmit the first to-be-transmitted target;

a first connector part configured to transmit the first to-be-transmitted target to/from the first object by being removably attached to the first object from the outside of the first object; and a first housing to which the first transmission/reception part and the first connector part are fixed, wherein the second unit comprises:

a second transmission/reception part configured to wirelessly transmit the first to-be-transmitted target to/from the first transmission/reception part;

a second connector part configured to transmit the first to-be-transmitted target to/from the second object by being removably attached to the second object from the outside of the second object; and a second housing to which the second transmission/reception part and the second connector part are fixed, wherein each of the first housing and the second housing has a sealed structure formed of a non-magnetic material;

the first transmission/reception part is accommodated inside the first housing; and the second transmission/reception part is accommodated inside the second housing;

wherein, when the first unit and the second unit are attached to the first object and the second object, respectively, the first transmission/reception part and the second transmission/reception part are arranged in a state of being spaced from and faced to each other so as to wirelessly transmit the first to-be-transmitted target.

10. The wireless connector according to claim 9, further including:

a protection part comprising a member for preventing intrusion of a foreign matter into a facing space, which is a space between the first transmission/reception part and the second transmission/reception part in the state of being faced to each other, the protection part being provided in at least one housing of the first housing and the second housing so as to close at least a part of a gap continuous to the facing space.

11. The wireless connector according to claim 9, wherein:

the first transmission/reception part includes a first coil member of a flat-plate shape for transmitting the first to-be-transmitted target, and the second transmission/reception part includes a second coil member of a flat-plate shape for transmitting the first to-be-transmitted target by magnetic field coupling with the first coil member, wherein, when the first unit and the second unit are attached to the first object and the second object, respectively, the first coil member and the second coil member are arranged in parallel in a state of being spaced from and faced to each other so as to wirelessly transmit the first to-be-transmitted target.

12. The wireless connector according to claim 9, wherein:

the first unit further includes:

a third transmission/reception part fixed to the first housing and configured to wirelessly transmit a second to-be-transmitted target which is information, the second unit further includes:

a fourth transmission/reception part fixed to the second housing and configured to wirelessly transmit the second to-be-transmitted target to/from the third transmission/reception part, wherein the first connector part transmits the first to-be-transmitted target and the second to-be-transmitted target to/from the first object by being removably attached to the first object from the outside of the first object, and the second connector part transmits the first to-be-transmitted target and the second to-be-transmitted target to/from the second object by being removably attached to the second object from the outside of the second object, wherein, when the first unit and the second unit are attached to the first object and the second object, respectively, the third transmission/reception part and the fourth transmission/reception part are arranged in a state of being spaced from and faced to each other so as to wirelessly transmit the second to-be-transmitted target.

13. The wireless connector according to claim 12, wherein:
the third transmission/reception part includes a first antenna member configured to transmit the second to-be-transmitted target which is information;
the fourth transmission/reception part includes a second antenna member configured to transmit the second to-be-transmitted target;
the first transmission/reception part is provided around the third transmission/reception part; and
the second transmission/reception part is provided around the fourth transmission/reception part;
wherein, when the first unit and the second unit are attached to the first object and the second object, respectively, the first antenna member and the second antenna member are arranged in parallel in a state of being spaced from and faced to each other so as to wirelessly transmit the second to-be-transmitted target.

14. A wireless connector for wirelessly transmitting outside a joint mechanism, between a first object and a second object which are rotatably connected via the joint mechanism with a rotation axis as a fulcrum, at least one of electric power and information as a to-be-transmitted target, wherein the wireless connector is disposed outside the first object and the second object, and the wireless connector comprises:
a first unit removably attached to the first object from an outside of the first object, and
a second unit removably attached to the second object from an outside of the second object,
wherein the first unit comprises:
a first transmission/reception part including a first coil member configured to wirelessly transmit the to-be-transmitted target;
a first connector part removably attached to the first object so as to transmit the to-be-transmitted target to/from the first object by being fitted to the first object from the outside of the first object; and
a first housing to which the first coil member and the first connector part are fixed,
wherein the second unit comprises:
a second transmission/reception part including a second coil member configured to wirelessly transmit the to-be-transmitted target to/from the first coil member;
a second connector part removably attached to the second object so as to transmit the to-be-transmitted target to/from the second object by being fitted to the second object from the outside of the second object; and
a second housing to which the second coil member and the second connector part are fixed,
wherein the first connector part and the second connector part have the same fitting direction, and
the first coil member and the second coil member are arranged in a state of being spaced from and faced to each other along the fitting direction to cause magnetic field coupling therebetween;
wherein the wireless connector further includes a protection part comprising a member for preventing intrusion of a foreign matter into a facing space, which is a space between the first coil member and the second coil member in the state of being faced to each other, the protection part being provided in at least one housing of the first housing and the second housing so as to close at least a part of a gap continuous to the facing space.

15. The wireless connector according to claim 14, wherein:
the first housing serving as the one housing includes a recessed part which is a part where the first coil member is arranged and which forms a recess of a columnar shape along the fitting direction,
the second housing serving as the other housing includes a protruding part of a columnar shape which is a part where the second coil member is arranged and which protrudes in the fitting direction,
the protection part is provided on a bottom surface, an inner peripheral surface, or a peripheral portion of the recessed part, and
the first coil member and the second coil member are arranged in a state of being spaced from and faced to each other along the fitting direction to cause magnetic field coupling therebetween, and the protruding part and the recessed part are faced to each other with the protection part brought into contact with a tip surface, an outer peripheral surface or a peripheral portion of the protruding part.

16. The wireless connector according to claim 14, wherein:
the first housing serving as the one housing includes a recessed part which is a part where the first coil member is arranged and which forms a recess of a columnar shape along the fitting direction,
the second housing serving as the other housing includes a protruding part of a columnar shape which is a part where the second coil member is arranged and which protrudes in the fitting direction,
the protection part is provided on a tip surface, an outer peripheral surface, or a peripheral portion of the protruding part, and
the first coil member and the second coil member are arranged in the state of being spaced from and faced to each other along the fitting direction to cause magnetic field coupling therebetween, and the protruding part and the recessed part are faced to each other with the protection part brought into contact with a bottom surface, an inner peripheral surface or a peripheral portion of the recessed part.

17. A wireless connector for wirelessly transmitting outside a joint mechanism, between a first object and a second object which are rotatably connected via the joint mechanism with a rotation axis as a fulcrum, at least one of electric power and information as a to-be-transmitted target, wherein the wireless connector is disposed outside the first object and the second object, and the wireless connector comprises:
a first unit removably attached to the first object from an outside of the first object; and
a second unit removably attached to the second object from an outside of the second object,
wherein the first unit comprises:
a first transmission/reception part including a first coil member configured to wirelessly transmit the to-be-transmitted target;
a first connector part removably attached to the first object so as to transmit the to-be-transmitted target to/from the first object by being fitted to the first object from the outside of the first object; and
a first housing to which the first coil member and the first connector part are fixed,
wherein the second unit comprises:
a second transmission/reception part including a second coil member configured to wirelessly transmit the to-be-transmitted target to/from the first coil member;

a second connector part removably attached to the second object so as to transmit the to-be-transmitted target to/from the second object by being fitted to the second object from the outside of the second object; and a second housing to which the second coil member and the second connector part are fixed, wherein each of the first housing and the second housing has a sealed structure formed of a non-magnetic material, the first coil member is accommodated inside the first housing;

the second coil member is accommodated inside the second housing;

the first connector part and the second connector part have the same fitting direction; and the first coil member and the second coil member are arranged in a state of being spaced from and faced to each other along the fitting direction to cause magnetic field coupling therebetween.

18. The wireless connector according to claim 17, further including:

a protection part comprising a member for preventing intrusion of a foreign matter into a facing space, which is a space between the first coil member and the second coil member in the state of being faced to each other, the protection part being provided in at least one housing of the first housing and the second housing so as to close at least a part of a gap continuous to the facing space.

19. The wireless connector according to claim 14, wherein:

the first coil member is disposed around a first central axis;

the second coil member is disposed around a second central axis; and the first central axis and the second central axis are parallel to the fitting direction.

20. A wireless connector for wirelessly transmitting outside a joint mechanism, between a first object and a second object which are rotatably connected via the joint mechanism with a rotation axis as a fulcrum, at least one of electric power and information as a to-be-transmitted target, wherein the wireless connector is disposed outside the first object and the second object, and the wireless connector comprises:

a first unit removably attached to the first object from an outside of the first object; and a second unit removably attached to the second object from an outside of the second object, wherein the first unit comprises:

a first transmission/reception part including a first coil member configured to wirelessly transmit the to-be-transmitted target;

a first connector part configured to transmit the to-be-transmitted target to/from the first object by being removably attached to the first object from the outside of the first object; and a first housing to which the first transmission/reception part and the first connector part are fixed, wherein the second unit comprises:

a second transmission/reception part including a second coil member configured to wirelessly transmit the to-be-transmitted target to/from the first transmission/reception part;

a second connector part configured to transmit the to-be-transmitted target to/from the second object by being removably attached to the second object from the outside of the second object; and a second housing to which the second transmission/reception part and the second connector part are fixed, wherein the first coil member and the second coil member are spaced from and faced to each other in a state of being magnetically coupled to each other;

wherein the wireless connector further includes a protection part comprising a member for preventing intrusion of a foreign matter into a facing space, which is a space between the first coil member and the second coil member in the state of being magnetically coupled to each other, the protection part being provided in at least one housing of the first housing and the second housing so as to close at least a part of a gap continuous to the facing space.

21. The wireless connector according to claim 20, wherein:

the first housing serving as the one housing includes a recessed part forming a recess of a columnar shape in which the first coil member is arranged, the second housing serving as the other housing includes a protruding part of a columnar shape on which the second coil member is arranged, and the protection part is provided on a bottom surface, an inner peripheral surface, or a peripheral portion of the recessed part, wherein, in a case where the first coil member and the second coil member are in the state of being magnetically coupled to each other, the protection part is brought into contact with a tip surface, an outer peripheral surface, or a peripheral portion of the protruding part.

22. The wireless connector according to claim 20, wherein:

the first housing serving as the one housing includes a recessed part forming a recess of a columnar shape in which the first coil member is arranged, the second housing serving as the other housing includes a protruding part of a columnar shape on which the second coil member is arranged, and the protection part is provided on a tip surface, an outer peripheral surface, or a peripheral portion of the protruding part, wherein, in a case where the first coil member and the second coil member are in the state of being magnetically coupled to each other, the protection part is brought into contact with a bottom surface, an inner peripheral surface, or a peripheral portion of the recessed part.

23. A wireless connector for wirelessly transmitting outside a joint mechanism, between a first object and a second object which are rotatably connected via the joint mechanism with a rotation axis as a fulcrum, at least one of electric power and information as a to-be-transmitted target, wherein the wireless connector is disposed outside the first object and the second object, and the wireless connector comprises:

a first unit removably attached to the first object from an outside of the first object, and a second unit removably attached to the second object from an outside of the second object, wherein the first unit comprises:

a first transmission/reception part including a first coil member configured to wirelessly transmit the to-be-transmitted target;

a first connector part configured to transmit the to-be-transmitted target to/from the first object by being removably attached to the first object from the outside of the first object; and a first housing to which the first transmission/reception part and the first connector part are fixed, wherein the second unit comprises:

a second transmission/reception part including a second coil member configured to wirelessly transmit the to-be-transmitted target to/from the first transmission/reception part;

a second connector part configured to transmit the to-be-transmitted target to/from the second object by being removably attached to the second object from the outside of the second object; and a second housing to which the second transmission/reception part and the second connector part are fixed, wherein each of the first housing and the second housing has a sealed structure formed of a non-magnetic material;

the first coil member is accommodated inside the first housing; and the second coil member is accommodated inside the second housing; and the first coil member and the second coil member are spaced from and faced to each other in a state of being magnetically coupled to each other.

24. The wireless connector according to claim 23, further including:

a protection part comprising a member for preventing intrusion of a foreign matter into a facing space, which is a space between the first coil member and the second coil member in the state of being magnetically coupled to each other, the protection part being provided in at least one housing of the first housing and the second housing so as to close at least a part of a gap continuous to the facing space.

25. A wireless connector for wirelessly transmitting outside a joint mechanism, between a first object and a second object which are rotatably connected via the joint mechanism with a rotation axis as a fulcrum, a to-be-transmitted target which is at least one of electric power and information, wherein the wireless connector is disposed outside the first object and the second object, and the wireless connector comprises:

a first unit removably attached to the first object from an outside of the first object, and a second unit removably attached to the second object from an outside of the second object, wherein the first unit comprises:

a first transmission/reception part configured to wirelessly transmit the to-be-transmitted target;

a first connector part configured to transmit the to-be-transmitted target to/from the first object by being attached to the first object; and a first housing to which the first transmission/reception part is fixed and the first connector part is attached, wherein the second unit comprises:

a second transmission/reception part configured to wirelessly transmit the to-be-transmitted target to/from the first transmission/reception part;

a second connector part configured to transmit the to-be-transmitted target to/from the second object by being attached to the second object; and a second housing to which the second transmission/reception part is fixed and the second connector part is attached, wherein, when the first unit and the second unit are attached to the first object and the second object, respectively, the first transmission/reception part and the second transmission/reception part are arranged in a state of being spaced from and faced to each other so as to wirelessly transmit the to-be-transmitted target;

wherein the wireless connector further includes a protection part comprising a member for preventing intrusion of a foreign matter into a facing space, which is a space between the first transmission/reception part and the second transmission/reception part in the state of being faced to each other, the protection part being provided in at least one housing of the first housing and the second housing so as to close at least a part of a gap continuous to the facing space.

26. The wireless connector according to claim 25, wherein:

the first housing serving as the one housing includes a recessed part forming a recess of a columnar shape in which the first transmission/reception part is arranged, the second housing serving as the other housing includes a protruding part of a columnar shape on which the second transmission/reception part is arranged, and the protection part is provided on a bottom surface, an inner peripheral surface, or a peripheral portion of the recessed part, wherein, when the first connector part and the second connector part are attached to the object and the second object, respectively, the first transmission/reception part and the second transmission/reception part are arranged in a state of being spaced from and faced to each other along the rotation axis so as to wirelessly transmit the to-be-transmitted target outside the joint mechanism, and the protruding part and the recessed part are faced to each other with the protection part brought into contact with a tip surface, an outer peripheral surface, or a peripheral portion of the protruding part.

27. The wireless connector according to claim 25, wherein:

the first housing serving as the one housing includes a recessed part forming a recess of a columnar shape in which the first transmission/reception part is arranged, the second housing serving as the other housing includes a protruding part of a columnar shape on which the second transmission/reception part is arranged, and the protection part is provided on a tip surface, an outer peripheral surface, or a peripheral portion of the protruding part, wherein, when the first connector part and the second connector part are attached to the first object and the second object, respectively, the first transmission/reception part and the second transmission/reception part are arranged in a state of being spaced from and faced to each other along the rotation axis so as to wirelessly transmit the to-be-transmitted target outside the joint mechanism, and the protruding part and the recessed part are faced to each other with the protection part brought into contact with a bottom surface, an inner peripheral surface, or a peripheral portion of the recessed part.

28. A wireless connector for wirelessly transmitting outside a joint mechanism, between a first object and a second object which are rotatably connected via the joint mechanism with a rotation axis as a fulcrum, a to-be-transmitted target which is at least one of electric power and information, wherein the wireless connector is disposed outside the first object and the second object, and the wireless connector comprises:

a first unit removably attached to the first object from an outside of the first object, and a second unit removably attached to the second object from an outside of the second object,
wherein the first unit comprises:
a first transmission/reception part configured to wirelessly transmit the to-be-transmitted target;
a first connector part configured to transmit the to-be-transmitted target to/from the first object by being attached to the first object; and
a first housing to which the first transmission/reception part is fixed and the first connector part is attached,
wherein the second unit comprises:
a second transmission/reception part configured to wirelessly transmit the to-be-transmitted target to/from the first transmission/reception part;
a second connector part configured to transmit the to-be-transmitted target to/from the second object by being attached to the second object; and
a second housing to which the second transmission/reception part is fixed and the second connector part is attached,
wherein each of the first housing and the second housing has a sealed structure formed of a non-magnetic material;
the first transmission/reception part is accommodated inside the first housing; and
the second transmission/reception part is accommodated inside the second housing;
wherein, when the first unit and the second unit are attached to the first object and the second object, respectively, the first transmission/reception part and the second transmission/reception part are arranged in a state of being spaced from and faced to each other so as to wirelessly transmit the to-be-transmitted target.

29. The wireless connector according to claim 28, further including:
a protection part comprising a member for preventing intrusion of a foreign matter into a facing space, which is a space between the first transmission/reception part and the second transmission/reception part in the state of being faced to each other, the protection part being provided in at least one housing of the first housing and the second housing so as to close at least a part of a gap continuous to the facing space.

30. The wireless connector according to claim 9, wherein:
when the first unit and the second unit are attached to the first object and the second object, respectively, the first transmission/reception part and the second transmission/reception part are arranged in a state of being spaced from and faced to each other along the rotation axis.

31. The wireless connector according to claim 9, wherein:
the first unit and the second unit are spaced from each other when the first unit and the second unit are attached to the first object and the second object, respectively.

* * * * *

UNITED STATES PATENT AND TRADEMARK OFFICE
CERTIFICATE OF CORRECTION

| | | |
|---|---|---|
| PATENT NO. | : 12,212,148 B2 | Page 1 of 1 |
| APPLICATION NO. | : 17/785663 | |
| DATED | : January 28, 2025 | |
| INVENTOR(S) | : Hideyuki Noguchi et al. | |

It is certified that error appears in the above-identified patent and that said Letters Patent is hereby corrected as shown below:

In the Specification

In Column 34, Line 22: change "first second" to -- second --.

In the Claims

In Column 56, Line 24 (Claim 26): before "object" add -- first --.

Signed and Sealed this
First Day of April, 2025

Coke Morgan Stewart
*Acting Director of the United States Patent and Trademark Office*